US008966383B2

(12) United States Patent
Gautier et al.

(10) Patent No.: US 8,966,383 B2
(45) Date of Patent: Feb. 24, 2015

(54) GRAPHICAL USER INTERFACE AND METHOD FOR MOBILE DEVICE ACTIVATION

(76) Inventors: Patrice Gautier, San Francisco, CA (US); Debbie Shimizu, San Jose, CA (US); Alexandrea Anderson, Clovis, CA (US); Eddy Cue, Los Altos, CA (US); Monika Gromek, Oakland, CA (US); Robert H. Kondrk, San Francisco, CA (US)

( * ) Notice: Subject to any disclaimer, the term of this patent is extended or adjusted under 35 U.S.C. 154(b) by 1298 days.

(21) Appl. No.: 11/821,597

(22) Filed: Jun. 22, 2007

(65) Prior Publication Data
US 2008/0167027 A1    Jul. 10, 2008

Related U.S. Application Data

(60) Provisional application No. 60/879,318, filed on Jan. 7, 2007.

(51) Int. Cl.
| | | |
|---|---|---|
| G06F 3/048 | (2013.01) | |
| G06Q 10/00 | (2012.01) | |
| H04M 11/00 | (2006.01) | |
| H04W 8/26 | (2009.01) | |
| H04W 4/00 | (2009.01) | |

(52) U.S. Cl.
CPC .............. *H04W 8/265* (2013.01); *H04W 4/00* (2013.01); *H04W 4/001* (2013.01)
USPC .............................. 715/764; 705/1.1; 455/403

(58) Field of Classification Search
USPC ........... 705/1.1; 715/234, 700, 762, 764, 810; 455/403
See application file for complete search history.

(56) References Cited

U.S. PATENT DOCUMENTS

| | | | |
|---|---|---|---|
| 3,876,942 A | | 4/1975 | Koster et al. |
| 5,386,455 A | | 1/1995 | Cooper |
| 5,444,764 A | | 8/1995 | Galecki |
| 5,485,505 A | | 1/1996 | Norman et al. |
| 5,835,061 A | | 11/1998 | Stewart |
| 6,119,003 A | * | 9/2000 | Kukkohovi ................ 455/435.2 |
| 6,124,799 A | | 9/2000 | Parker |

(Continued)

FOREIGN PATENT DOCUMENTS

| | | |
|---|---|---|
| DE | 198 23 074 | 11/1999 |
| EP | 0 367 361 | 5/1990 |

(Continued)

OTHER PUBLICATIONS

International Search Report and Written Opinion, dated Nov. 17, 2008, issued in International Application No. PCT/US2008/009009.

(Continued)

*Primary Examiner* — Rashawn Tillery
(74) *Attorney, Agent, or Firm* — Womble Carlyle Sandridge & Rice, LLP

(57) ABSTRACT

Methods, systems and graphical user interfaces that facilitate activation of mobile devices, such as communication devices or multi-function devices, via computers are disclosed. According to one embodiment, activation of a mobile device with respect to a wireless service provider can be performed by users through use of computers (e.g., personal computers) that communicate with a remotely located activation server. According to another embodiment, graphical user interfaces can be presented to users so as to enable end users to easily activate mobile devices.

24 Claims, 45 Drawing Sheets

(56) References Cited

U.S. PATENT DOCUMENTS

| | | | |
|---|---|---|---|
| 6,134,435 A | 10/2000 | Zicker et al. | |
| 6,137,783 A | 10/2000 | Sallberg | |
| 6,185,427 B1 | 2/2001 | Krasner et al. | |
| 6,199,045 B1 | 3/2001 | Giniger et al. | |
| 6,259,405 B1 | 7/2001 | Stewart et al. | |
| 6,263,214 B1 | 7/2001 | Yazaki et al. | |
| 6,295,291 B1 | 9/2001 | Larkins | |
| 6,321,079 B1 | 11/2001 | Cooper | |
| 6,323,846 B1 | 11/2001 | Westerman et al. | |
| 6,456,234 B1 | 9/2002 | Johnson | |
| 6,487,403 B2 | 11/2002 | Carroll | |
| 6,570,557 B1 | 5/2003 | Westerman et al. | |
| 6,611,687 B1 | 8/2003 | Clark et al. | |
| 6,615,213 B1 | 9/2003 | Johnson | |
| 6,628,934 B2 | 9/2003 | Rosenberg et al. | |
| 6,677,894 B2 | 1/2004 | Sheynblat et al. | |
| 6,677,932 B1 | 1/2004 | Westerman | |
| 6,731,238 B2 | 5/2004 | Johnson | |
| 6,879,825 B1 | 4/2005 | Daly | |
| 6,888,536 B2 | 5/2005 | Westerman et al. | |
| 7,054,642 B1 | 5/2006 | Matz et al. | |
| 7,113,981 B2 * | 9/2006 | Slate | 709/217 |
| 7,187,997 B2 | 3/2007 | Johnson | |
| 7,359,516 B1 | 4/2008 | Skinner et al. | |
| 7,433,710 B2 | 10/2008 | Bodnar et al. | |
| 7,555,571 B1 | 6/2009 | Skinner | |
| 7,710,290 B2 | 5/2010 | Johnson | |
| 8,335,507 B1 * | 12/2012 | Mangal | 455/432.3 |
| 2002/0037724 A1 * | 3/2002 | Chatterjee et al. | 455/435 |
| 2002/0082048 A1 | 6/2002 | Toyoshima | |
| 2002/0085530 A1 | 7/2002 | Toyoshima | |
| 2002/0197992 A1 | 12/2002 | Nizri et al. | |
| 2003/0021413 A1 | 1/2003 | Kiiveri et al. | |
| 2003/0083068 A1 | 5/2003 | Wong | |
| 2003/0119515 A1 | 6/2003 | Holler et al. | |
| 2004/0092248 A1 | 5/2004 | Kelkar et al. | |
| 2004/0102183 A1 | 5/2004 | Haub et al. | |
| 2004/0121802 A1 | 6/2004 | Kim et al. | |
| 2004/0137890 A1 * | 7/2004 | Kalke | 455/418 |
| 2004/0142725 A1 | 7/2004 | Kim | |
| 2004/0176133 A1 | 9/2004 | Lipsit | |
| 2004/0235458 A1 | 11/2004 | Walden | |
| 2004/0242209 A1 | 12/2004 | Kruis et al. | |
| 2004/0242224 A1 | 12/2004 | Janik et al. | |
| 2004/0248550 A1 | 12/2004 | Hausner et al. | |
| 2005/0009502 A1 | 1/2005 | Little et al. | |
| 2005/0054338 A1 | 3/2005 | Hosokawa | |
| 2005/0079863 A1 | 4/2005 | Macaluso | |
| 2005/0120209 A1 | 6/2005 | Kwon et al. | |
| 2005/0141438 A1 | 6/2005 | Quetglas | |
| 2005/0144251 A1 * | 6/2005 | Slate | 709/215 |
| 2006/0046717 A1 | 3/2006 | Bovell | |
| 2006/0063564 A1 * | 3/2006 | Sharma | 455/558 |
| 2006/0095339 A1 * | 5/2006 | Hayashi et al. | 705/26 |
| 2006/0105810 A1 | 5/2006 | Gnuschke | |
| 2006/0143098 A1 | 6/2006 | Lazaridis | |
| 2006/0154647 A1 | 7/2006 | Choi | |
| 2006/0160569 A1 * | 7/2006 | Chen et al. | 455/557 |
| 2006/0183500 A1 | 8/2006 | Choi | |
| 2007/0050622 A1 | 3/2007 | Rager et al. | |
| 2007/0082655 A1 | 4/2007 | Link et al. | |
| 2007/0094737 A1 | 4/2007 | Larsson et al. | |
| 2007/0129057 A1 | 6/2007 | Xu et al. | |
| 2007/0167161 A1 | 7/2007 | Cheng et al. | |
| 2007/0264983 A1 * | 11/2007 | Chen et al. | 455/414.1 |
| 2008/0003980 A1 | 1/2008 | Voss et al. | |
| 2008/0070549 A1 | 3/2008 | Wang | |
| 2008/0090614 A1 | 4/2008 | Sicher et al. | |
| 2008/0166993 A1 | 7/2008 | Gautier et al. | |
| 2008/0167027 A1 | 7/2008 | Gautier et al. | |
| 2008/0167036 A1 | 7/2008 | Bush | |
| 2008/0318550 A1 | 12/2008 | DeAtley | |
| 2009/0061840 A1 | 3/2009 | Fleischman et al. | |
| 2009/0061934 A1 | 3/2009 | Hauck et al. | |
| 2009/0181662 A1 | 7/2009 | Fleischman et al. | |
| 2010/0022240 A1 | 1/2010 | Skinner | |

FOREIGN PATENT DOCUMENTS

| | | |
|---|---|---|
| EP | 0 367 361 A | 5/1990 |
| EP | 1 276 339 | 1/2003 |
| EP | 1 679 925 | 7/2006 |
| EP | 1 748 661 | 1/2007 |
| EP | 2 079 256 | 7/2009 |
| GB | 2 428 544 | 1/2007 |
| WO | WO 97/42783 | 11/1997 |
| WO | WO 01/15414 | 3/2001 |
| WO | WO 01/15414 A | 3/2001 |
| WO | WO 02/058361 | 7/2002 |
| WO | WO 03/041443 | 5/2003 |
| WO | WO 03/041443 A | 5/2003 |
| WO | WO 2004/057485 | 7/2004 |
| WO | WO 2004/082310 | 9/2004 |
| WO | WO 2004/105421 | 12/2004 |
| WO | WO 2006/054980 | 5/2006 |
| WO | WO 2006/084183 | 8/2006 |
| WO | WO 2007/079425 | 7/2007 |
| WO | WO 2008/085255 | 7/2008 |
| WO | WO 2009/002649 | 12/2008 |
| WO | WO 2009/032853 | 3/2009 |

OTHER PUBLICATIONS

International Search Report and Written Opinion, dated Nov. 18, 2008, issued in International Application No. PCT/US2008/009007.

International Search Report and Written Opinion, dated Feb. 6, 2009, issued in International Application No. PCT/US2008/075138.

International Search Report and Written Opinion, dated May 27, 2009, issued in International Application No. PCT/US2009/031016.

Search Report, dated May 27, 2009, issued in European Application No. 09000426.8.

International Search Report and Written Opinion, dated Jan. 20, 2009, issued in International Application No. PCT/US2008/064971.

Invitation to Pay Fees and Partial International Search Report, dated Oct. 22, 2008, issued in International Application No. PCT/US2008/064971.

International Search Report and Written Opinion, dated Jan. 5, 2009, issued in International Application No. PCT/US2008/050343.

International Preliminary Report on Patentability, dated Jul. 7, 2009, issued in International Application No. PCT/US2008/050343.

European Extended Search Report, dated May 5, 2008, issued in European Application No. 08250050.5.

European Search Report for EP 08250053, dated Apr. 24, 2008.

International Search Report and Written Opinion for PCT/US2008/050340, mailed Apr. 24, 2008.

International Preliminary Report on Patentability for PCT/US2008/050340, mailed Jul. 16, 2009.

U.S. Appl. No. 11/849,286, filed Sep. 1, 2007.

Non Final Office Action, U.S. Appl. No. 11/821,598, dated Mar. 31, 2011.

Non Final Office Action, U.S. Appl. No. 11/821,598, dated Sep. 13, 2013.

* cited by examiner

FIG. 20

GRAPHICAL USER INTERFACE AND METHOD FOR MOBILE DEVICE ACTIVATION

CROSS-REFERENCE TO OTHER APPLICATIONS

This application claims priority benefit of U.S. Provisional Patent Application No. 60/879,318, filed Jan. 7, 2007, and entitled "METHOD SYSTEM AND GRAPHICAL USER INTERFACE FOR MOBILE DEVICE ACTIVATION," which is hereby incorporated by reference herein.

This application also references and/or incorporates: (1) U.S. patent application Ser. No. 11/650,859, filed Jan. 7, 2007, and entitled "MOBILE DEVICE ACTIVATION," which is hereby incorporated by reference herein; (2) U.S. patent application Ser. No. 11/767,447, filed Jun. 22, 2007, and entitled "DEVICE ACTIVATION AND ACCESS," which is hereby incorporated by reference herein; and (3) U.S. patent application Ser. No. 11/821,598, filed Jun. 22, 2007, and entitled "METHOD AND SYSTEM FOR MOBILE DEVICE ACTIVATION," which is hereby incorporated by reference herein.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

1. Field of the Invention

The present invention relates to mobile electronic devices and, more particularly, to activation of mobile electronic devices having wireless communication capabilities.

2. Description of the Related Art

Mobile phones are often used by individuals on a personal basis. When a mobile phone is newly acquired, the wireless network infrastructure (e.g., cellular phone network) of the appropriate wireless carrier or service provider needs to be setup to work with the mobile phone. Mobile phone setup is principally done at retail establishments that sell mobile phones and wireless service plans. Alternatively, mobile phones can be configured at a manufacturing or distribution site or at a service center. Unfortunately, however, mobile phone setup is time consuming and restrictive to consumers. Additionally, once a mobile phone and service plan have been setup for a consumer, the wireless network needs to be informed of the mobile phone and the mobile phone thereafter needs to register with the wireless network whenever being used. Registration requires a location update request be sent from the mobile phone to the wireless network. In the case of initial phone setup, since location update is triggered on power-up, typically the person configuring the mobile phone would be required to power-off and then power-on the mobile phone to render it active on the wireless network. There is thus a need to avoid the various inconveniences and inefficiencies of conventional mobile phone setup.

SUMMARY OF THE INVENTION

The invention pertains to methods, systems and graphical user interfaces that facilitate setup or activation of mobile devices, such as communication devices or multi-function devices, via computers. According to one embodiment, activation of a mobile device with respect to a wireless service provider can be performed by users through use of computers (e.g., personal computers) that communicate with a remotely located activation server. According to another embodiment, graphical user interfaces can be presented to users so as to enable end users to easily activate mobile devices.

The invention can be implemented in numerous ways, including as a method, system, device, apparatus, graphical user interface, or computer readable medium. Several embodiments of the invention are discussed below.

As a computer-implemented method for activating wireless network service for an electronic device through use of a host device, where the electronic device is associated with a customer for wireless network service provided by a wireless network service provider, one embodiment can, for example, include at least the acts of: receiving device information from the electronic device when the electronic device is attached to the host device; acquiring customer information pertaining to the customer; receiving a service plan selection from the customer; receiving billing information for payment of the service plan; and initiating activation of a wireless service account for use of the electronic device with the wireless network service provided by the wireless network service provider. The wireless service account being activated can be based on the customer information, the service plan and the billing information.

As a computer-implemented method for activating an electronic device for wireless network service through use of a host device, where the electronic device is associated with a customer for wireless network service provided by a wireless network service provider, one embodiment can, for example, include at least the acts of: receiving device information from the electronic device while the electronic device is attached to the host device; acquiring customer information pertaining to the customer; offering the user one or more service plans; receiving a user selection of one of the service plans; and receiving billing information for payment of the selected service plan.

As a computer-implemented method for activating an electronic device for wireless network service from a host device, where the electronic device is associated with a customer for wireless network service provided by a wireless network service provider, one embodiment can, for example, include at least the acts of: receiving device information from the electronic device when the electronic device is attached to the host device; determining whether the electronic device has already been activated based on the device information; and automatically initiating activation of the electronic device when it is determined that the electronic device has not already been activated.

As a graphical user interface to assist an end user in activating an account for an electronic device having wireless communication capabilities, where the account is with respect to a wireless service provider providing wireless network service, one embodiment of the invention can, for example, include at least a plurality of displayable pages that are presented on a display device associated with a host computer. The displayable pages can, for example, include: an end user status page to facilitate selection of a type of activation; a service plan selection page to facilitate selection of a service plan for the wireless network service; a media account page for a media account associated with an online media store so that a user can create a new media account or login to an existing media account; an end user information entry page to facilitate entry of end user information; a billing information page to facilitate entry of billing information for one or both the user media account and a wireless account; a terms and conditions page regarding legal agreements with the online media store and with the wireless service provider; and/or an activation page to inform the end user of activation information.

As a computer-implemented method for activating an electronic device for wireless network service, where the electronic device is associated with a customer of a wireless service provider associated with the wireless network service, one embodiment can, for example, include at least the acts of: informing an activation server of an electronic device having wireless communication device that is to be activated for wireless network service; displaying a customer status page to facilitate selection of a type of activation; specifying to the activation server a type of activation desired by the customer; displaying a service plan selection page to facilitate selection of a service plan for the wireless network service; informing the activation server of a selected service plan; displaying a customer account page to facilitate login to or creation of a user media account with an online media store; providing account information for the user media account for the customer; displaying a customer information entry page; providing customer information to the activation server; displaying a billing information page to facilitate entry of billing information for one or both the user media account and a wireless account; informing the activation server of the billing information; displaying a terms and conditions page regarding legal agreements with the online media store and with the wireless service provider; informing the activation server of acceptance of the legal agreements; displaying an information review page; informing the activation server of approval of the information provided on the information review page; displaying an activation completion page; and displaying a device preference page to assist the customer with setting one or more preferences or options to be applied to the operation of the electronic device.

As a computer readable medium including at least computer executable program code tangibly embodied therein for activating wireless network service for an electronic device through use of a client computing device, the electronic device being associated with a customer for wireless network service provided by a wireless network service provider, one embodiment can, for example, include at least: computer program code for receiving device information from the electronic device when the electronic device is attached to the host device; computer program code for acquiring customer information pertaining to the customer; computer program code for receiving a service plan selection from the customer; computer program code for receiving billing information for payment of the service plan; and computer program code for initiating activation of a wireless service account for use of the electronic device with the wireless network service provided by the wireless network service provider.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which:

FIG. 20 illustrates an exemplary billing information page according to one embodiment of the invention.

DETAILED DESCRIPTION OF THE INVENTION

The invention pertains to methods, systems and graphical user interfaces that facilitate setup or activation of mobile devices, such as communication devices or multi-function devices, via computers. According to one embodiment, activation of a mobile device with respect to a wireless service provider can be performed by users through use of computers (e.g., personal computers) that communicate with a remotely located activation server. According to another embodiment, graphical user interfaces can be presented to users so as to enable end users to easily activate mobile devices.

Embodiments of the invention are discussed below with reference to FIGS. 1-34. However, those skilled in the art will readily appreciate that the detailed description given herein with respect to these figures is for explanatory purposes as the invention extends beyond these limited embodiments.

Figure 1:
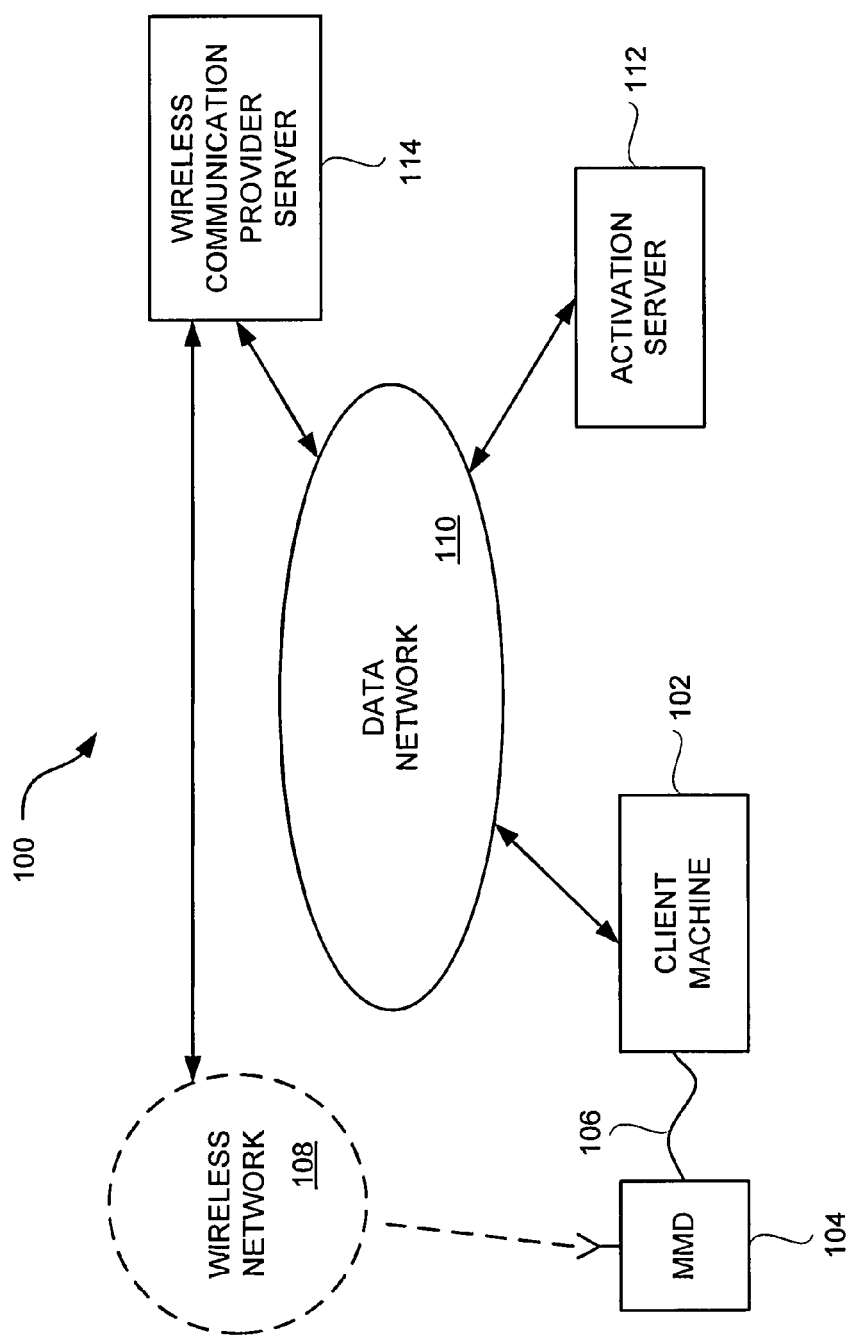
FIG. 1 is a block diagram of an activation system according to one embodiment of the invention.

FIG. 1 is a block diagram of an activation system 100 according to one embodiment of the invention. The activation system 100 includes a client machine 102. The client machine 102 is, for example, a computing device, such as a personal computer. The client machine 102 can also be referred to as a host device. A mobile multi-function device 104 can be connected (e.g., temporarily connected) to the client machine 102. In one implementation, the mobile multi-function device 104 can be connected to the client machine 102 over a cable 106. As an example, the cable 106 can pertain to a peripheral bus (e.g., USB) connection. In another implementation, the mobile multi-function device 104 can connect to the client machine 102 over a wireless connection. The mobile multi-function device 104 operates to support a plurality of different functions. For example, the mobile multi-function device 104 can operate as a media playback device, such as an MP3 player, video player, game player, etc. In addition, the mobile multi-function device 104 can support wireless voice communications through a wireless network 108. The wireless voice communications through the wireless network 108 can enable a user of the mobile multi-function device to communicate with users of other mobile multi-function devices or other communication devices. Similarly, the mobile multi-function device 104 can support wireless data exchange (e.g., SMS messages) through the wireless network 108. Although FIG. 1 illustrates one client machine 102 and one mobile multi-function device 104, it should be noted that the activation system 100 can have multiple client machines 102 and multiple mobile multi-function devices 104. In addition, one or more of the mobile multi-function devices can connect to one or more client machines. In one implementation, the wireless network 108 can represent a cellular telephone network. In another implementation, the wireless network 108 can represent a local or regional wireless network (e.g., WiFi, WiMax). In still another implementation, the wireless network 108 can represent multiple wireless networks.

The activation system 100 also illustrates a data network 110. The data network is, for example, a local area network, a wide area network, or a global network, such as the Internet. The client machine 102 can couple to the data network 110. In addition, the activation system 100 includes an activation server 112 and a wireless communication provider server 114. In order to activate the mobile multi-function device 104, the mobile multi-function device 104 interacts with the activation server 112. To do so, the mobile multi-function device 104 communicates with the client machine 102 and the client machine 102 in turn communicates with the activation server 112 through the data network 110. In this regard, the activation server 112 can coordinate and control activation of the mobile multi-function device 104. In addition, the activation server 112 can communicate with the wireless communication provider server 114 so that an appropriate account to be utilized by the mobile multi-function device 104 can be established by the wireless communication provider that is operating on the wireless network 108.

Figure 2A:
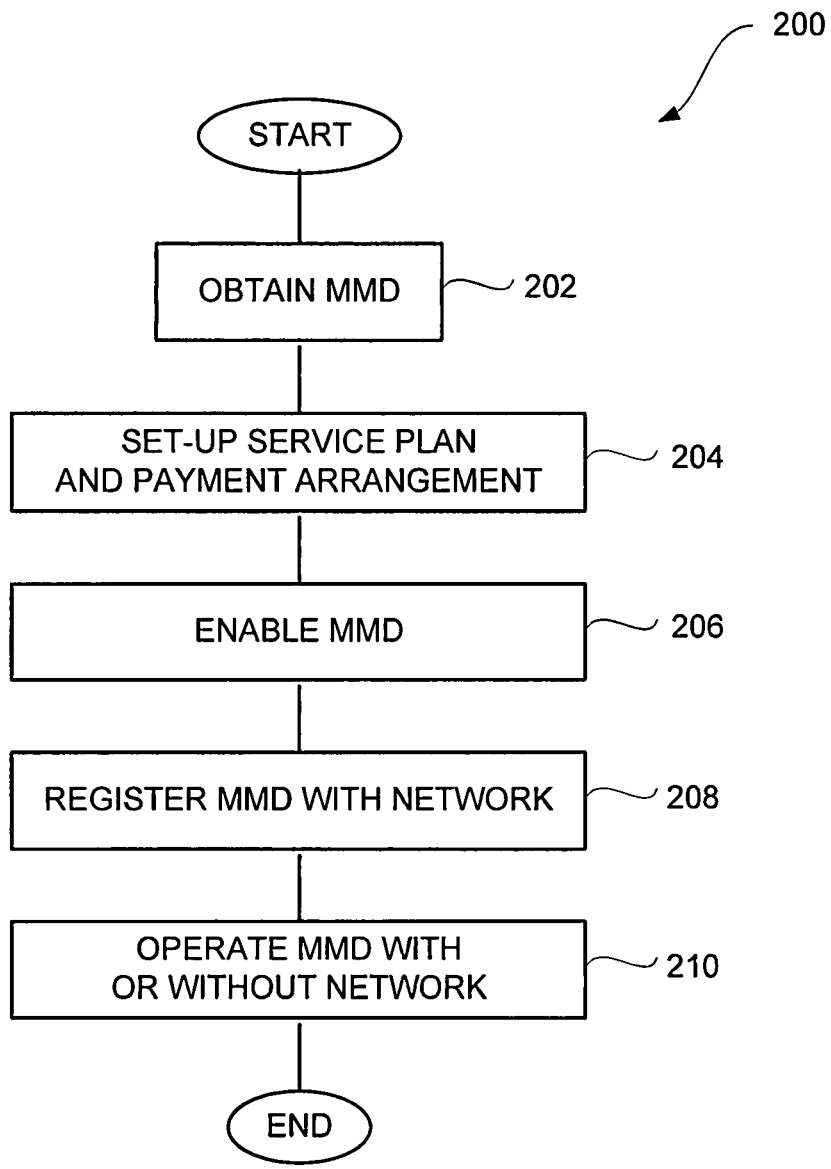
FIG. 2A is a flow diagram of a system activation process according to one embodiment of the invention.

FIG. 2A is a flow diagram of a system activation process 200 according to one embodiment of the invention. The system activation process 200 concerns activation of a mobile multi-function device (MMD). The system activation process 200 begins with a mobile multi-function device being obtained 202. For example, a user can obtain 202 a mobile multi-function device at a retail location or by mail order. In this embodiment, when the mobile multi-function device is obtained 202, it is not activated for use with any wireless network. As a result, the mobile multi-function device needs to go through an activation process in order to operate. In this regard, after the mobile multi-function device is obtained 202, a service plan and a payment arrangement need to be setup 204. After the service plan and payment arrangement have been successfully setup 204, the mobile multi-function device can be enabled 206. In addition, the mobile multi-function device can be registered with a network, namely, a wireless network. Here, the registration 208 with the network is performed to permit the mobile multi-function device to be utilized on the network.

Following successful enabling 206 and registration 208, the mobile multi-function device can operate 210 with or without utilization of the network. In this regard, since the mobile multi-function device supports multiple functions, the mobile multi-function device can be utilized in a non-network manner, such as playing local games, displaying local data, playing music from local storage, viewing local pictures, viewing locally stored electronic mail, etc. However, if the user of the mobile multi-function device desires to utilize the network (e.g., make or receive voice calls or electronic messages), network access is permitted in accordance with the service plan that has been setup 204, provided that the registration 208 was successful and provided that the network is available.

Once the mobile multi-function device is enabled 206 some or all of the functions or operations supported by the mobile multi-function device can be utilized. In one embodiment, once enabled 206, the mobile multi-function device can be utilized for all non-network functions or operations available from the mobile multi-function device, with network functions or operations becoming available following registration at block 208. In another embodiment, functions or operations of the mobile multi-function device can be prevented or restricted until completion of initial (i.e., first time) registration at block 208 at which point all functions or operations available from the mobile multi-function device can be utilized. In still another embodiment, certain, non-network functions or operations of the mobile multi-function device can be available even prior to the mobile multi-function device being enabled 206.

Figure 2B:
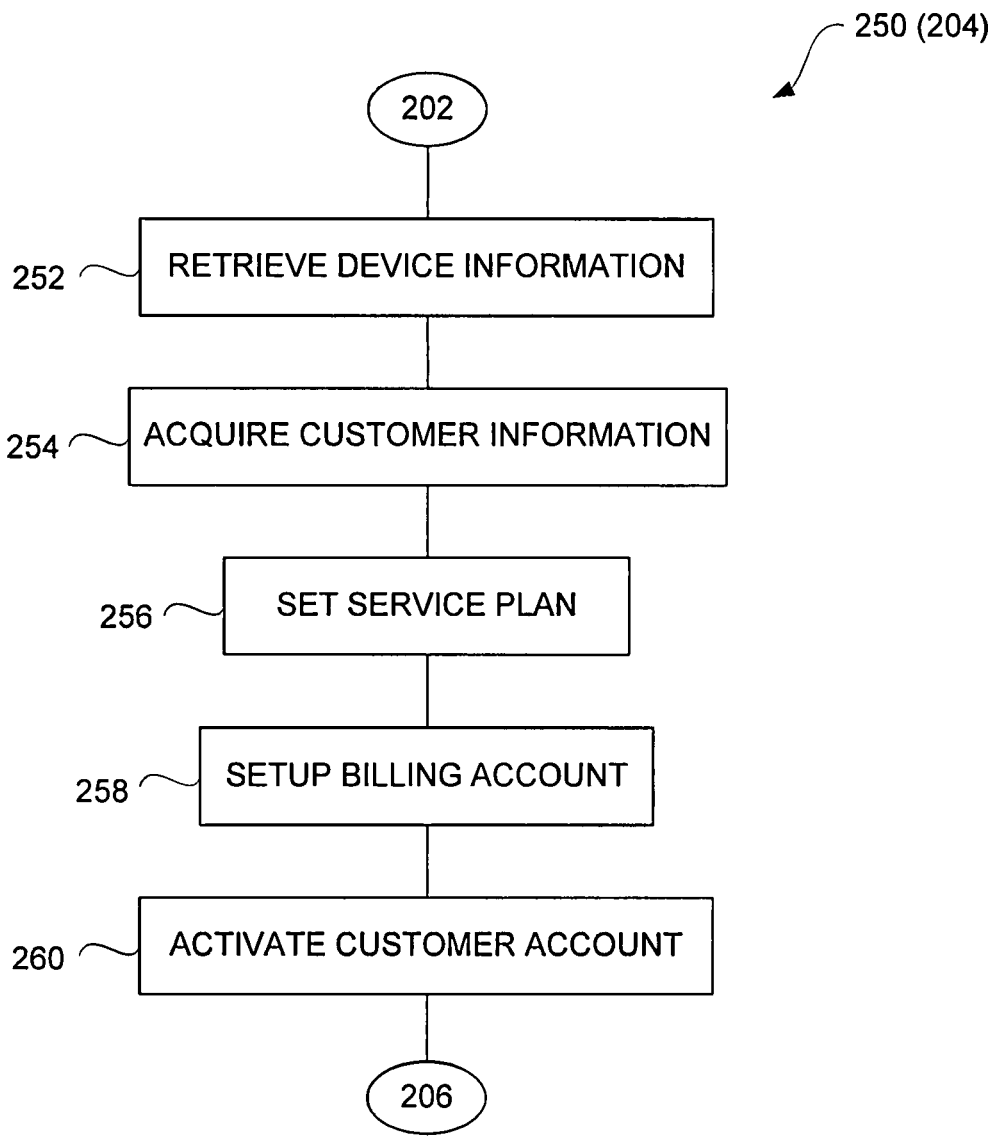
FIG. 2B is a flow diagram of a setup process according to one embodiment of the invention.

FIG. 2B is a flow diagram of a setup process 250 according to one embodiment of the invention. The setup process 250 operates to setup a service plan and/or payment arrangement with respect to one or more service providers. The setup process 250 is, for example, suitable for use as the setup 204 of a service plan and payment arrangement illustrated in FIG. 2A.

The setup process 250 retrieves 252 device information. Typically, the device information is retrieved 252 from the device itself. For example, the device can be referred to as a mobile multi-function device. Customer information can also be acquired 254, such as from the customer. The customer information can be acquired 254 so that the service provider can receive information regarding the customer that seeks to activate the mobile multi-function device. A service plan for the device is also set 256. The customer can be offered one or more service plans depending upon various different criteria, including customer's location, customer's credit history, customer's current service provider, etc. A service plan as used herein can also be referred to as a rate plan. Once a service plan to be utilized with the customer has been set 256, a billing account can be setup 258. The building account serves to facilitate billing the customer for the services provided by the service plan. Typically, the customer is billed monthly for the service plan. The setup 258 of the billing account acquires all the necessary information for billing the customer. As one example, the billing account can utilize a credit card whereby the customer is billed monthly via the credit card for the service plan. Subsequently, the customer account can be activated 260. In this regard, the setup process 250 can communicate with a computing device (e.g., activation server 112) associated with a service provider to activate a customer account so that the customer can utilize the mobile multi-function device with the at least one service provider in accordance with the service plan. The service provider is, for example, a wireless (communications) service provider. Additionally, an account with another service provider, such as an online media store, can be established. Following the block 260, the setup process 250 ends and subsequent processing can continue at block 206 of the system activation process 200 illustrated in FIG. 2A.

Figure 3:
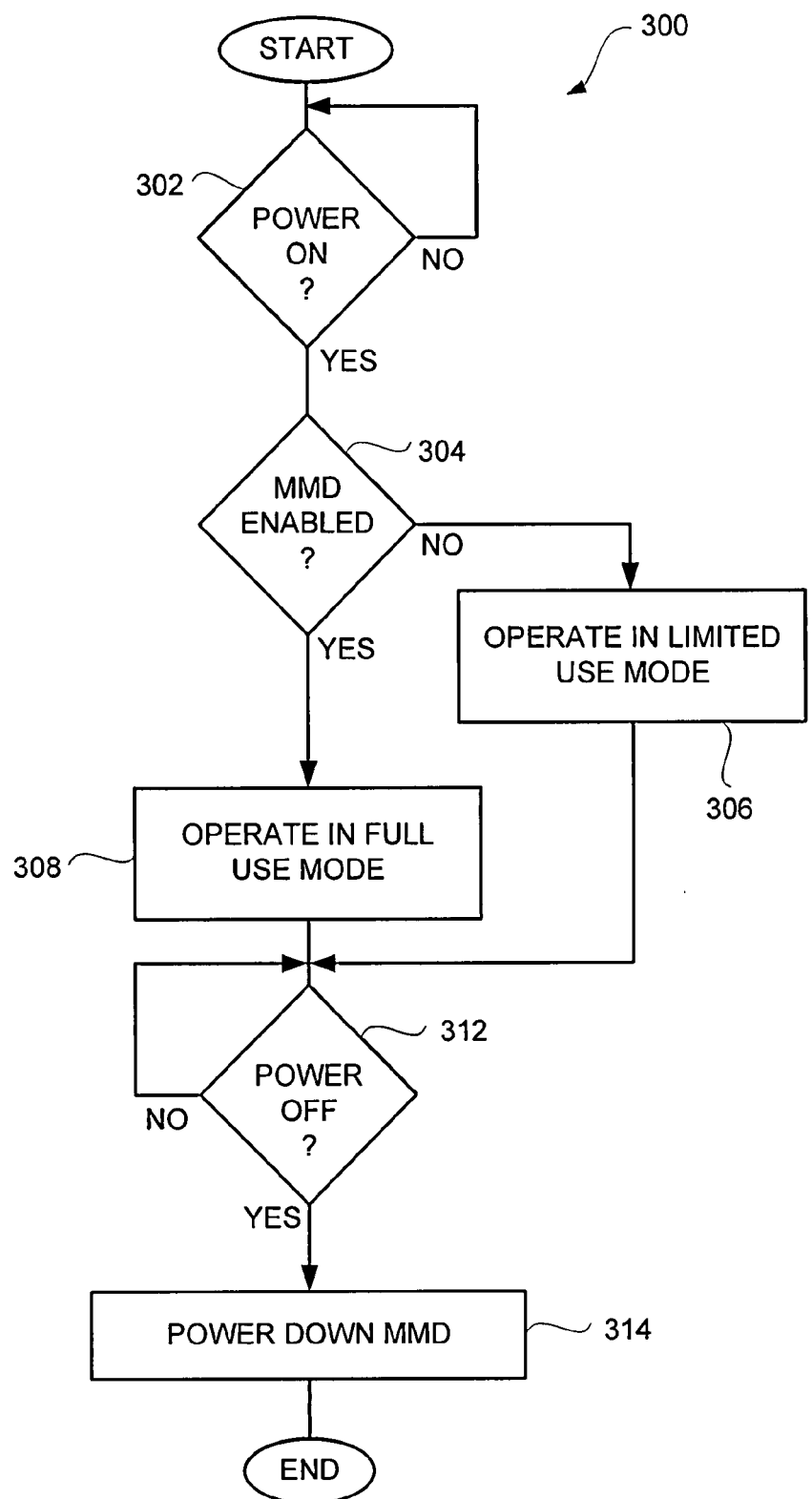
FIG. 3 is a flow diagram of a device operational process according to one embodiment of the invention.

FIG. 3 is a flow diagram of a device operational process 300 according to one embodiment of the invention. The device operational process 300 is, for example, processing associated with a mobile multi-function device, such as the mobile multi-function device 104 illustrated in FIG. 1.

The device operational process 300 can begin when the mobile multi-function device is powered on. Hence, a decision 302 determines whether the mobile multi-function device has been powered on. When the mobile multi-function device has not been powered on, the device operational process 300 is not performed. On the other hand, when the decision 302 determines that the mobile multi-function device has been powered on, a decision 304 can determine whether the mobile multi-function device has been enabled. Here, it is assumed that the mobile multi-function device performing the device operational process 300 may or may not have been enabled to operate. Hence, when the decision 304 determines that the mobile multi-function device has not been enabled, the mobile multi-function device is eligible to operate 306 in a limited use mode. As an example, in the limited use mode, the mobile multi-function device can permit emergency communications (e.g., emergency telephone calls). However, the limited use mode may prevent other operations of the mobile multi-function device. For example, if the mobile multi-function device provides media playback or network browsing, then when in the limited use mode, media playback and/or network browsing can be prevented (or limited). In one implementation, while in the limited use mode, the mobile multi-function device can prevent all other operational uses except emergency communications.

On the other hand, when the decision 304 determines that the mobile multi-function device is enabled, the mobile multi-function device can operate in a full use mode. Following the blocks 306 and 308, a decision 312 can determine whether the mobile multi-function device is to be powered off. When the decision 312 determines that the mobile multi-function device should not be powered off, the mobile multi-function device continues to operate in the previously established operational mode (e.g., limited use mode or full use mode). On the other hand, when the decision 312 determines that the mobile multi-function device should be powered off, the mobile multi-functional device is powered down 314. Following the block 314, the device operational process 300 can end.

Figure 4:
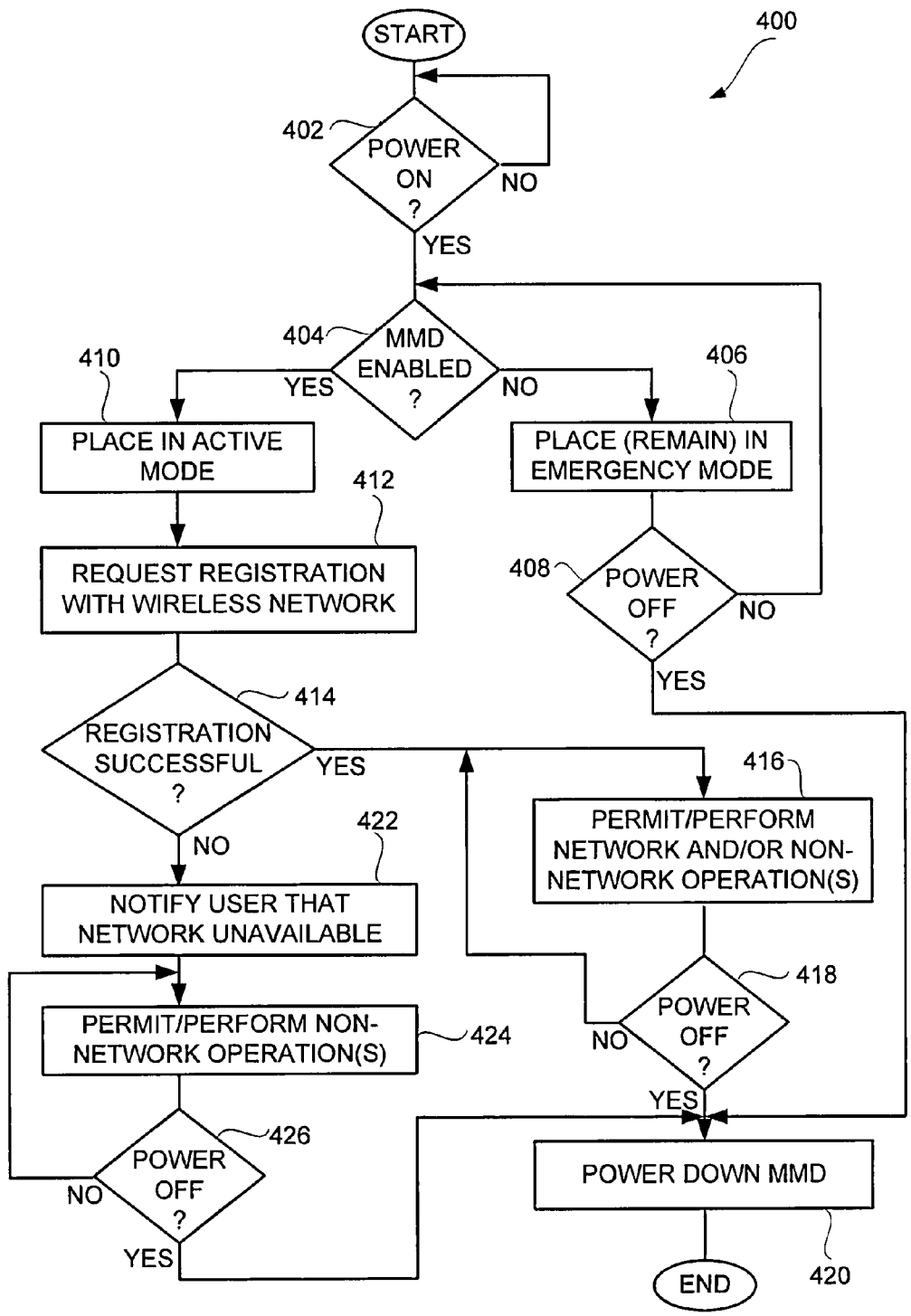
FIG. 4 is a flow diagram of a device operation process according to another embodiment of the invention.

FIG. 4 is a flow diagram of a device operation process 400 according to another embodiment of the invention. The device operational process 400 is, for example, processing associated with a mobile multi-function device, such as the mobile multi-function device 104 illustrated in FIG. 1.

The device operational process 400 begins with a decision 402. The decision 402 determines whether the mobile multi-function device has been powered on. When the decision 402 determines that the mobile multi-function device has not been powered on, the device operational process 402 awaits power on of the mobile multi-function device. Once the decision 402 determines that the mobile multi-function device has been powered on, the device operational process 400 is effectively invoked. Once the decision 402 determines that the mobile multi-function device has been powered on, a decision 404 determines whether the mobile multi-function device has been enabled.

When the decision 404 determines that the mobile multi-function device has not yet been enabled, the device operational process 400 places 406 the mobile multi-function device in an emergency mode. In the emergency mode, the mobile multi-function device is permitted to make emergency calls only. Next, a decision 408 determines whether the mobile multi-function device is to be powered off. When the decision 408 determines that the mobile multi-function device is not to be powered off, the device operational process 400 returns to repeat the decision 404 to again evaluate whether the mobile multi-function device has been enabled. In an alternative embodiment, when the decision 408 determines that the mobile multi-function device is not to be powered off, the device operation process 400 can remain in the emergency mode and simply repeat the decision 404 until powered off.

Alternatively, when the decision 404 determines that the mobile multi-function device has been enabled, the mobile multi-function device is placed 410 in an active mode. Registration with a wireless network can also be requested 412. In one embodiment, a location update request can be used to request 412 registration with the wireless network. A decision 414 determines whether the registration with the wireless network has been successful. When the decision 414 determines that the registration has been successful, the device operational process 400 permits 416 the mobile multi-function device to perform network and/or non-network operations. Next, a decision 418 determines whether the mobile multi-function device is to be powered off. When the decision 418 determines that the mobile multi-function device has not been powered off, the device operational process 400 returns to repeat the block 416 so that the mobile multi-function device can continue to perform 416 network and/or non-network operations.

On the other hand, when the decision 414 determines that registration with the wireless network has not been successful, then the user of the multi-function device can be notified 422 that the network is unavailable. In one implementation, the notification 422 can be displayed on a display screen for one or both of the multi-function device or a client device connected thereto. Further, the mobile multi-function device can be operated to permit 424 non-network operations. A decision 426 can then determine whether the mobile multi-function device is to be powered off. When the decision 426 determines that the mobile multi-function device is not to be powered off, the device operational process 400 returns to repeat the block 424 so that non-network operations can continue to be performed 424.

When any of the decisions 408, 418 or 426 determine that the mobile multi-function device is to be powered off, the mobile multi-function device can be powered down 420. After the mobile multi-function device has been powered down, the device operational process 400 ends.

Figure 5:
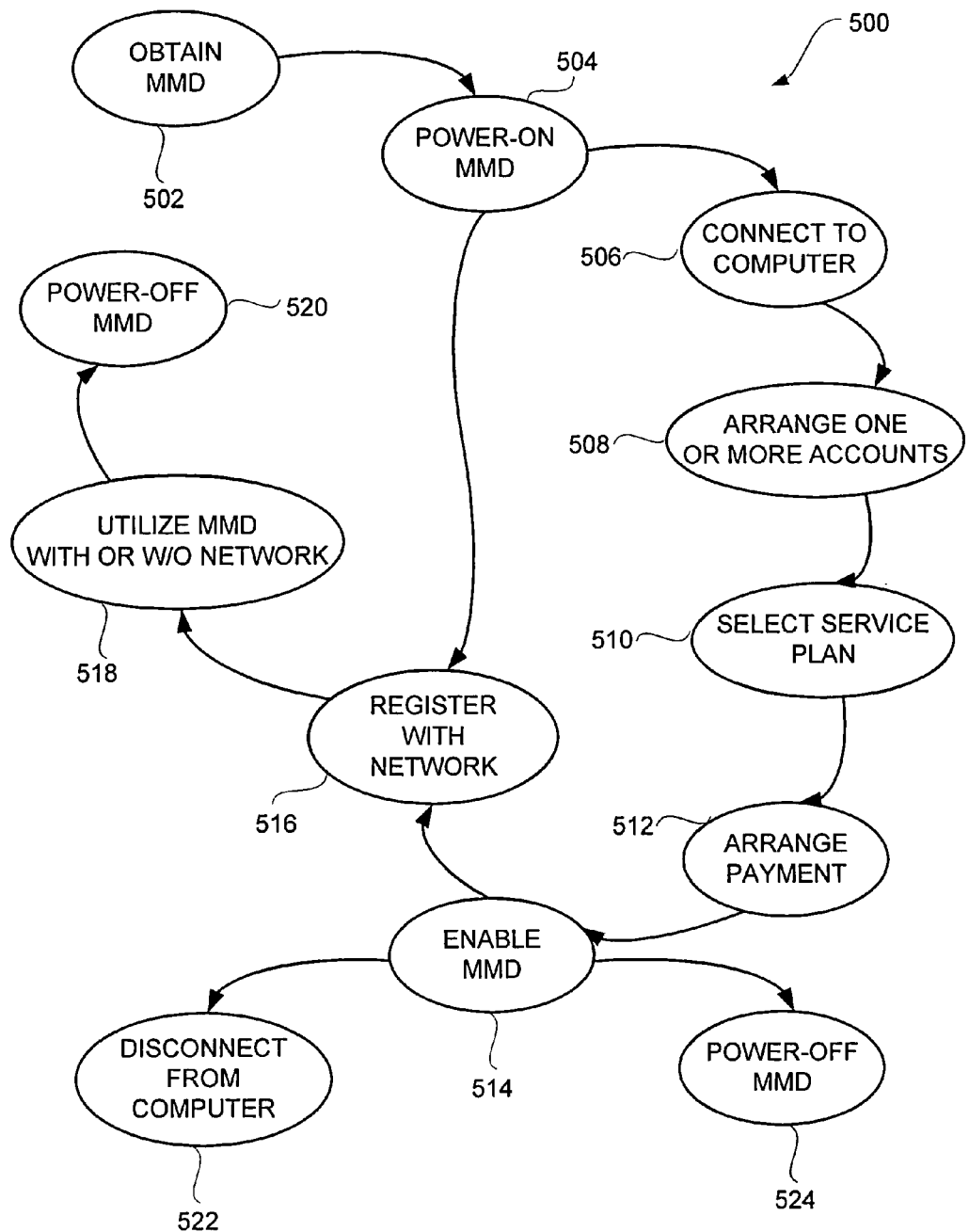
FIG. 5 is a system state diagram according to one embodiment of the invention.

FIG. 5 is a system state diagram 500 according to one embodiment of the invention. The system state diagram 500 illustrates a plurality of states associated with system activation of a mobile multi-function device (MMD) according to one embodiment. At state 502, a mobile multi-function device is obtained. At state 504, following the state 502, the mobile multi-function device is powered-on. Next, at state 506, the mobile multi-function device is connected to a computer, (e.g., personal computer). Thereafter, at state 508, one or more accounts can be arranged. These accounts can pertain to an account with an online media store and/or an account with a wireless service provider. Next, at state 510, a service plan can be selected. Typically, the service plans are associated with a wireless service provider that is providing wireless network access for the mobile multi-function device. In addition, payment can be arranged at state 512. It should also be noted that states 510 and/or 512 could be part of the state 508.

Following state 512, at state 514, the mobile multi-function device can be enabled. Once enabled, the mobile multi-function device is able to be fully utilized. Subsequently, the mobile multi-function device can be registered with a network (e.g., wireless network) at state 516. The registration with the network enables the mobile multi-function device to send and receive calls with respect to the network. Optionally, it should be noted that following the state 504, in the event that the mobile multi-function device was previously enabled, the mobile multi-function device can transition directly to state 516. In any case, once the mobile multi-function device has been registered with the network at state 516, the mobile multi-function device can be utilized with the network at state 518. Following the state 518, the mobile multi-function device can be powered off at state 520. Also, following the state 514, the mobile multi-function device can be disconnected from the computer at state 522 or the mobile multi-function device can be powered off at state 524.

In an alternative embodiment, at state 514, the mobile multi-function device can be enabled for only certain functions or operations. In this manner, the mobile multi-function device can have its available functions or operations controlled such that available functions or operations can be available (and others restricted) at (i) pre-enablement, (ii) post-enablement, and (iii) post-registration.

As such, activation can include one or more of account activation, device activation (i.e., enablement), and network activation (i.e., network setup). In one embodiment, the states 508, 510 and 512 can be considered account activation, and the state 514 can be considered device activation. Following state 512 or state 514 and prior to 516, the network can be setup (i.e., network activation) to support the account for the mobile multi-function device being activated.

Figure 6A:
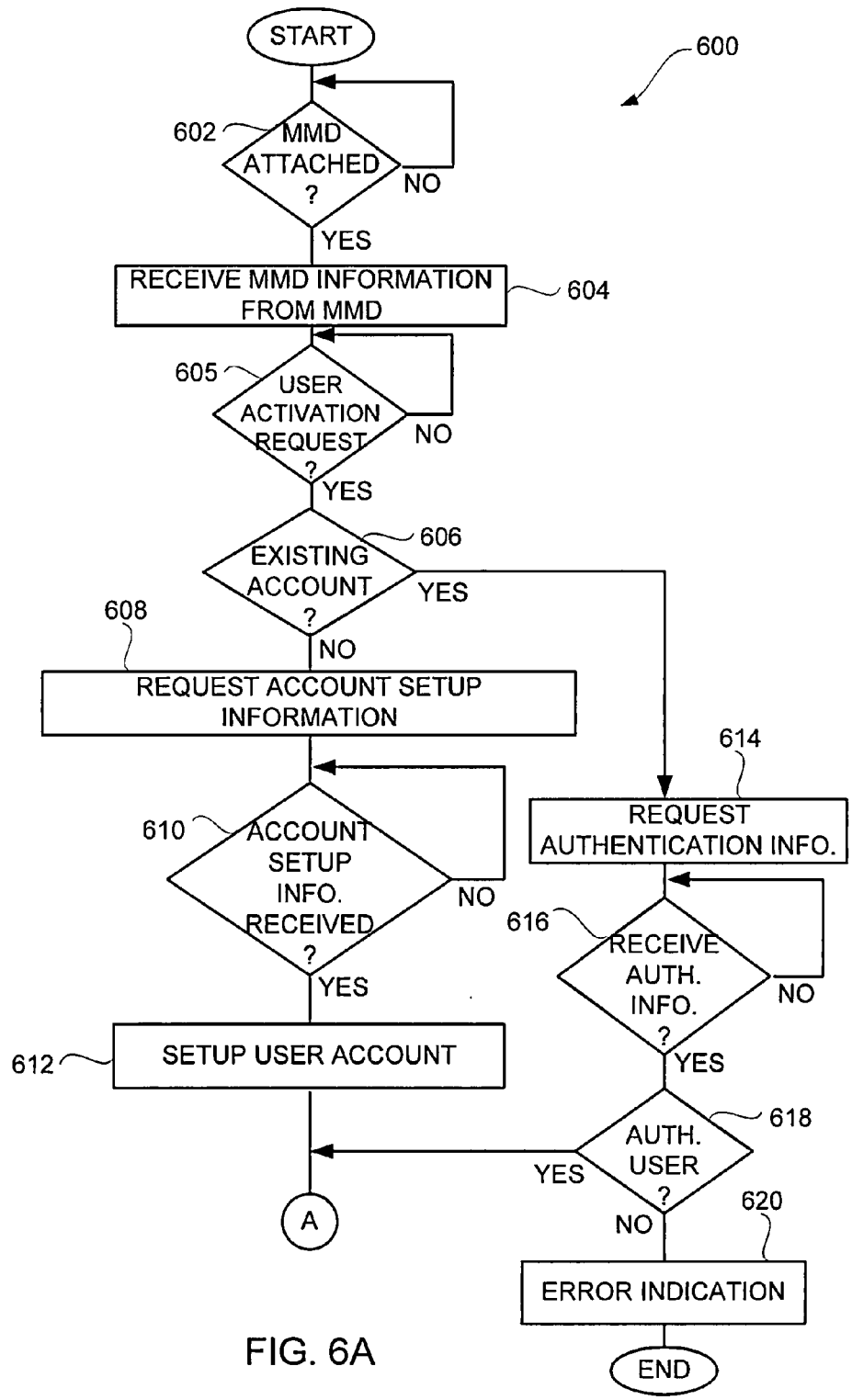
FIGS. 6A-6C are flow diagrams of a network service setup process according to one embodiment of the invention.
Figure 6B:
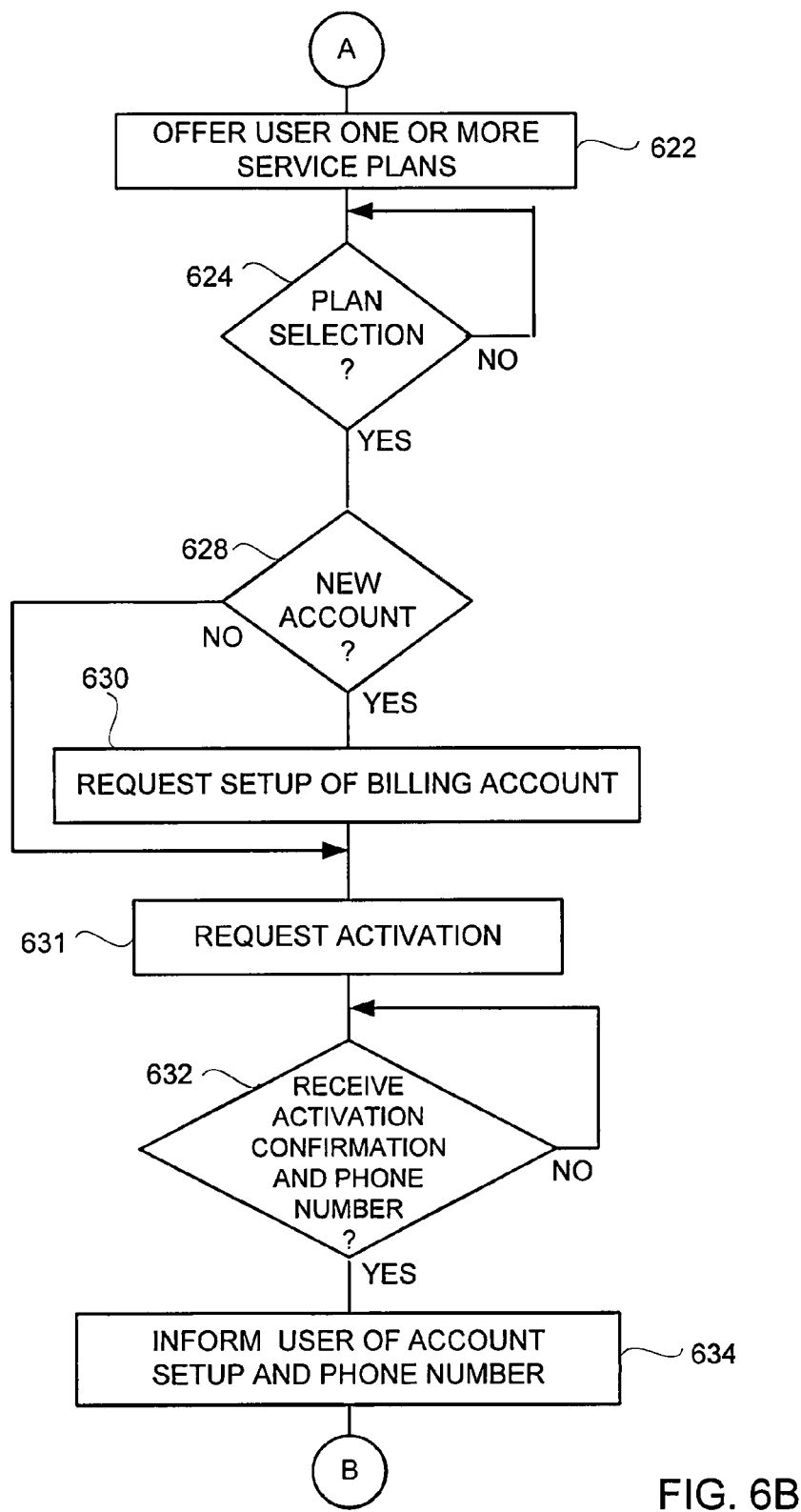
Figure 6C:
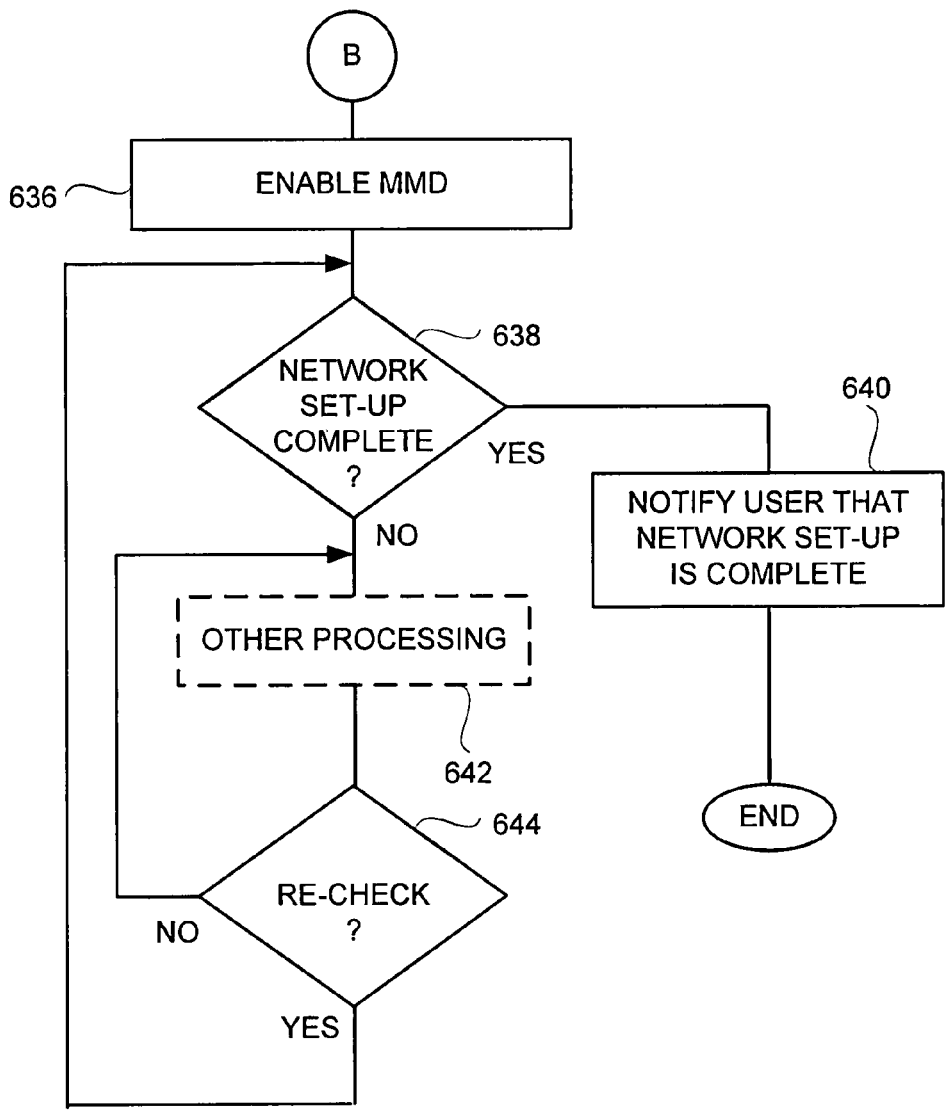

FIGS. 6A-6C are flow diagrams of a network service setup process 600 according to one embodiment of the invention. For example, with reference to FIG. 1, the network service setup process 600 is processing performed when the mobile multi-function device 104 is connected to the client machine 102 illustrated in FIG. 1 so that interaction with the activation server 112 can be performed to setup service for the mobile multi-function device 104.

The network service setup process 600 can begin with a decision 602 that determines whether the mobile multi-function device is attached to the client machine (e.g., personal computer). When the decision 602 determines that the mobile multi-function device is not attached, then the network service setup process 600 is not performed. On the other hand, when the decision 602 determines that the mobile multi-function device is attached, the network service setup process 600 can be performed. In one embodiment, the network setup process 600 can be automatically initiated where the mobile multi-function device is attached to the client machine.

When the network setup process 600 is performed, mobile multi-function device (MMD) information is received 604 from the mobile multi-function device. Next, a decision 605 determines whether a user activation request has been received. When the decision 605 determines that a user activation request has not been received, the network service setup process 600 can await a user activation request. A user can request activation of the mobile multi-function device. In one example, the user can specify whether the activation of the mobile multi-function device is to be associated with a new account or an existing account. On the other hand, when the decision 605 determines that a user activation request has been received, a decision 606 can then determine whether the mobile multi-function device is to be subject to an existing account. The decision 606 can be based on the user activation request which can indicate whether the activation of the mobile multi-function device is to be associated with a new account or an existing account. When the decision 606 determines that the mobile multi-function device is not subject to an existing account, account setup information is requested 608. The account setup information is information used to setup a new account. The account setup information can, for example, be provided by user. A decision 610 then determines whether the account setup information has been received. When the decision 610 determines that the account setup information has not yet been received, the network service setup process 600 awaits such information. Once the decision 610 determines that the account setup information has been received, a user account can be setup 612. The user account can pertains to a user account with a wireless service provider, an online media store, and/or some other account. The user account contains information concerning the user and often includes personal information and financial information.

On the other hand, when the decision 606 determines that an existing account is associated with the mobile multi-function device, authentication information can be requested 614. A decision 616 can then determine whether the authentication information has been received. When the decision 616 determines that the authentication information has not yet been received, the network service setup process 600 can await such information. Alternatively, when the decision 616 determines that the authentication information has been received, a decision 618 can determine whether the user is authenticated for access to the existing account. When the decision 618 determines that the user has not been authenticated, an error indication 620 can be provided. Following the block 620, the network service setup process 600 can end with network setup not being completed.

Following the block 612 or following the decision 618 when the user has been properly authenticated, the user can be offered 622 one or more service plans. In one embodiment, the one or more service plans being offered 622 can depending on a credit evaluation (e.g., credit score) for the user. For example, a user having poor credit can be only offered service plans that require prepayment. A decision 624 then determines whether a plan has been selected but the user. When the decision 624 determines that a plan has not yet been selected, the network service setup process 600 awaits such a selection. Once the decision 624 determines that a plan has been selected, a decision 628 determines whether a new account is being processed. When the decision 628 determines that a new account is being processed, setup of a billing account can be requested 630. However, when the decision 628 determines that an existing account is being processed, the block 630 can be bypassed. The request 630 can include payment information, such as payment information provided by the user. In one embodiment, the network setup process 600 already received or has access to the payment information to be used for the account. As one example, the account setup information can include the billing account information. In another embodiment, the network setup process 600 can request and receive the payment information prior to the request 630. When the decision 628 determines that payment information has not yet been received, the network service setup process 600 can await receipt of the payment information. Once the decision 628 determines that the payment information has been received, setup of a billing account can be requested 630.

Thereafter, activation of the account for the user can be requested 631. A decision 632 can then determine whether activation confirmation and phone number for the account being established have been received. When the activation confirmation and phone number have not been received, the network service setup process 600 can await such information. Alternatively, when the decision 632 determines that the activation confirmation and phone number have been received, the user can be informed 634 of successful account setup and the appropriate phone number.

Following the block 634, the mobile multi-function device is enabled 636. In one implementation, the client machine 102 can write certain information into data storage on the mobile multi-function device 104 to inform the mobile multi-function device 104 that the device is now enabled. The mobile multi-function device can then self-determine whether the device is enabled by reading the stored information. Following the block 636 the mobile multi-function device can be disconnected from the client machine.

In any case, following the block 636, a decision 638 determines whether network setup has been completed. When the decision 638 determines that network setup has been completed, the user can be notified 640 that network setup has completed. The notification can alert the user to perform an action with respect to the mobile multi-function device so that the mobile multi-function device can register with the network and thereafter be utilized thereon. As an example, the notification can be provided to the user by displaying an indication or by sending an electronic message (e.g., email or text message) to the associated client machine. For example, the user can be instructed by the notification to power cycle the mobile multi-function device or connect the mobile multi-function device to the client machine. Following the block 640, the network service setup process 600 ends.

On the other hand, when the decision 638 determines that the network setup is not complete, the network service setup process 600 can perform other processing 642 unassociated with the network setup. For example, the other processing 642 can pertain to the synchronization of data between the client machine 102 and the mobile multi-function device 104. The other processing 642 can also pertain to media playback at the mobile multi-function device, setting of preferences at the mobile multi-function device or at the client machine, etc. Following the block 642, a decision 644 can determine whether completion of the network setup for the mobile multi-function device should be re-checked. In one embodiment, the completion of the network setup can be re-checked periodically (e.g., every 2 minutes). Typically, if the network setup has not properly completed after a number of attempts or period of time, the network service setup process 600 could end and inform the use that the network service was not able to be setup. In any case, when the decision 644 determines that the network setup should be re-checked, the network service setup process 600 can repeat the decision 638 and subsequent blocks to again determine whether network setup has completed. Alternatively, when the decision 644 determines that the network setup should not be re-checked, the network service setup process 600 can repeat the block 642 so that other processing can optionally be performed.

Figure 6D:
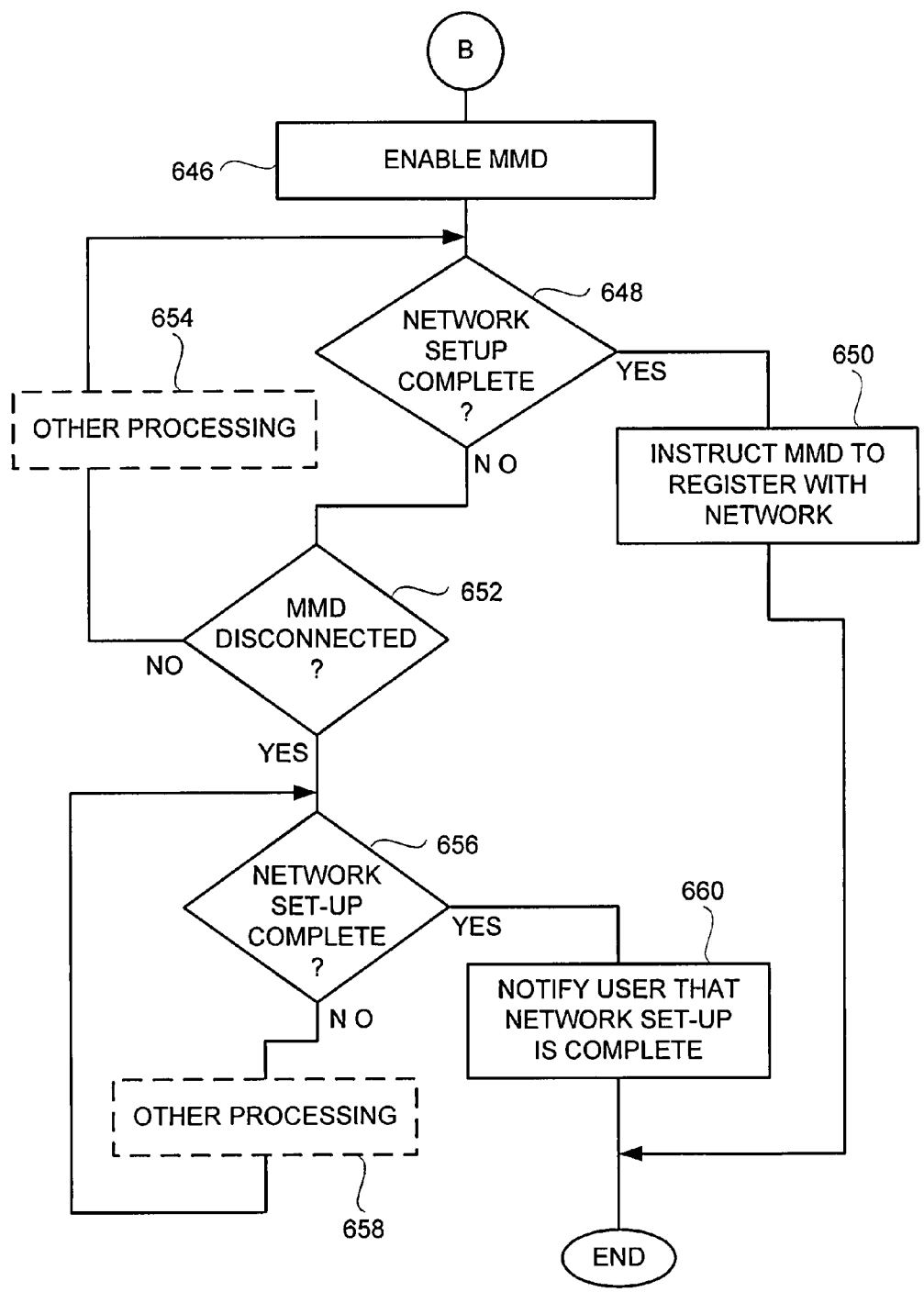
FIG. 6D is a flow diagram of an alternative portion of the network service setup process according to one embodiment of the invention.

FIG. 6D is a flow diagram of an alternative portion of the network service setup process 600 according to one embodiment of the invention. In particular, the blocks 646-660 illustrated in FIG. 6D represent an alternative embodiment for the portion of the network service setup process 600 illustrated in FIG. 6C, namely, blocks 636-644. Following the block 634, the mobile multi-function device is enabled 646. In one implementation, the client machine 102 can write certain information into data storage on the mobile multi-function device 104 to inform the mobile multi-function device 104 that the device is now enabled. The mobile multi-function device can then self-determine whether the device is enabled by reading the stored information. In any case, following the block 646, a decision 648 determines whether network setup has been completed. When the decision 648 determines that network setup has been completed, the mobile multi-function device can be instructed 650 to register with the network. The mobile multi-function device can be instructed 650 to register with the network by causing a location update to be issued from the mobile multi-function device. In one implementation, the client machine 102 can send a command to the mobile multi-function device 104 to initiate the location update. In another implementation, the client machine 102 can cause the mobile multi-function device 104 to reset its radio transmitter/receiver (i.e., a portion of its hardware) so as to trigger a location update.

On the other hand, when the decision 648 determines that the network setup is not complete, a decision 652 determines whether the mobile multi-function device has been disconnected from the client machine. When the decision 652 determines that the mobile multi-function device has not been disconnected, the network service setup process 600 can perform other processing 654 unassociated with the network setup. For example, the other processing 654 can pertain to the synchronization of data between the client machine 102 and the mobile multi-function device 104. The other processing can also pertain to media playback at the mobile multi-function device, setting of preferences at the mobile multi-function device or at the client machine, etc. Following the block 654, the network service setup process 600 returns to repeat the decision 648 to again determine whether network setup has completed.

Alternatively, when the decision 652 determines that the mobile multi-function device has been disconnected from the client machine, a decision 656 determines whether network setup has completed. When the decision 656 determines that network setup has not completed, other processing 658 can be performed until the network setup has completed. Alternatively, when the decision 656 determines that network setup has completed, the user can be notified 660 that network setup has completed. The notification can alert the user to perform an action with respect to the mobile multi-function device so that the mobile multi-function device can register with the network and thereafter be utilized thereon. As an example, the notification can be provided to the user by displaying an indication or by sending an electronic message (e.g., email or text message) to the user. The electronic message can, for example, be sent to the mobile multi-function device or the associated client machine. For example, the user can be instructed by the notification to power cycle the mobile multi-function device or connect the mobile multi-function device to the client machine. Following the blocks 650 and 660, the network service setup process 600 ends.

In one embodiment, the mobile multi-function device can store information that can be used to determine whether the mobile multi-function device is enabled. For example, the mobile multi-function device can stored an identifier (e.g., activation identifier) that is provided by a client machine once the mobile multi-function device is to be enabled. In one embodiment, the identifier is stored in a secured manner, such as through use of encryption, digital certificate or other cryptographic technique. The identifier can include or be based on a Subscriber Identity Module (SIM) that is included in the mobile multi-function device while activated. In one implementation, a SIM value, such as a SIM card identifier (e.g., ICCID), read from the SIM card itself within the mobile multi-function device is compared to the identifier stored in a data store (e.g., Flash memory) within the mobile multi-function device. If the identifier matches the read SIM value, then the mobile multi-function device has previously been enabled. As such, the mobile multi-function device can self-determine whether it has been enabled. This enablement verification can, for example, prevent different SIM cards from being used with a mobile multi-function device that has been previously activated while using a different SIM card. An alternative to a SIM is a Universal Subscriber Identity Module (USIM). SIM cards are used with GSM type wireless networks. Other types of networks, such as CMDA, can use other identifiers. Often the identifiers in other networks are not removable from the multi-function device by users. In such cases, the identifier is stored within the device itself such that the identifier is not removable from the device. In such cases, the mobile multi-function device can simply store a flag that indicates whether or not the mobile multi-function device is enabled.

Figure 7:
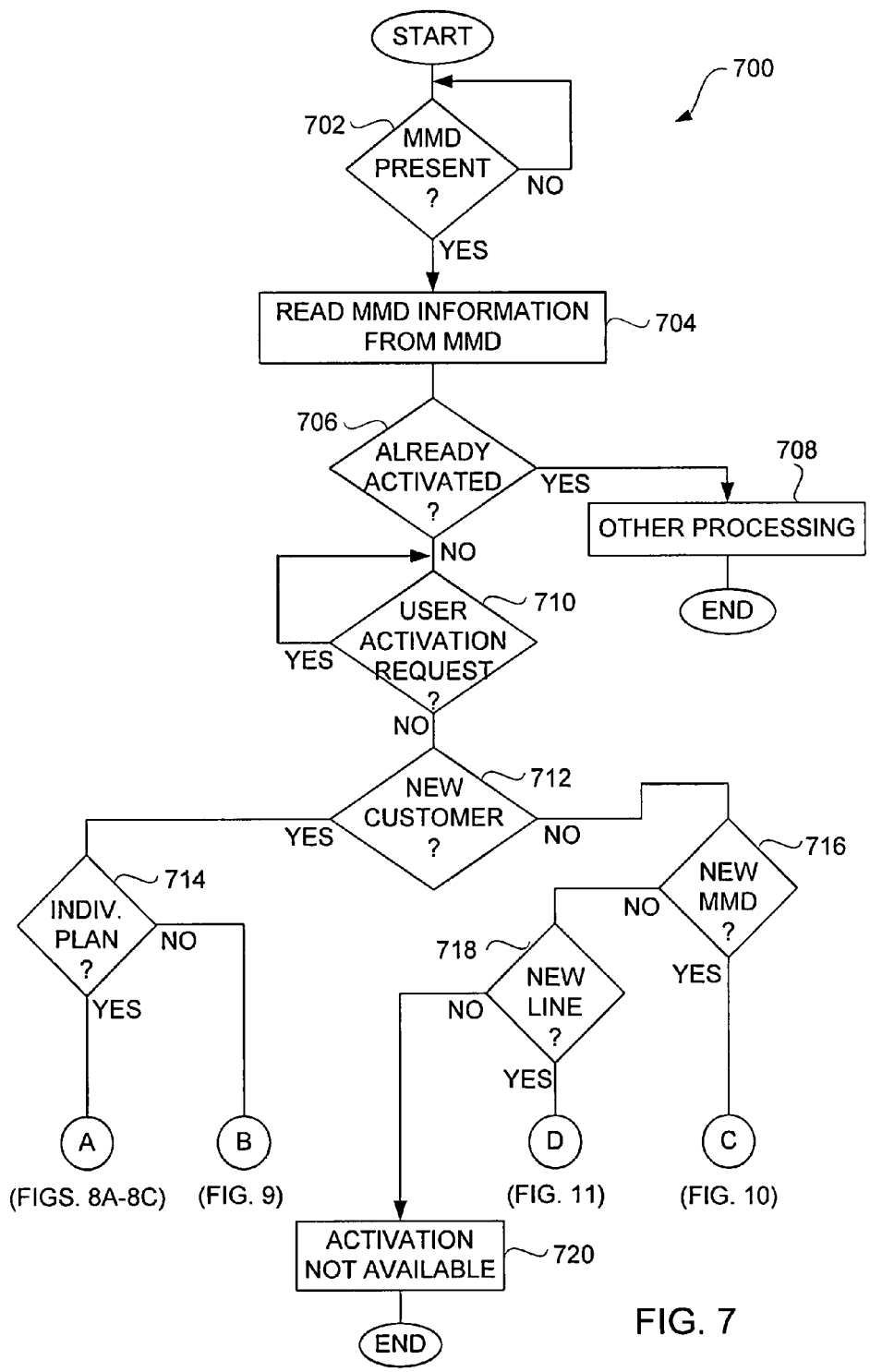
FIG. 7 is a flow diagram of a network service setup process according to one embodiment of the invention.

FIG. 7 is a flow diagram of a network service setup process 700 according to one embodiment of the invention. The network service setup process 700 is, for example, processing performed when activating a Mobile Multi-function Device (MMD). For example, the network service setup process 700 can be associated with processing performed when the mobile multi-function device 104 is connected to the client machine 102 illustrated in FIG. 1 so that interaction with the activation server 112 can be performed via the client machine 102 to setup service for the mobile multi-function device 104.

The network service setup process 700 can begin with a decision 702 that determines whether the mobile multi-function device is attached to the client machine (e.g., personal computer). When the decision 702 determines that the mobile multi-function device is not attached, the network service setup process 700 is not performed. On the other hand, when the decision 702 determines that the mobile multi-function device is attached, the network service setup process 700 can be performed. Once the decision 702 determines that the mobile multi-function device is attached, Mobile Multi-function Device (MMD) information can be read 704 from the multi-function device. In one embodiment, the MMD information can be encrypted so as to prevent unauthorized access. For additional details on preventing unauthorized access to device information, such as the MMD information, see, for example, U.S. patent application Ser. No. 11/767,447, filed Jun. 22, 2007, and entitled "DEVICE ACTIVATION AND ACCESS," which is hereby incorporated by reference herein. After the MMD information has been read 704, a decision 706 determines whether the mobile multi-function device has already been activated. When the decision 706 determines that the mobile multi-function device has already been activated, then other processing 708 can be performed In other words, in one embodiment, the mobile multi-function device can perform various other processing 708 supported by the device given that the device has been activated. In this regard, the mobile multi-function device can utilize network service. Following the block 708, since the mobile multi-function device has already been activated, the network service setup process 700 can end.

When the decision 706 determines that the mobile multi-function device has not already been activated, a decision 710 determines that a user activation request has been received. When the decision 710 determines that a user activation request has not been received, the network service setup process 700 awaits a user activation request. Alternatively, when the decision 710 determines that a user activation request has been received, a decision 712 determines whether the user is a new customer. When the decision 712 determines that the user is a new customer, a decision 714 determines whether the customer desires an individual plan or a family plan. When the decision 714 determines that the customer desires an individual plan, processing proceeds to FIGS. 8A-8C where an activation process for an individual plan is described. On the other hand, when the decision 714 determines that the customer desires a family plan, processing proceeds to FIG. 9 where an activation process for a family plan is described.

On the other hand, when the decision 712 determines that the user is not a new customer, but is instead an existing customer, then a decision 716 determines whether the mobile multi-function device is a new device being substituted for a previously activated device. When the decision 716 determines that the mobile multi-function device is a new device, then processing proceeds to FIG. 10 where an activation process for an existing account is described. Alternatively, when the decision 716 determines that the mobile multi-function device is not new, a decision 718 can determine whether a new line is to be added to an existing account. When the decision 718 determines that a new line is to be added to an existing account, then processing proceeds to FIG. 11 where an activation process for a new line is described. Alternatively, when the decision 718 determines that a new line is not to be provided, then activation can be deemed 720 unavailable. Following the block 720, the network service setup process 700 can end.

Figure 8A:
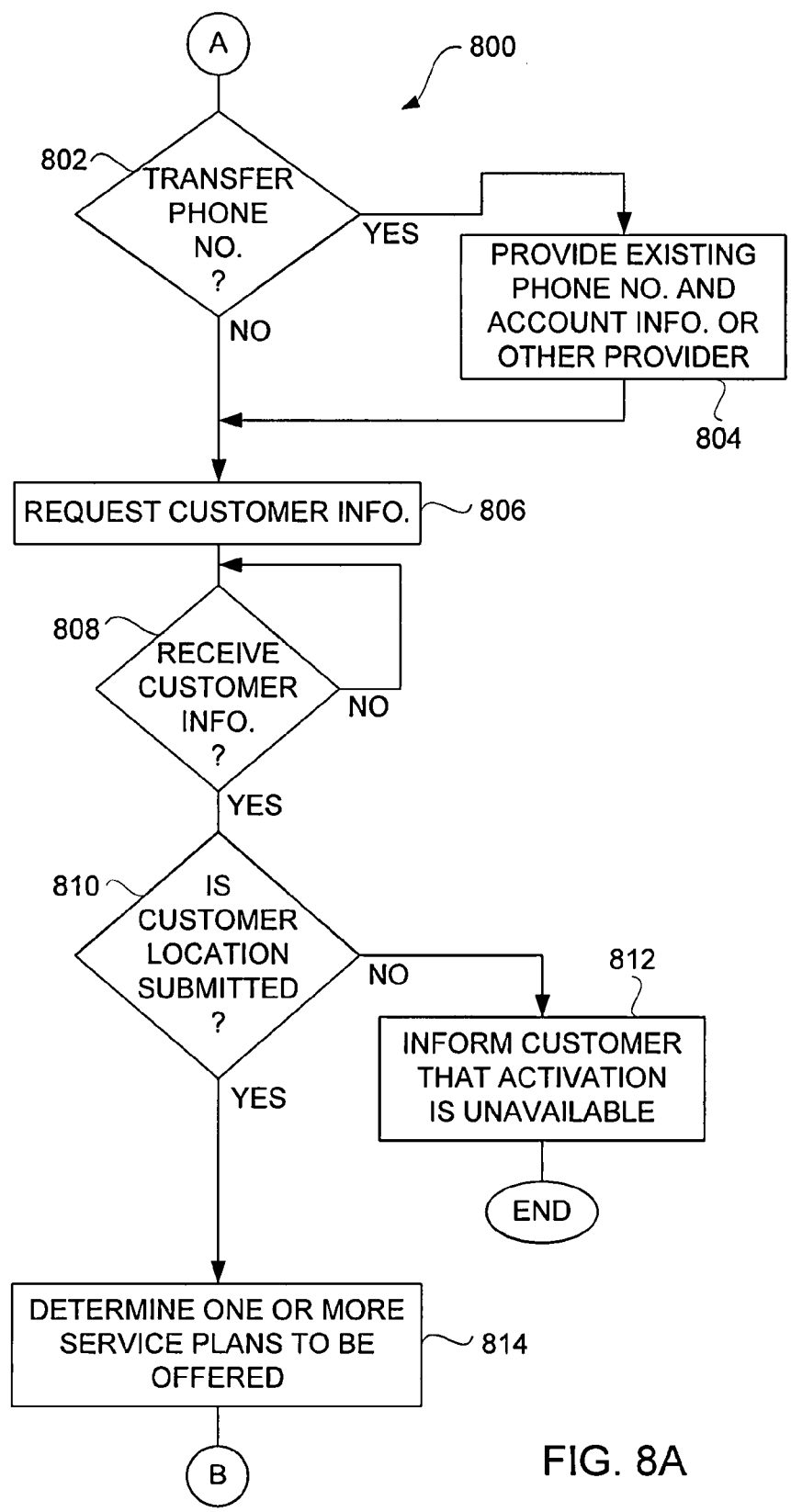
FIGS. 8A-8C are flow diagrams of an activation process according to one embodiment of the invention.
Figure 8B:
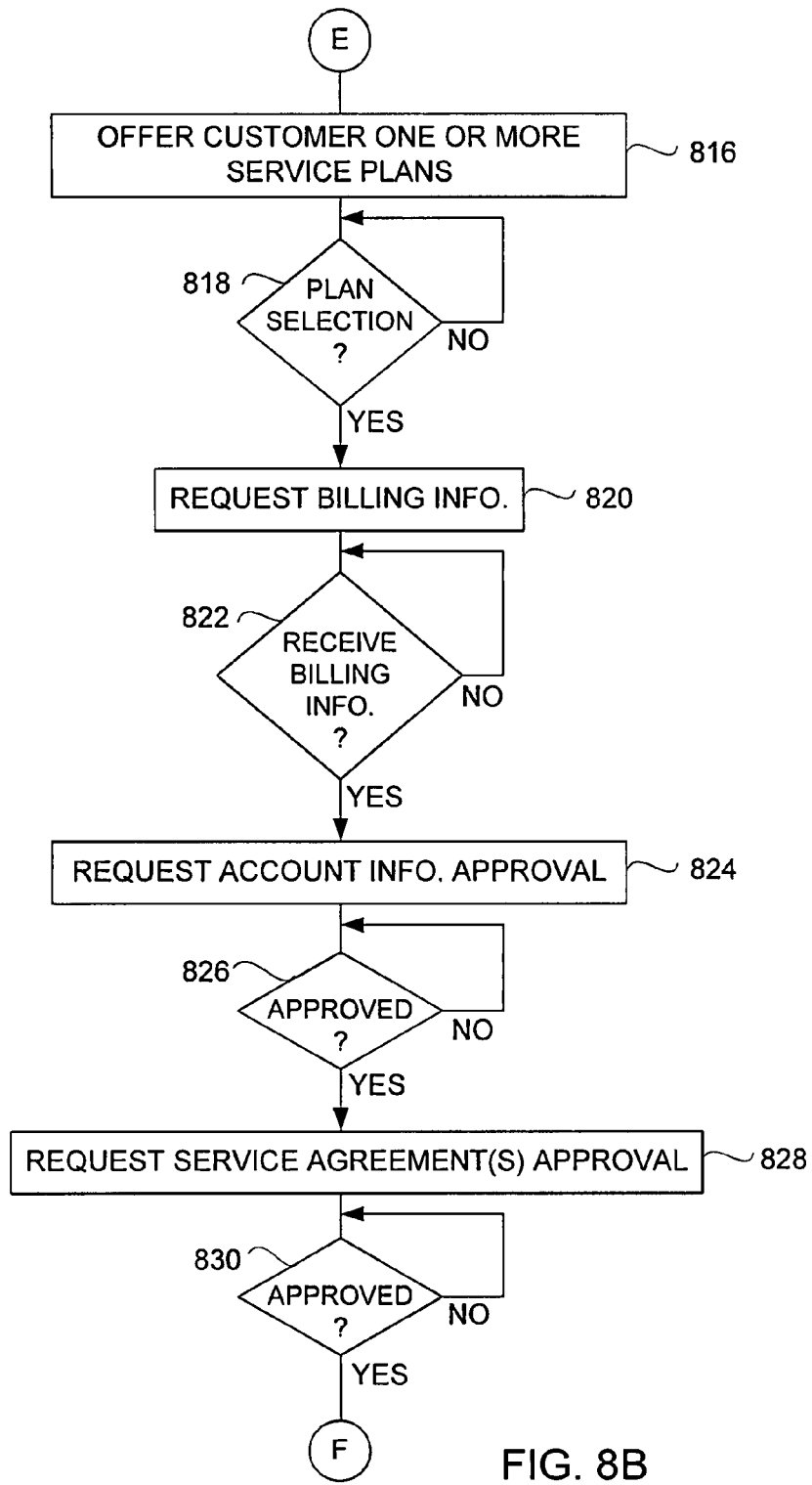
Figure 8C:
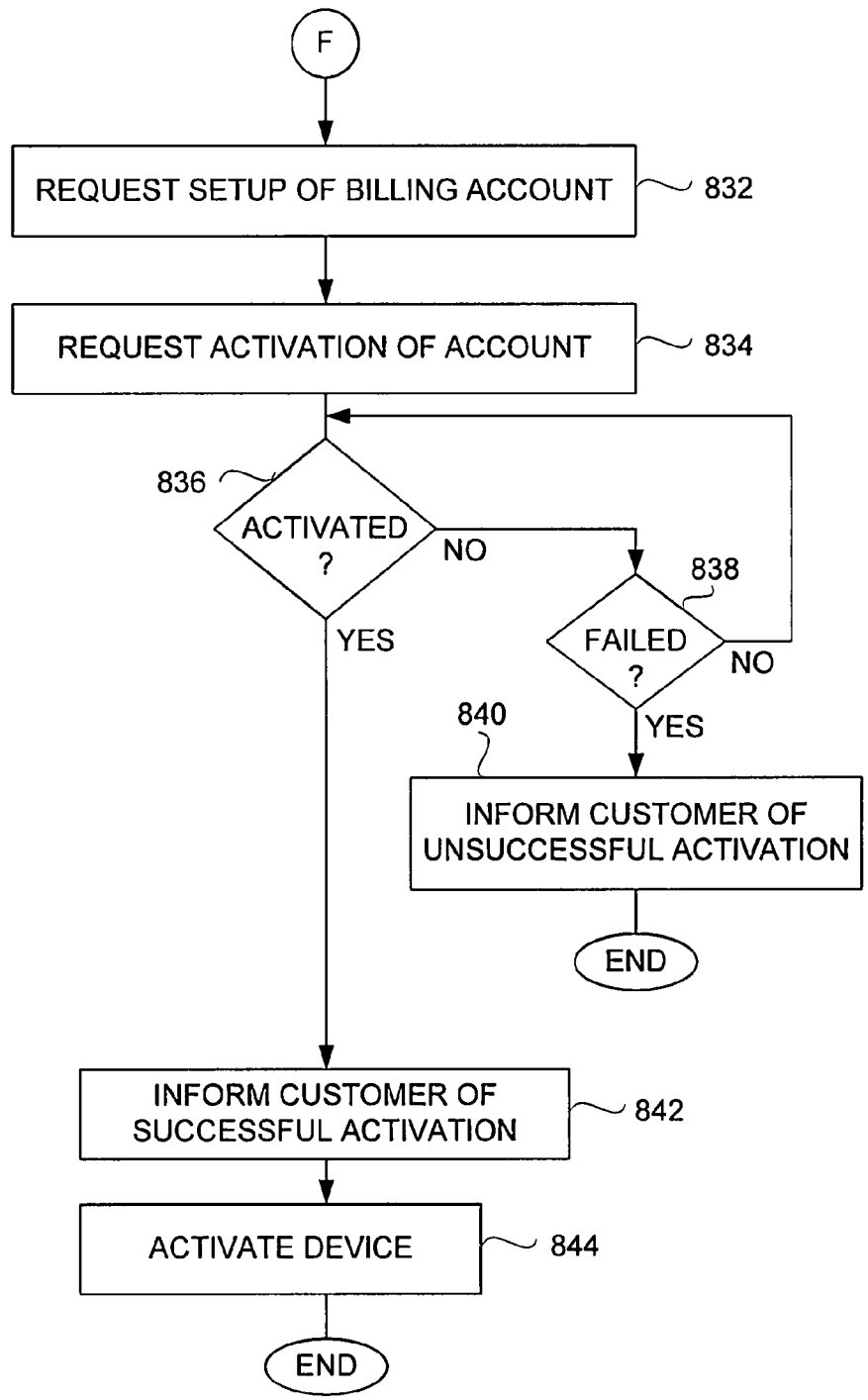

FIGS. 8A-8C are flow diagrams of an activation process 800 according to one embodiment of the invention. The activation process 800 corresponds to activation of a mobile multi-function device with respect to an individual user plan.

The activation process 800 can begin with a decision 802 that determines whether a phone number is to be transferred. A phone number that can be transferred can be associated with another service provider. Typically, the phone number eligible to be transferred is from another wireless service provider. However, more generally, the phone number eligible to be transferred can correspond to either a wireless account or a land line account. In any case, when the decision 802 determines that a phone number is to be transferred, an existing phone number and account information for another service provider are provided 804. Typically, the customer will interact with a graphical user interface to provide the information regarding the existing phone number and account information.

Following the block 804 as well as directly following the decision 802 when a phone number is not to be transferred, customer information can be requested 806. The customer information can include name, address, date of birth, security question(s), e-mail address, account identifier, etc. The customer information can be utilized for one or more accounts that are to be established with one or more service providers. A decision 808 determines whether the customer information has been received. When the decision 808 determines that the customer information has not been received, the activation process 800 can await the customer information.

After the decision 808 determines that the customer information has been received, a decision 810 can determine whether the location of the customer is supported. Here, the service provider typically only supports specific geographical locations. Hence, the customer location can be examined to determine whether it is within a geographical location supported by the system. Hence, when the decision 810 determines that the customer location is not supported by the system of the service provider, the customer can be informed 812 that activation is unavailable. Following the block 812, the activation process 800 can end without activating the mobile multi-function device.

On the other hand, when the decision 810 determines that the customer location is supported by the system of the service provider, one or more service plans to be offered to the customer can be determined 814. Next, the one or more service plans are offered 816 to the customer. A decision 818 then determines whether the customer has selected one of the service plans. When the decision 818 determines that a service plan has not yet been selected, the activation process 800 can await a plan selection. Alternatively, when the decision 818 determines that a service plan has been selected, billing information can be requested 820. The billing information can be utilized by one or more service providers. A decision 822 determines whether the billing information has been received. When the decision 822 determines that the requested billing information has not been received, the activation process 800 can await the billing information. Once the decision 822 determines that the billing information has been received, account information approval is requested 824. The account information approval can pertain to approval of the customer for the account to be activated. In one example, the account information would be presented to the customer for review and approval. A decision 826 determines whether the account information has been approved. When the decision 826 determines that the account information has not yet been approved, the activation process 800 can await such approval.

Once the decision 826 determines that the account information has been approved, the activation process 800 requests 828 approval of one or more service agreements. In one example, the one or more service agreements would be presented to the customer for review and acceptance. A decision 830 then determines whether the one or more service agreements had been approved. When the decision 830 determines that the one or more service agreements have not been approved, then the activation process 800 can await such approval. Once the decision 830 determines that the one or more service agreements have been approved, setup of a billing account can be requested 832. A remote server associated with a service provider can receive and process the request to setup a billing account for the customer. The setup of the billing account can utilize the customer information and/or the billing information that has been previously obtained by the activation process 800. Billing accounts can be setup in this manner for one or more service providers.

Additionally, the activation process 800 can request activation of an account. In other words, the activation being requested 834 can correspond to an account activation process. The account activation can be perform by a remote server, e.g., activation server, associated with a service provider. Following the request 834 for activation of an account, a decision 836 can determines whether the account has been activated. When the decision 836 determines that the account has not yet been activated, a decision 838 can determine whether the account activation has failed. When the decision 838 determines that the account activation has not failed, the activation process 800 can return to repeat the decision 836. Alternatively, when the decision 838 determines that the account information has failed, the customer can be informed 840 of unsuccessful activation. Following the block 840, the activation process 800 ends.

On the other hand, when the decision 836 determines that the account associated with the customer has been activated, the customer can be informed 842 of the successful activation. Thereafter, the mobile multi-function device can be activated 844. The activation 844 of the mobile multi-function device can, for example, be processing described above with reference to FIG. 6C or 6D.

Figure 9:
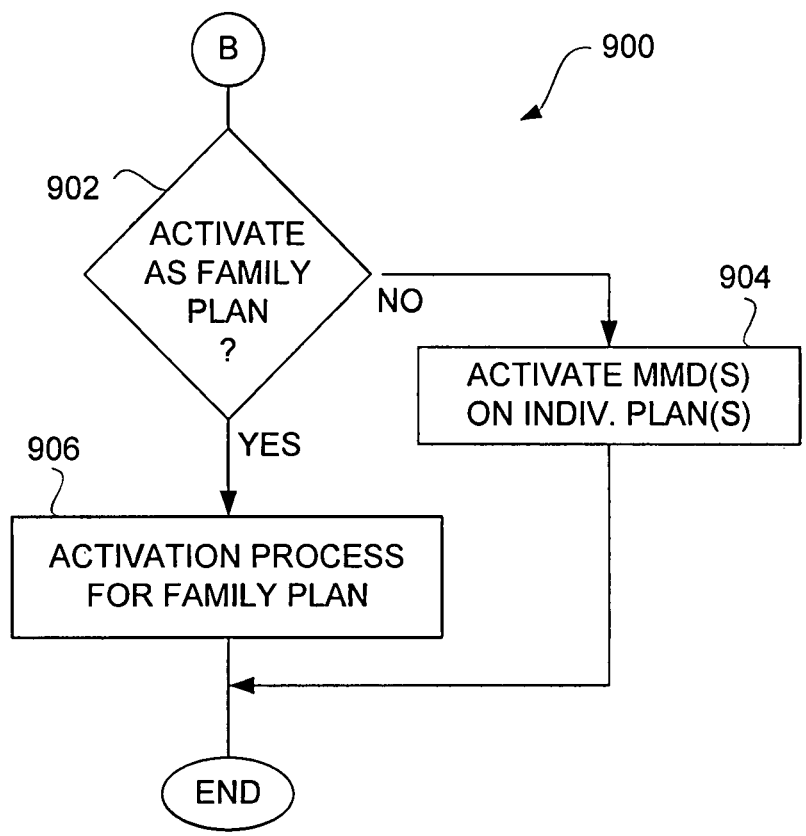
FIG. 9 is a flow diagram of an activation process according to another embodiment of the invention.

FIG. 9 is a flow diagram of an activation process 900 according to another embodiment of the invention. The activation process 900 is, for example, processing associated with activating a mobile multi-function device for use on a family plan.

The activation process 900 can begin with a decision 902 that determines whether the mobile multi-function device is to be activated as a family plan. When the decision 902 determines that the mobile multi-function device is not to be activated as a family plan then the mobile multi-function device can alternatively be activated 904 on an individual plan basis. When the decision 902 determines that the mobile multi-function device is to be activated as a family plan, an activation process 906 can be carried out for a family plan. The activation process for a family plan is generally similar to the processing illustrated in FIGS. 8A-8C; however, the account being established is a family account not an individual account and also the service plans normally differ because they pertain to family plans. Following the blocks 904 and 906, the activation process 900 for a family plan is complete.

Figure 10:
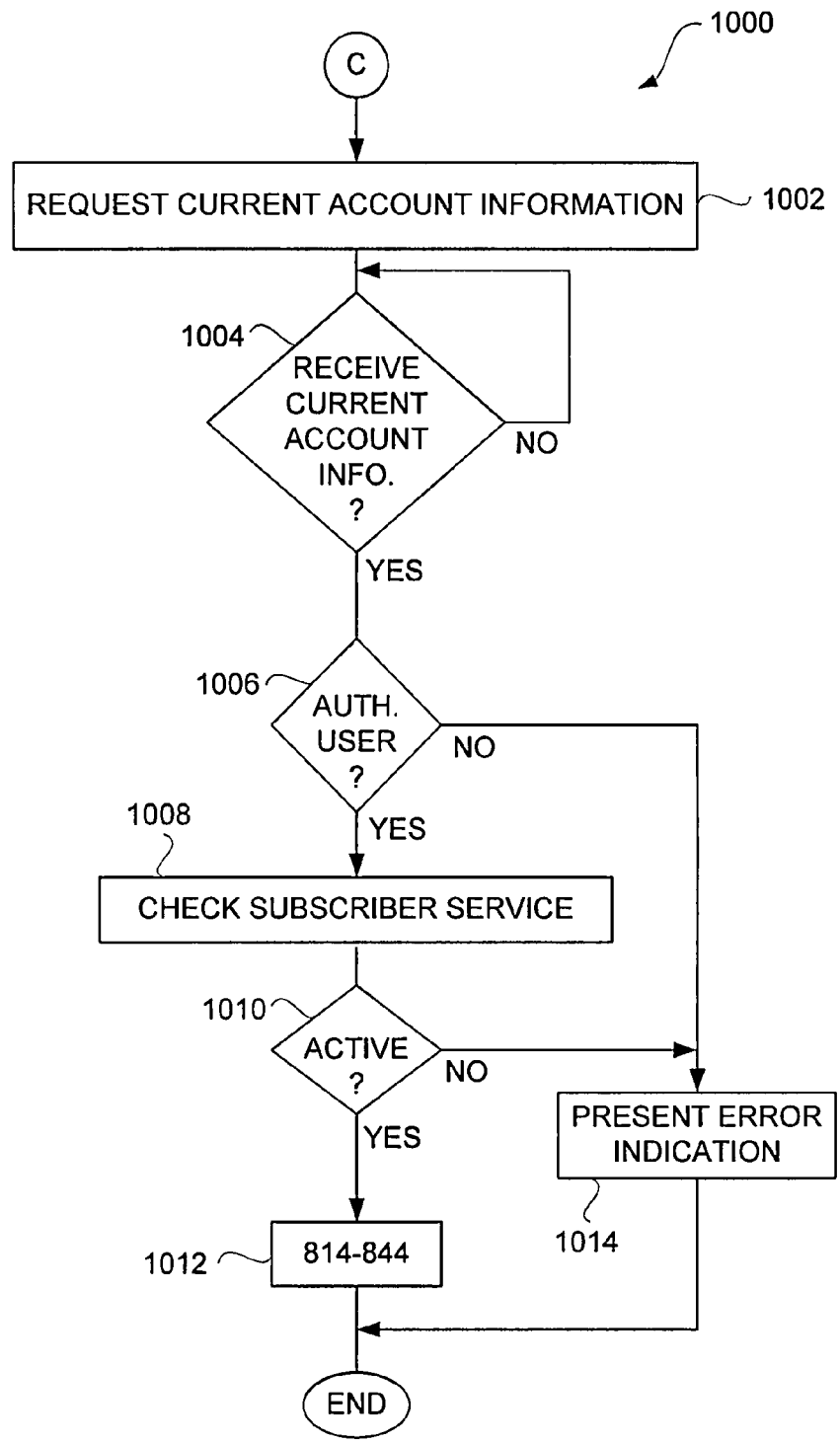
FIG. 10 is a flow diagram of an activation process according to another embodiment of the invention.

FIG. 10 is a flow diagram of an activation process 1000 according to another embodiment of the invention. The activation process 1000 is, for example, processing associated with activation of a new mobile multi-function device by an existing customer of the service provider.

The activation process 1000 can request 1002 current account information. Typically, the current account information would be requested 1002 from a customer attempting to activate a mobile multi-function device. A decision 1004 then determines whether the current account information has been received. In one embodiment, the current account information is received from the customer through interaction with a graphical user interface. The current account information is requested so that the customer's current account can be identified. When the decision 1004 determines that the current account information has not been received, the activation process 1000 can await the current account information.

Once the decision 1004 determines that the current account information has been received, a decision 1006 determines whether the user is authenticated. The authentication of the customer (user) can be achieved in a variety of different ways, including use of a user name, password, and/or a security question, etc. Hence, authenticating the user typically requires user data entry. When the decision 1006 determines that the customer (user) is authorized with respect to the current account, a subscriber status for the current account can be checked 1008. A decision 1010 can then determine whether the account for the subscriber is active. When the decision 1010 determines that the account for the subscriber is active, then processing associated with blocks 814-844 are the activation process 800 illustrated in FIG. 8A-8C can be performed 1012 to activate an account (new or update to existing account) and also activate the mobile multi-function device. On the other hand, when the decision 1006 determines that the user is not authenticated or when the decision 1010 determines that the account is not active, an error indication can be presented 1014. As an example, the error indication can be presented 1014 by a graphical user interface that informs the customer that activation is not available. Following the block 1012 or the block 1014, the activation process 1000 can end.

Figure 11:
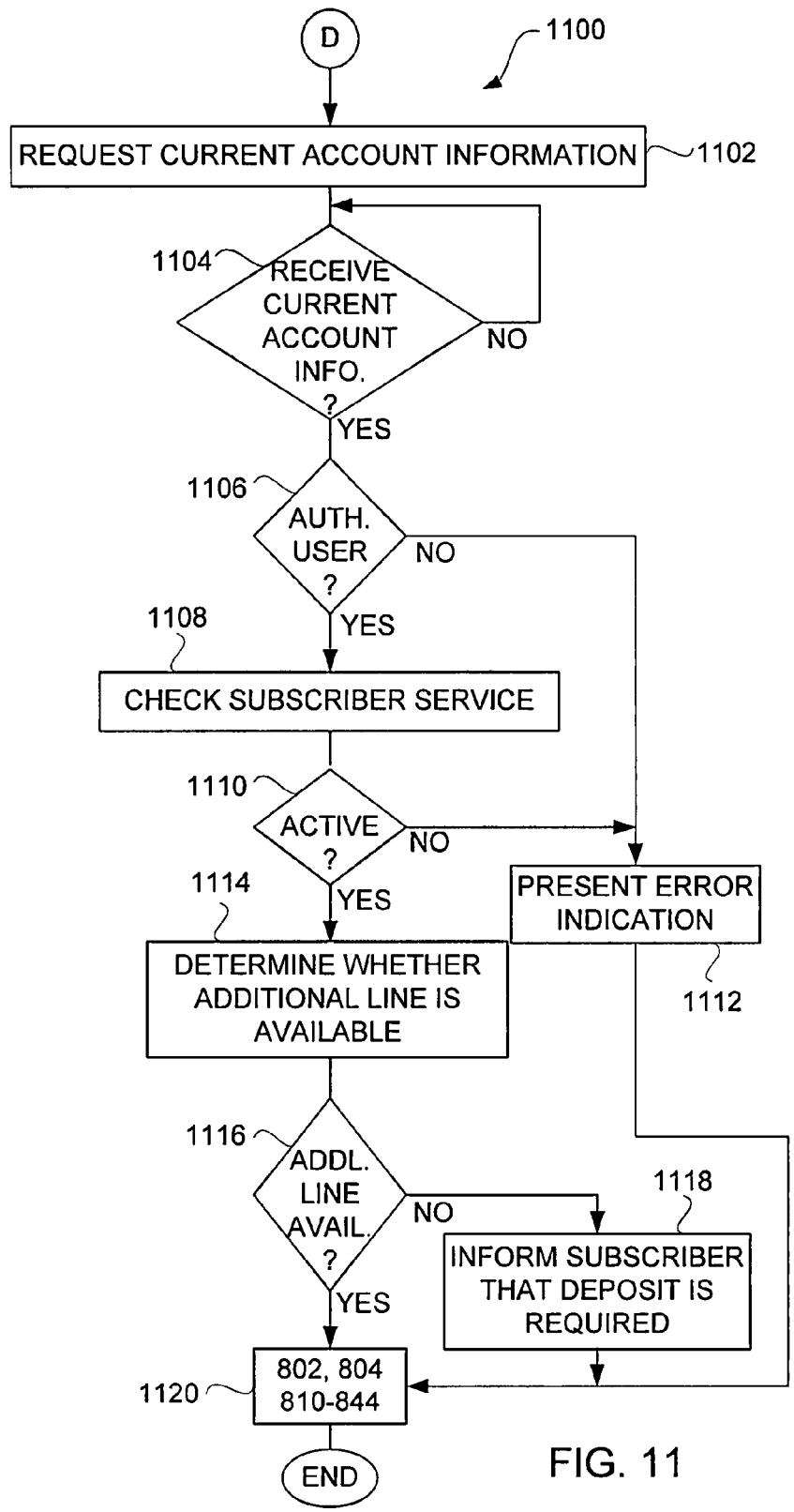
FIG. 11 is a flow diagram of an activation process according to another embodiment of the invention.

FIG. 11 is a flow diagram of an activation process 1100 according to another embodiment of the invention. The activation process 1100 is concerned with adding an additional line to an existing account with a network service provider.

The activation process 1000 can request 1102 current account information. Typically, the current account information would be requested 1102 from a customer attempting to activate a mobile multi-function device. A decision 1104 determines whether the current account information associated with the customer has been received. In one embodiment, the current account information is received from the customer through interaction with a graphical user interface. When the decision 1104 determines that the current account information has not been received, the activation process 1100 can await the current account information. Alternatively, when the decision 1104 determines that the current account information has been received, a decision 1106 can determine whether the customer (user) is authorized to access the client account (or its information). When the decision 1106 determines that the customer (user) is authenticated and able to access the account, a subscriber status for the account is checked 1108. A decision 1110 can then determine whether the account associated with the subscriber (customer) is active. When the decision 1110 determines that the account associated with the subscriber is inactive (i.e., not active), an error indication can be presented 1112. In the event that the account associated with the subscriber is inactive, the error indication being presented 1112 can inform the customer that they are unable to add a new line to an existing account because the account is inactive.

On the other hand, when the decision 1110 determines that the account associated with the subscriber is active, the activation process 1100 can determine 1114 whether an additional line is available to the subscriber. In one embodiment, a subscriber can be allocated up to a determined of number lines for which they may activate. The number of lines available to the subscriber can be determined based on the subscriber's credit history, service plan, anticipated or actual use, etc. When the decision 1116 determines that an additional line is not available to the subscriber, then the subscriber can be informed 1118 that the additional line is not available. In one implementation, such as illustrated in FIG. 11, when an additional line can still be available if the subscriber provides a deposit (e.g., security deposit), the subscriber can be so informed 1118. Alternatively, when the decision 1116 determines that the additional line is available, the activation process 1100 can perform various previously described operations to activate the mobile multi-function device at block 1120. In one embodiment, the activation operations are associated with blocks 802, 804 and 810-844 of the activation process 800 illustrated in FIGS. 8A-8C. Following the blocks 1112, 1118 and 1120, the activation process 1100 can end.

Another aspect of the invention pertains to online provisioning methods and graphical user interfaces therefore. The provisioning methods enable an end user to activate a mobile communication device (e.g., mobile phone). In one embodiment, an end user can connect a mobile communication device to a computing device, such as a personal computer, and then perform an online activation process with a wireless service provider. The invention can provide automation and flexibility to activation of wireless communication devices.

Figure 12A:
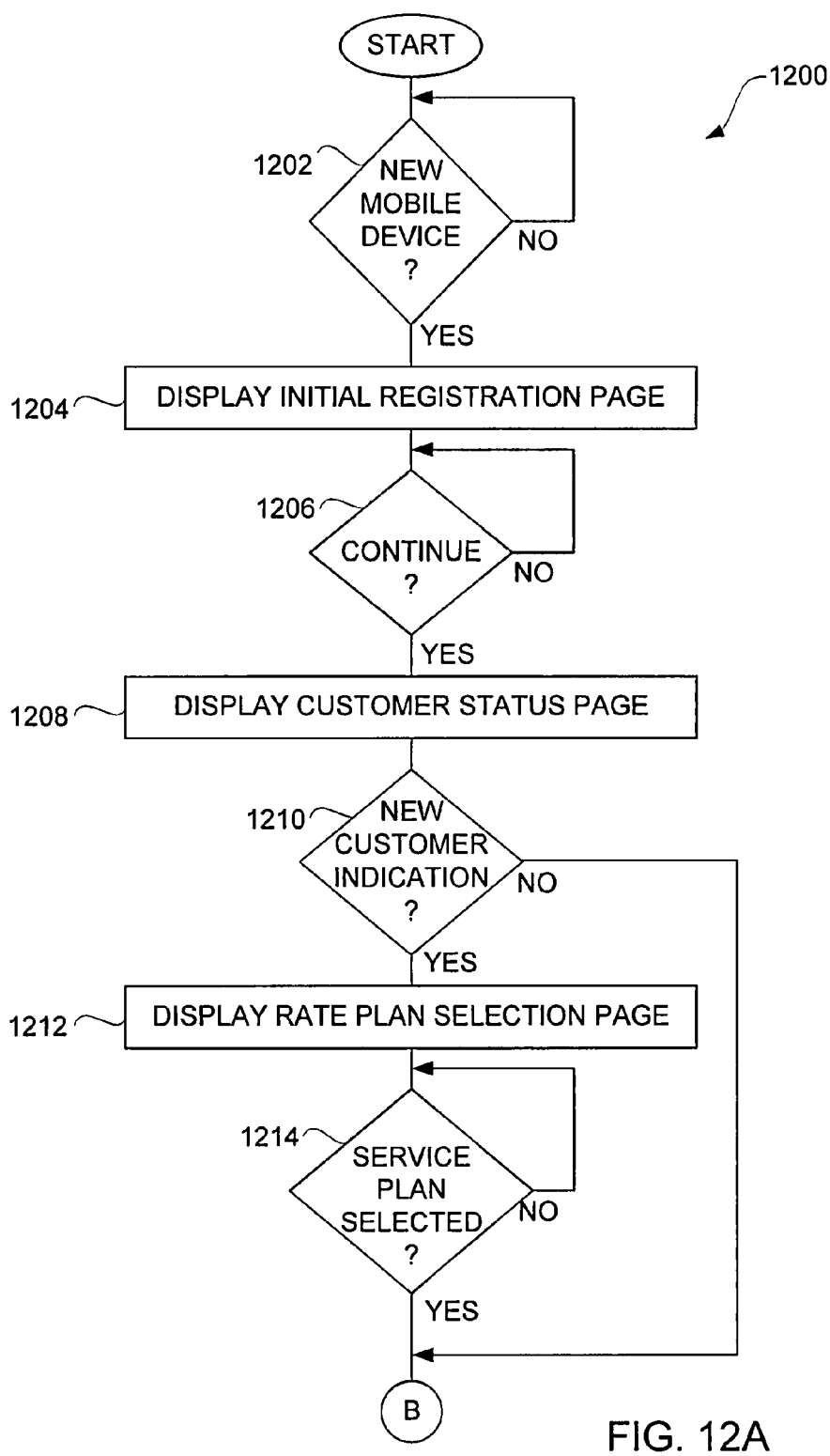
FIGS. 12A-12C are flow diagrams of a mobile device provisioning process according to one embodiment of the invention.
Figure 12B:
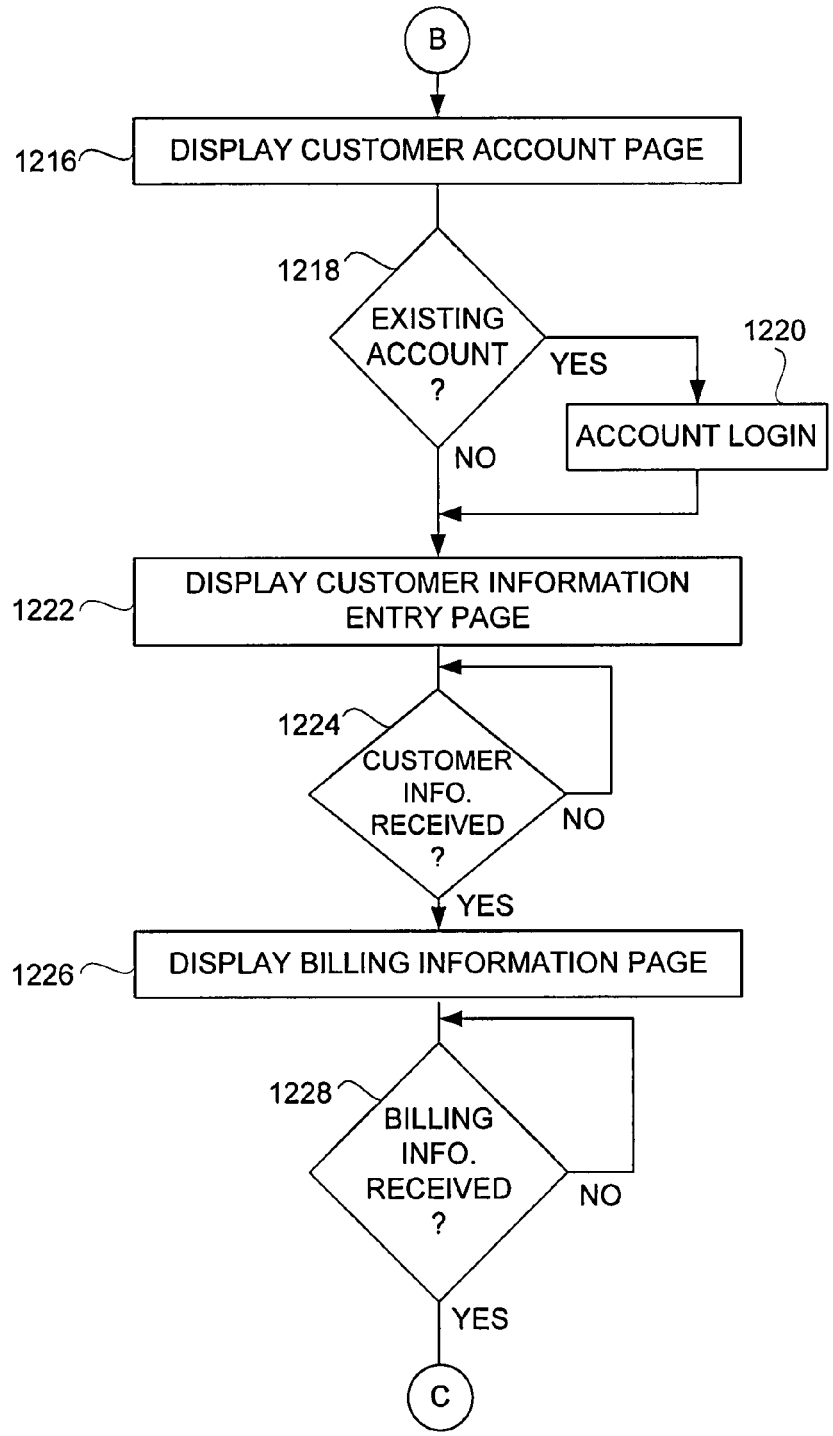
Figure 12C:
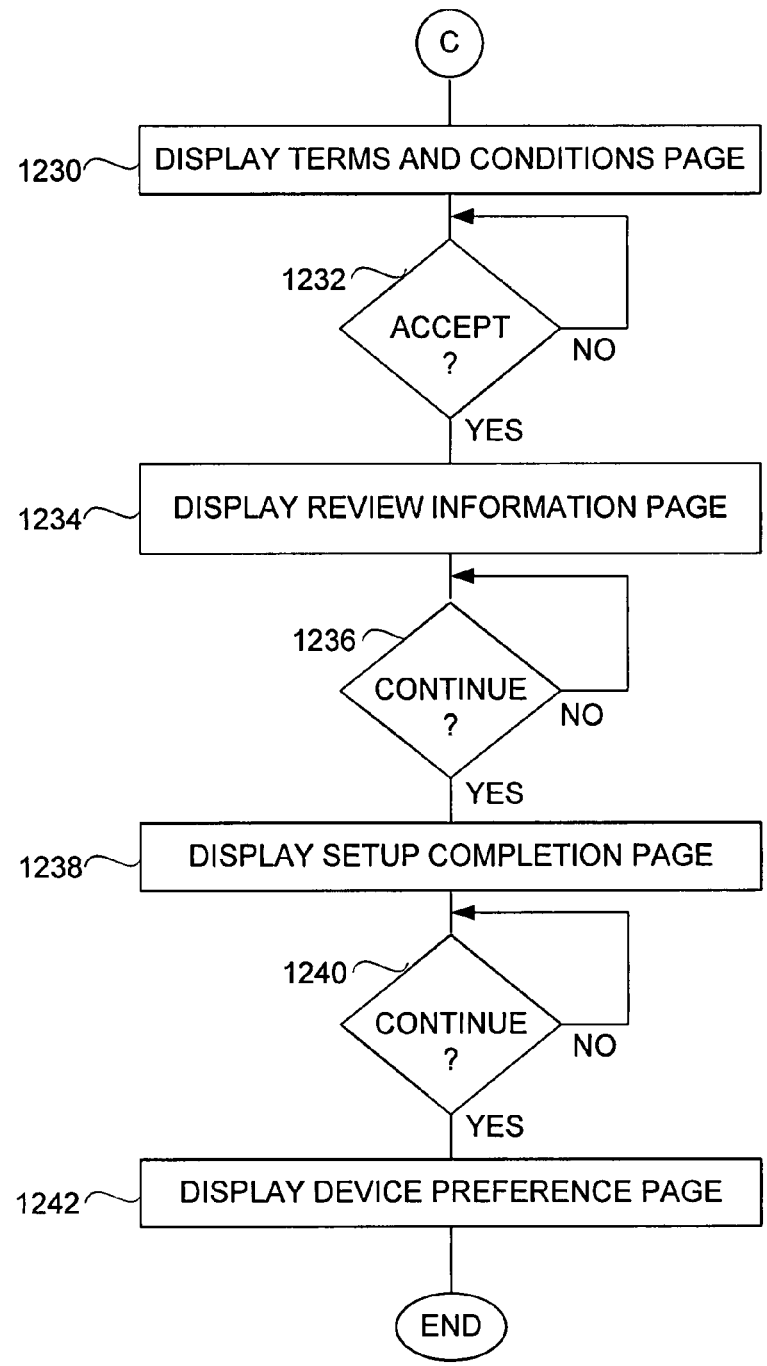

FIGS. 12A-12C are flow diagrams of a mobile device provisioning process 1200 according to one embodiment of the invention. The mobile device provisioning process 1200 is, for example, performed by a server, such as the activation server 112 of the activation system 100 illustrated in FIG. 1.

The mobile device provisioning process 1200 can begin with a decision 1202. The decision 1202 can determine whether a new mobile device needs to be provisioned (or activated). The new mobile device, for example, can refer to a mobile device that requires provisioning in order to utilize a wireless network for voice (and/or data) communications. The new mobile device can, for example, be recognized by a client machine, such as the client machine 102 illustrated in FIG. 1, when the mobile device connects with the client machine. The client machine can then in turn interact with the activation server to present suitable graphical user interfaces that assist the user of the mobile device in provisioning (or activating) the mobile device. Hence, when the decision 1202 determines that a new mobile device is not present, then the mobile device provisioning process 1200 awaits the presence of a new mobile device. In other words, until a new mobile device is present, the mobile device provisioning process 1200 simply waits to recognize a new mobile device. On the other hand, once the decision 1202 determines that a new mobile device has been recognized, an initial registration page is displayed 1204. The initial registration page can provide initial information to a user regarding registration of a mobile device.

Figure 13:
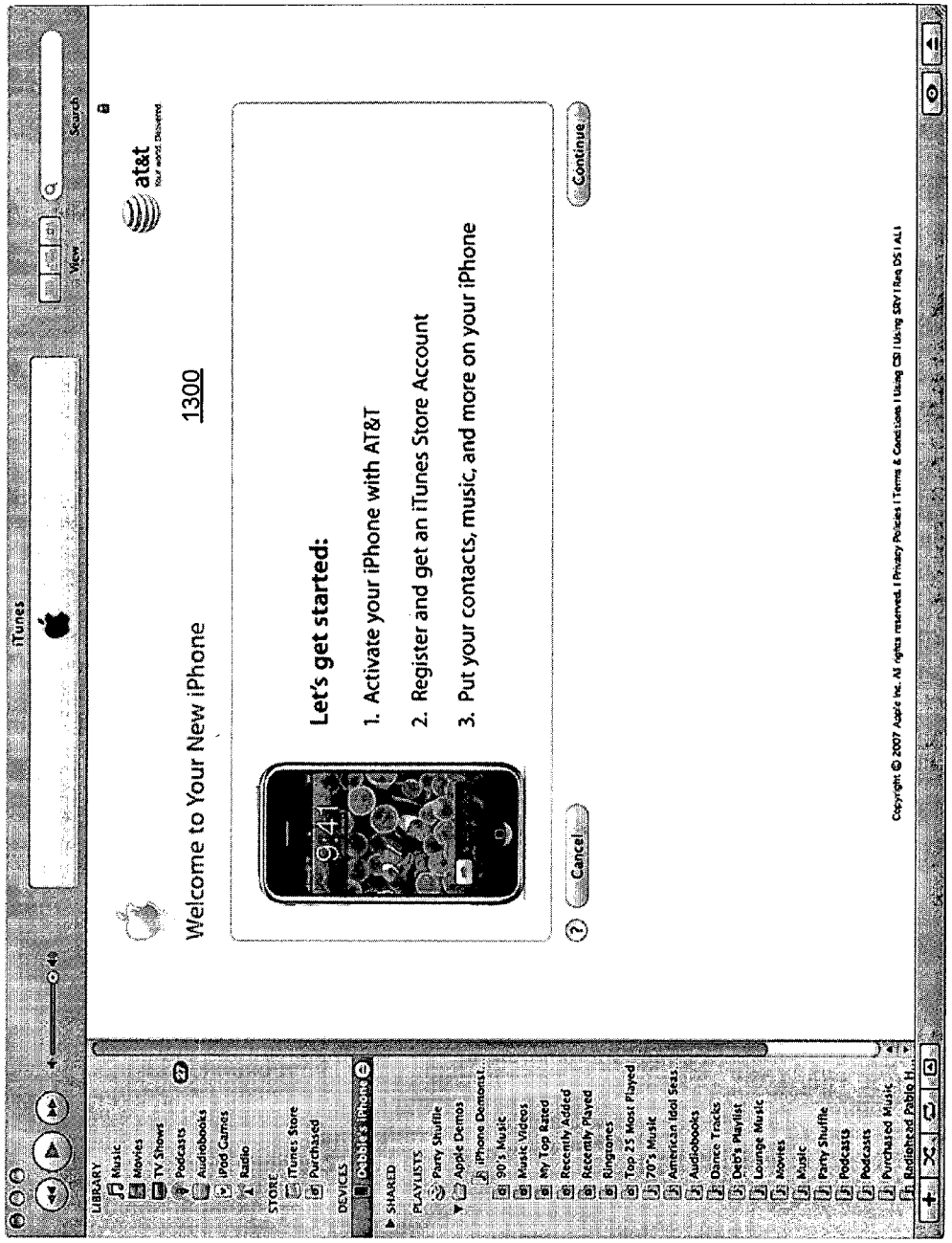
FIG. 13 is a screen shot of an exemplary initial registration page according to one embodiment of the invention.

FIG. 13 is a screen shot of an exemplary initial registration page 1300 according to one embodiment of the invention. The initial registration page 1300 illustrated in FIG. 13 provides initial registration information regarding a device entitled "Debbie's iPhone" which in this example pertains to a mobile phone. In one embodiment, the mobile phone is a multi-function device. After the initial registration page is displayed 1204, a decision 1206 can determine whether a user continues with the mobile device provisioning process 1200. When the decision 1206 determines that the user has not yet elected to continue, the mobile device provisioning process 1200 can await such a request. Alternatively, the user could instead request to cancel the mobile device provisioning process 1200, in which case the mobile device provisioning process 1200 could end.

On the other hand, when the decision 1206 determines that the user has requested to continue with the mobile device provisioning process 1200, a customer status page can be displayed 1208. In general, the customer status page can allow a customer (user) to specify whether or not they are an existing customer to the wireless network provider, in this example, AT&T Wireless. Additionally, the customer status page may enable the customer to specify whether they are activating on an individual plan or a group plan, or whether they wish to keep their current phone number (i.e., transferring the phone number) or create a new phone number.

Figure 14:
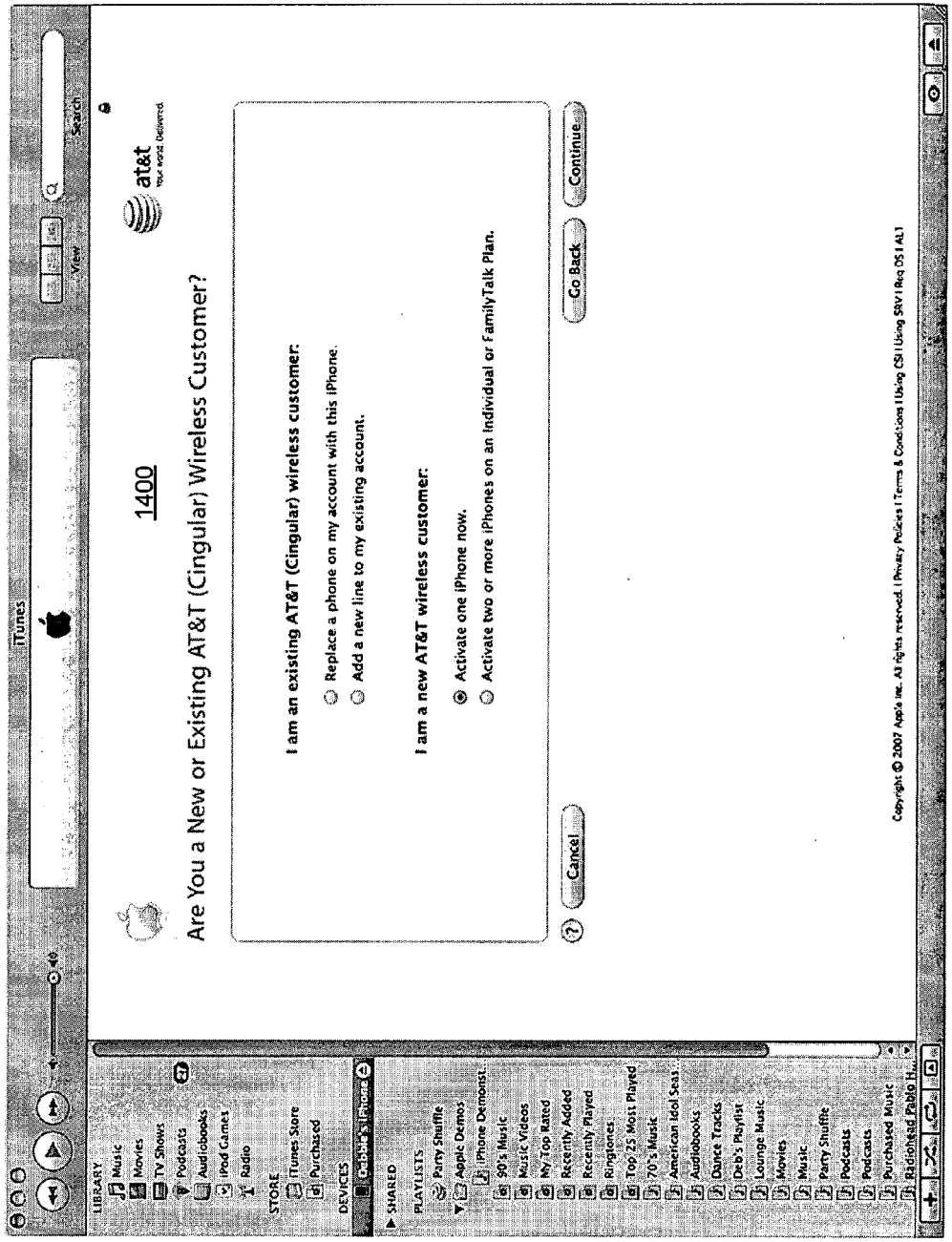
FIG. 14 is a screen shot of an exemplary customer status page according to one embodiment of the invention.

FIG. 14 is a screen shot of an exemplary customer status page 1400 according to one embodiment of the invention. The customer status page 1400 allows a new wireless network service customer to activate a new phone on an individual plan. Here, the customer may or may not desire to transfer their current mobile phone number. Further, the customer status page 1400 can allow an existing wireless network service customer to either keep their current phone number or create a new phone number for the particular mobile device being provisioned.

After the customer status page is displayed 1208, a decision 1210 determines whether the customer is a new customer. As an example, this determination can be made following submission of the customer status page 1400 which enables the user to indicate whether or not they are an existing customer.

Although not illustrated in FIGS. 12A-12C, the mobile device provisioning process 1200 can further display a number transfer page. The number transfer page can assist a user in transferring an existing number from another service provider to be used with the particular mobile device being provisioned.

Figure 15:
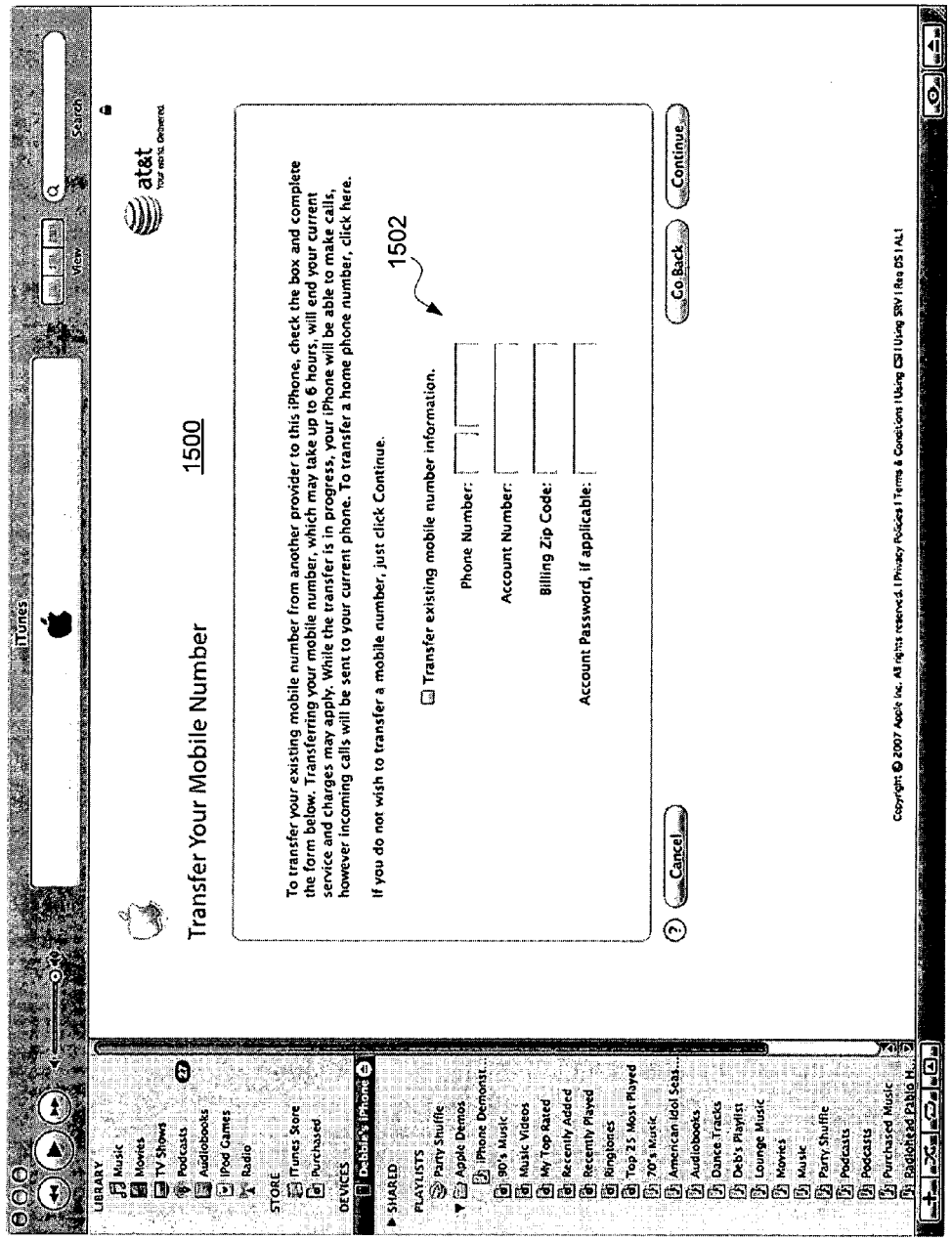
FIG. 15 is a screen shot of an exemplary screen shot of a mobile number transfer page.
Figure 16:
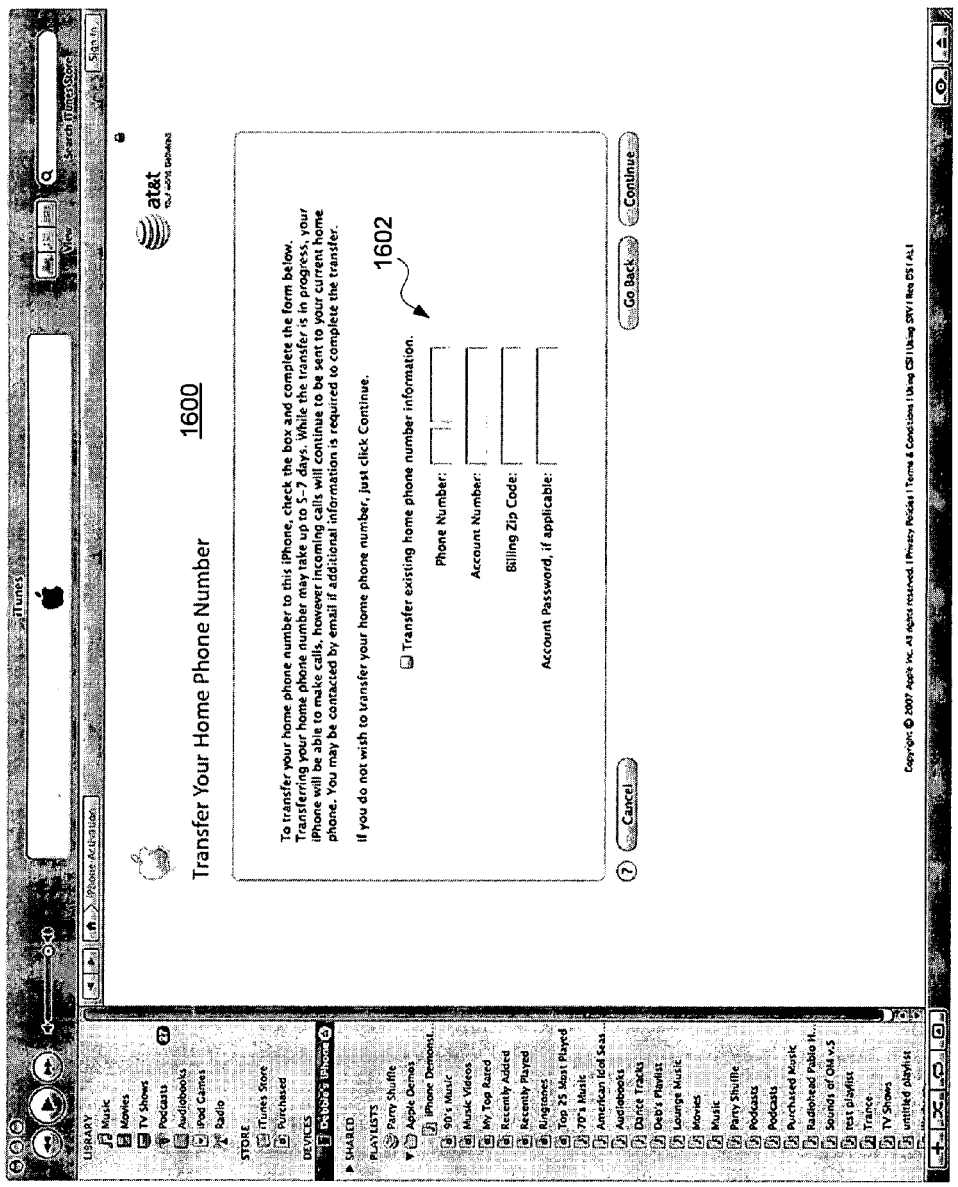
FIG. 16 is a screen shot of an exemplary screen shot of a landline number transfer page.

FIG. 15 is a screen shot of an exemplary screen shot of a mobile number transfer page 1500. The mobile number transfer page 1500 includes a data entry region 1502 that enables a user to provide existing account information in the case where an existing mobile number is to be transferred. FIG. 16 is a screen shot of an exemplary screen shot of a landline number transfer page 1600. The landline number transfer page 1600 includes a data entry region 1602 that enables a user to provide existing account information in the case where an existing landline number is to be transferred.

When the decision 1210 determines that the user is a new customer, a service plan selection page can be displayed 1212. In general, the service plan selection page provides one or more available service plans to the customer. A customer can then select one of the available service plans.

Figure 17A:
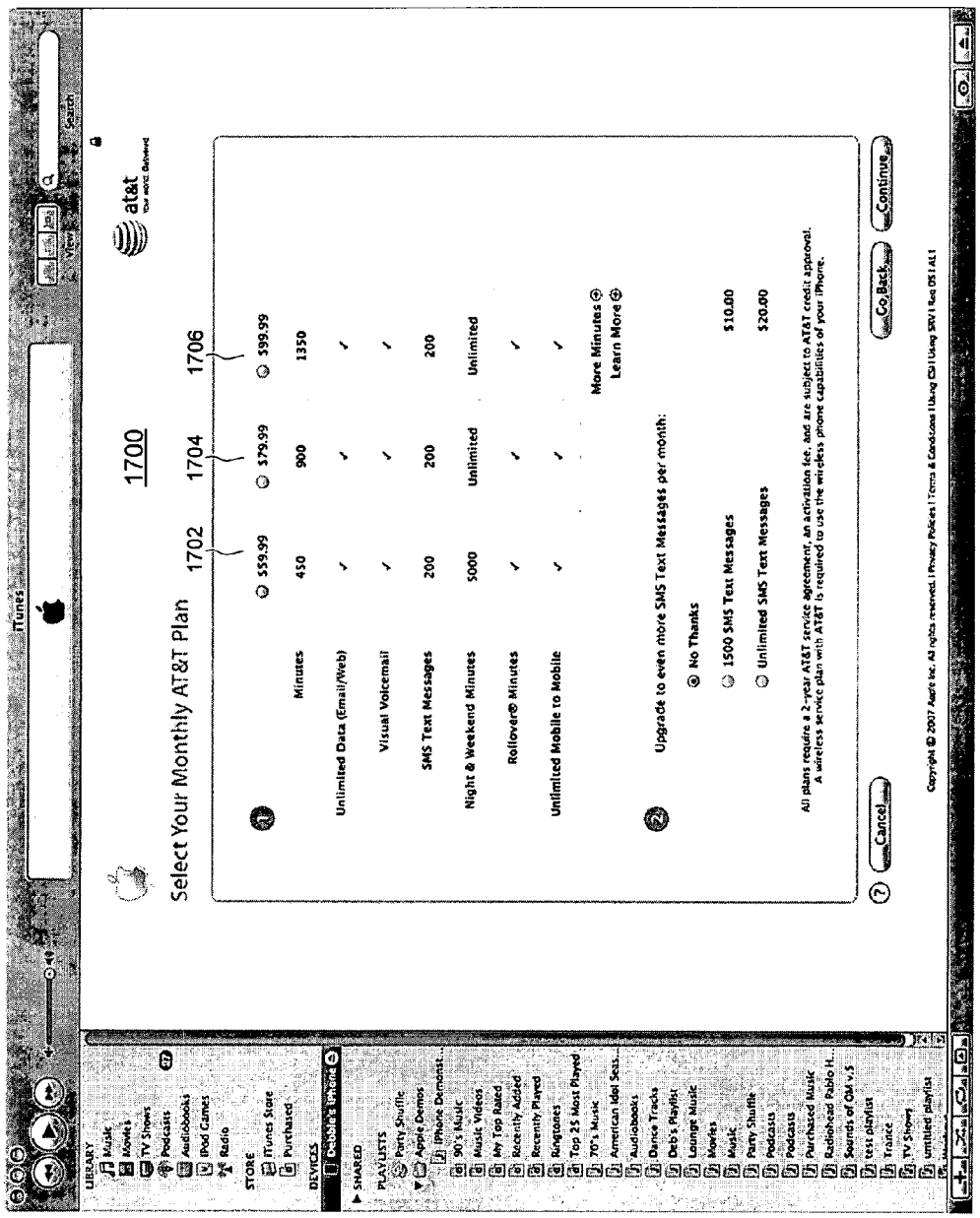
FIGS. 17A and 17B are screen shots of an exemplary service plan selection page according to one embodiment of the invention.
Figure 17B:
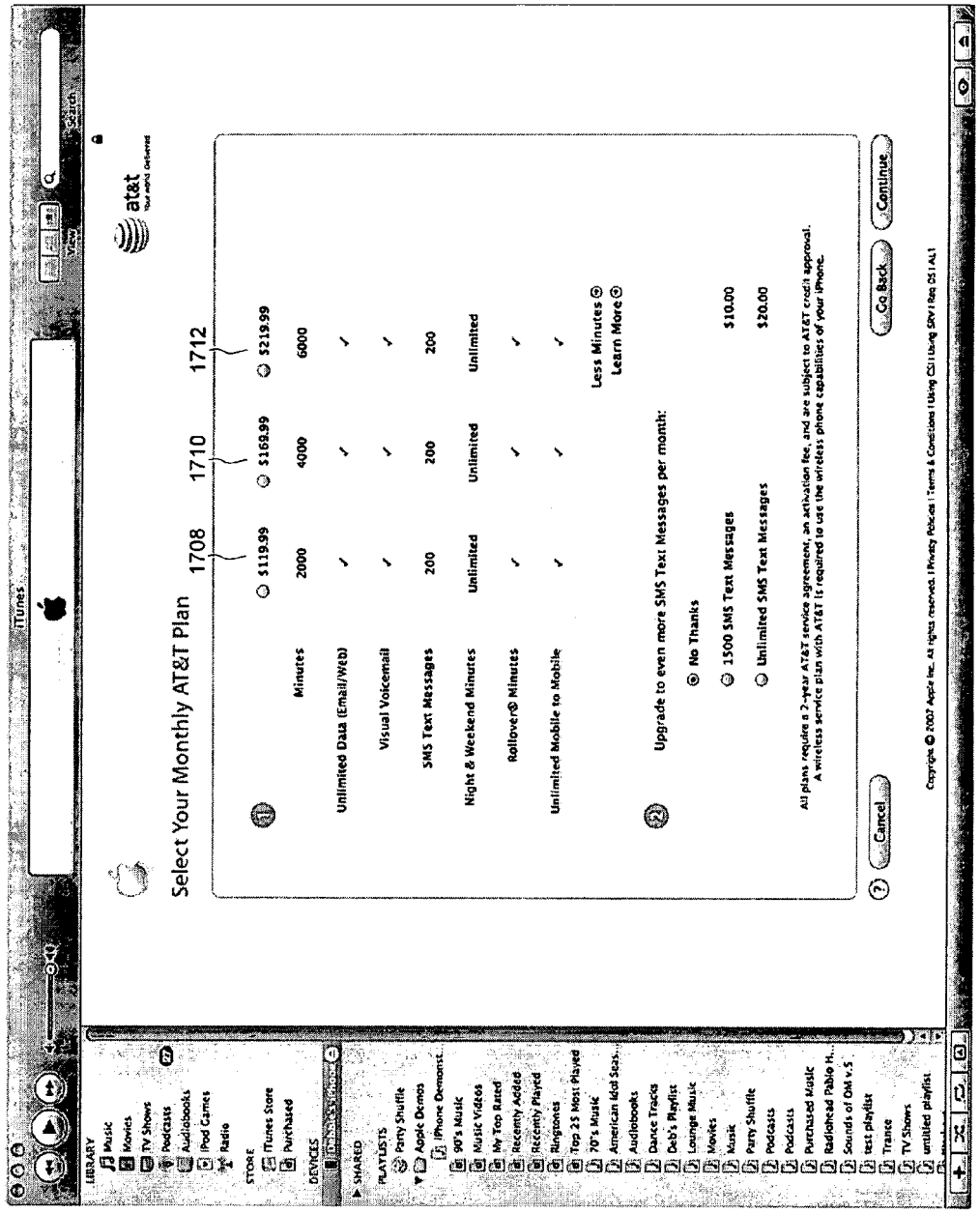

FIGS. 17A and 17B are screen shots of an exemplary service plan selection page 1700 according to one embodiment of the invention. The service plan selection page 1000 allows the customer to select from one of six service plans 1702-1712, each of which can offer a different package of services at different rates. A first three of the service plans are illustrated in FIG. 17A, and a second three of the service plans are illustrated in FIG. 17B.

Following the display 1212 of the service plan selection page, a decision 1214 can determine whether a service plan has been selected. When the decision 1214 determines that a service plan has not yet been selected, the mobile device provisioning process 1200 can await such a selection. On the other hand, once the decision 1214 determines that a service plan has been selected, as well as following the decision 1210 when the customer is not a new customer, a customer account page can be displayed 1216. The customer account page can allow an existing customer to login to their account. The account is, for example, associated with an on-line media store, such as the iTunes® media store.

Figure 18:
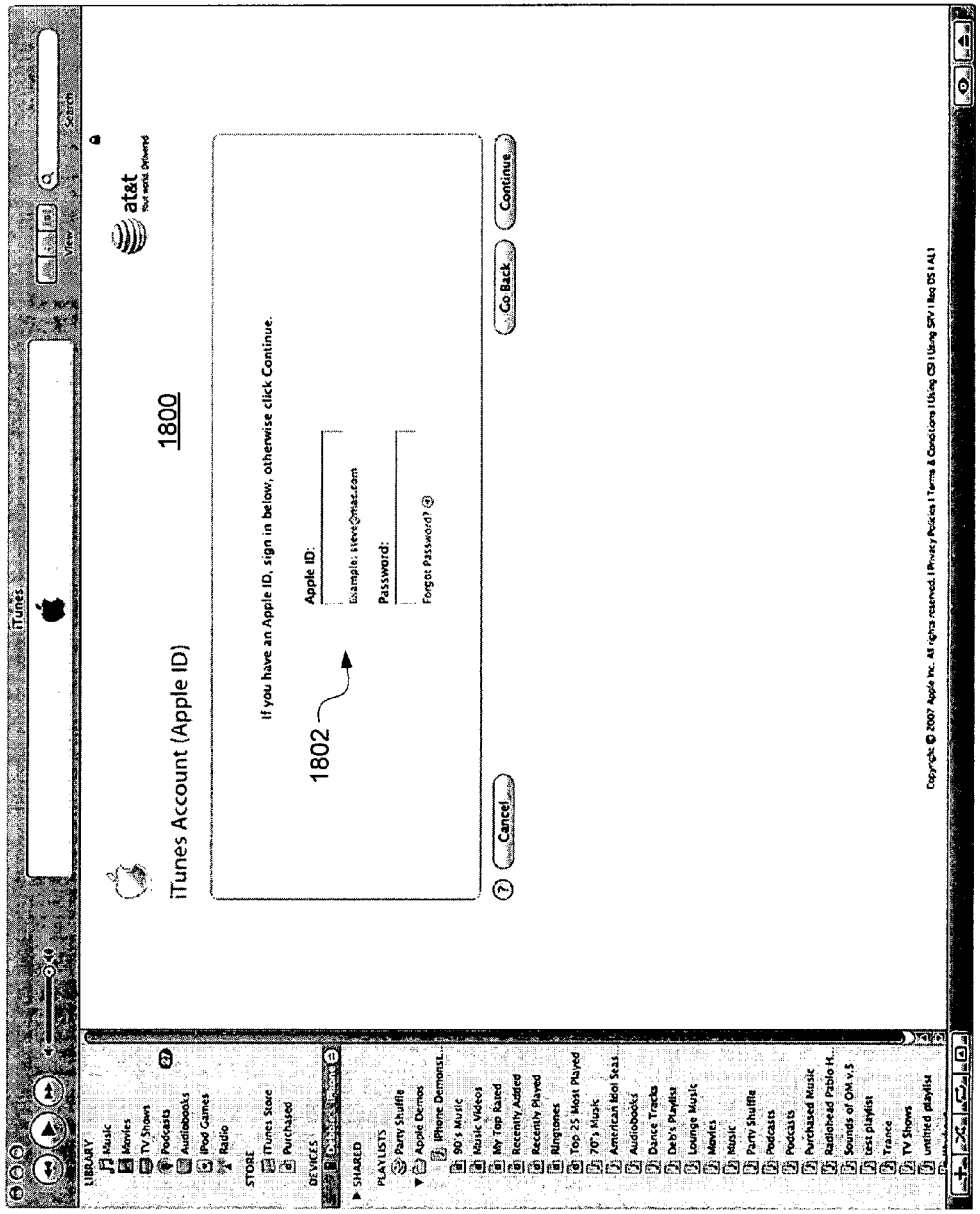
FIG. 18 is a screen shot of an exemplary customer account page according to one embodiment of the invention.

FIG. 18 is a screen shot of an exemplary customer account page 1100 according to one embodiment of the invention. The customer account page 1100 includes a sign-in section 1802 that allows an existing account holder to sign-in, with an identifier (e.g., Apple ID) and password.

After the customer account page has been displayed 1216, a decision 1218 can determine whether the customer is an existing account holder. When the decision 1218 determines that the customer has an existing account, the customer can login 1220 to the account. Alternatively, when the decision 1218 determines that the customer does not have an existing account, or following the block 1220 after a successful login to an account, a customer information entry page is displayed 1222. The customer information entry page can facilitate a user in entering customer information that is to be utilized by either the wireless network service provider or the media asset provider (e.g., on-line media store). For a customer with an existing account, the customer information can be pre-entered and/or the certain subsequent portions of the remaining processing for the mobile device provisioning process 1200 could be simplified or eliminated. For a customer without an existing account with the on-line media store, the customer information entry page can also allow the customer to create a new account with the on-line media store.

Figure 19:
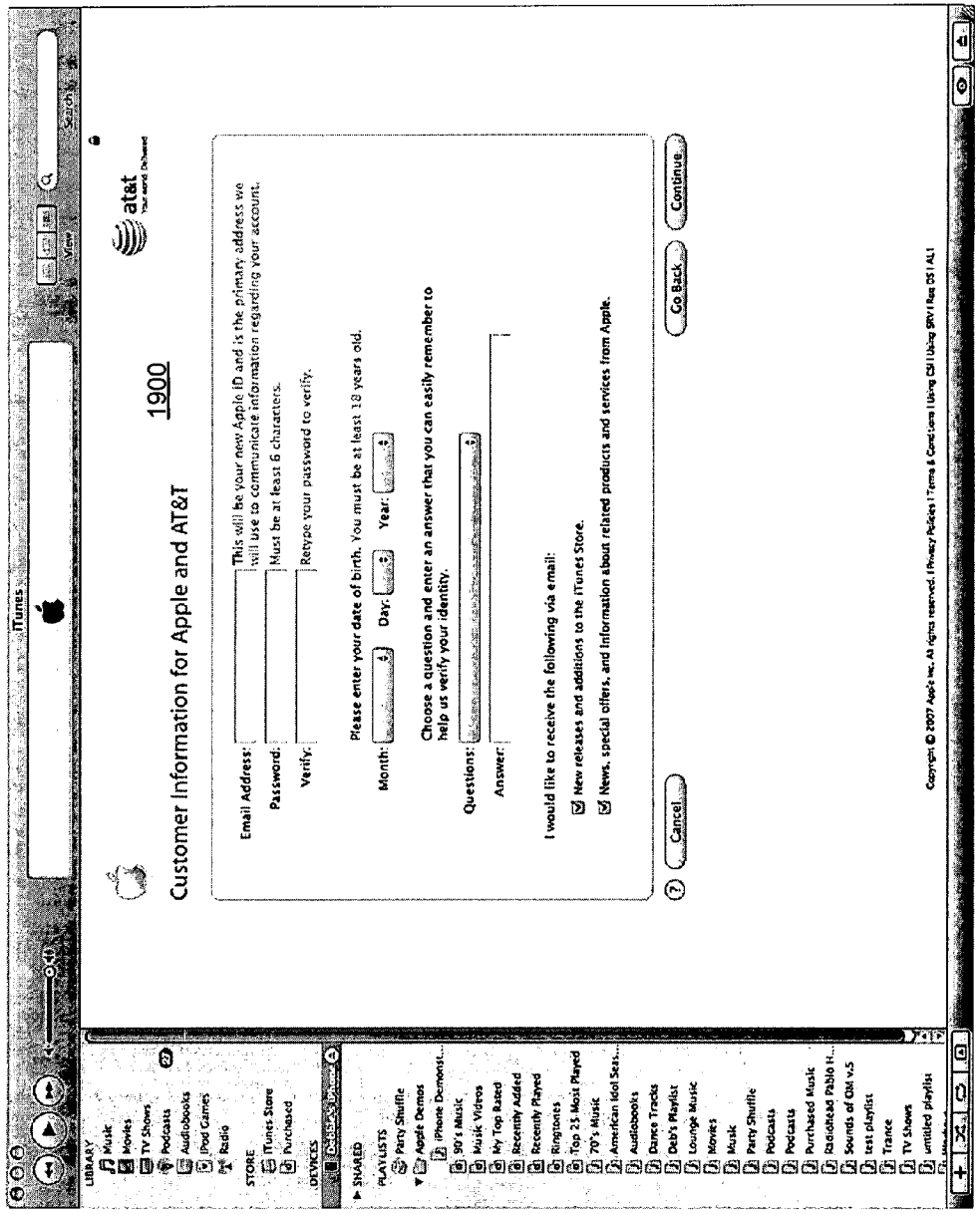
FIG. 19 is a screen shot of a customer information entry page according to one embodiment of the invention.

FIG. 19 is a screen shot of a customer information entry page 1900 according to one embodiment of the invention. The customer information entry page 1900 allows entry of basic customer information to be utilized in creating one or more accounts. The customer information can, for example, include information pertaining to the customer, such as e-mail address, password, security question and answer, and date of birth.

Once the customer has entered the requested customer information, the mobile device provisioning process 1200 can continue. A decision 1224 determines whether customer information has been received. When the decision 1224 determines that the customer information has been received, such as by completion of the customer information entry page, a billing information page can be displayed 1226. The billing information page enables a customer to provide billing information to be utilized to pay for the service plan that was previously selected by the customer. The billing information can also be used by another service provider, such as an online media store. It should be noted that sharing of customer information and/or billing information between two or more service providers provides an efficient and user friendly system.

Figure 20:
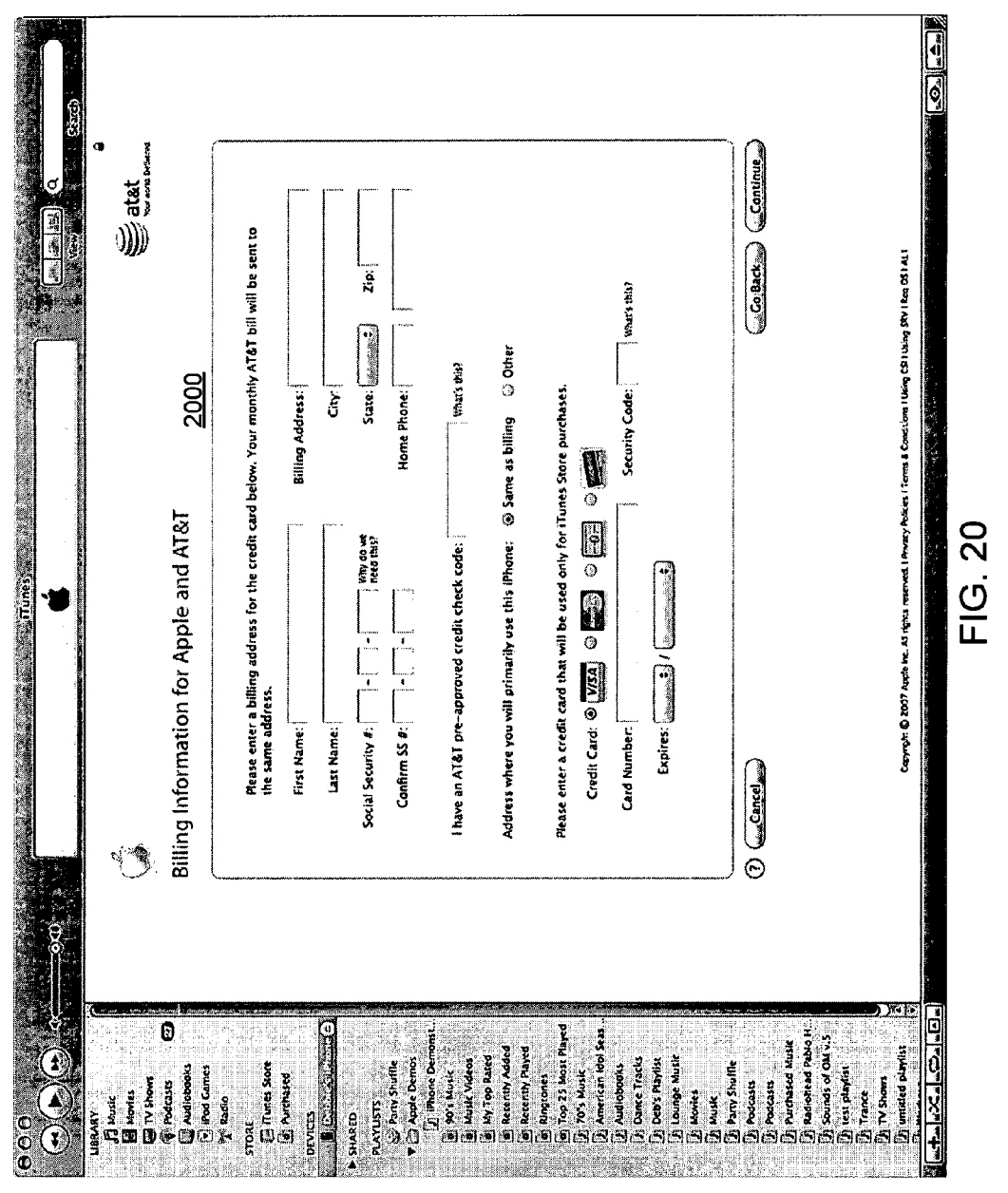

FIG. 20 illustrates an exemplary billing information page 2000 according to one embodiment of the invention. The billing information page 2000 provides a means for the customer to enter various billing information, such as name, billing address, phone number, social security number, credit card number, security code, and expiration date. The billing information can be used by one or more service providers, in this example, AT&T Wireless as the wireless service provider and iTunes® media store as an online media service provider.

After the billing information page is displayed 1226, a decision 1228 determines whether billing information has been received. When the decision 1228 determines that billing information has not been received, then the mobile device provisioning process 1200 awaits such billing information. On the other hand, when the decision 1228 determines that billing information has been received, a terms and condition page can be displayed 1230. The terms and conditions page can provide the customer with the terms and conditions of the one or more legal agreements that are being established with the customer.

Figure 21A:
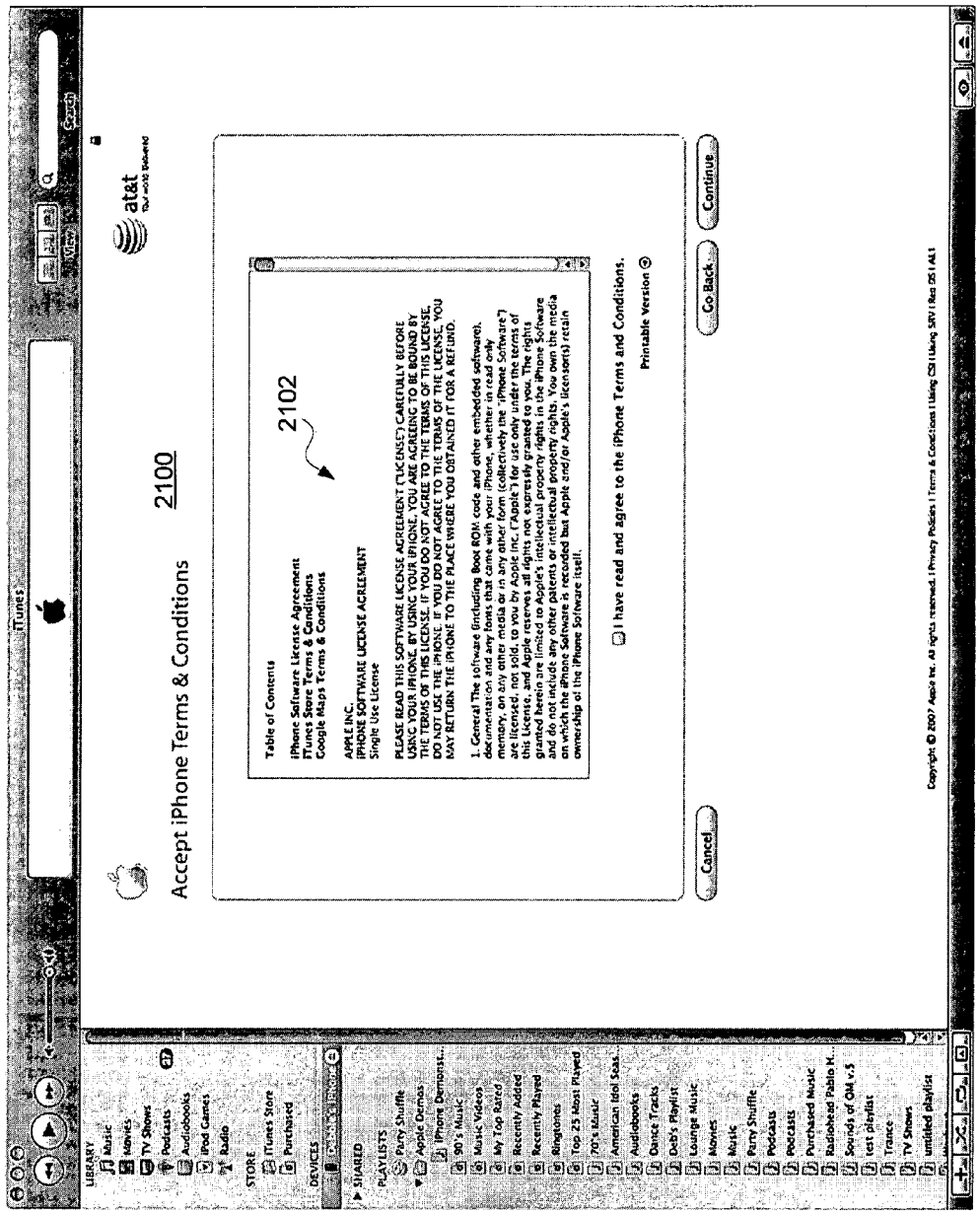
FIG. 21A is an exemplary screen shot of a first terms and conditions page according to one embodiment of the invention.
Figure 21B:
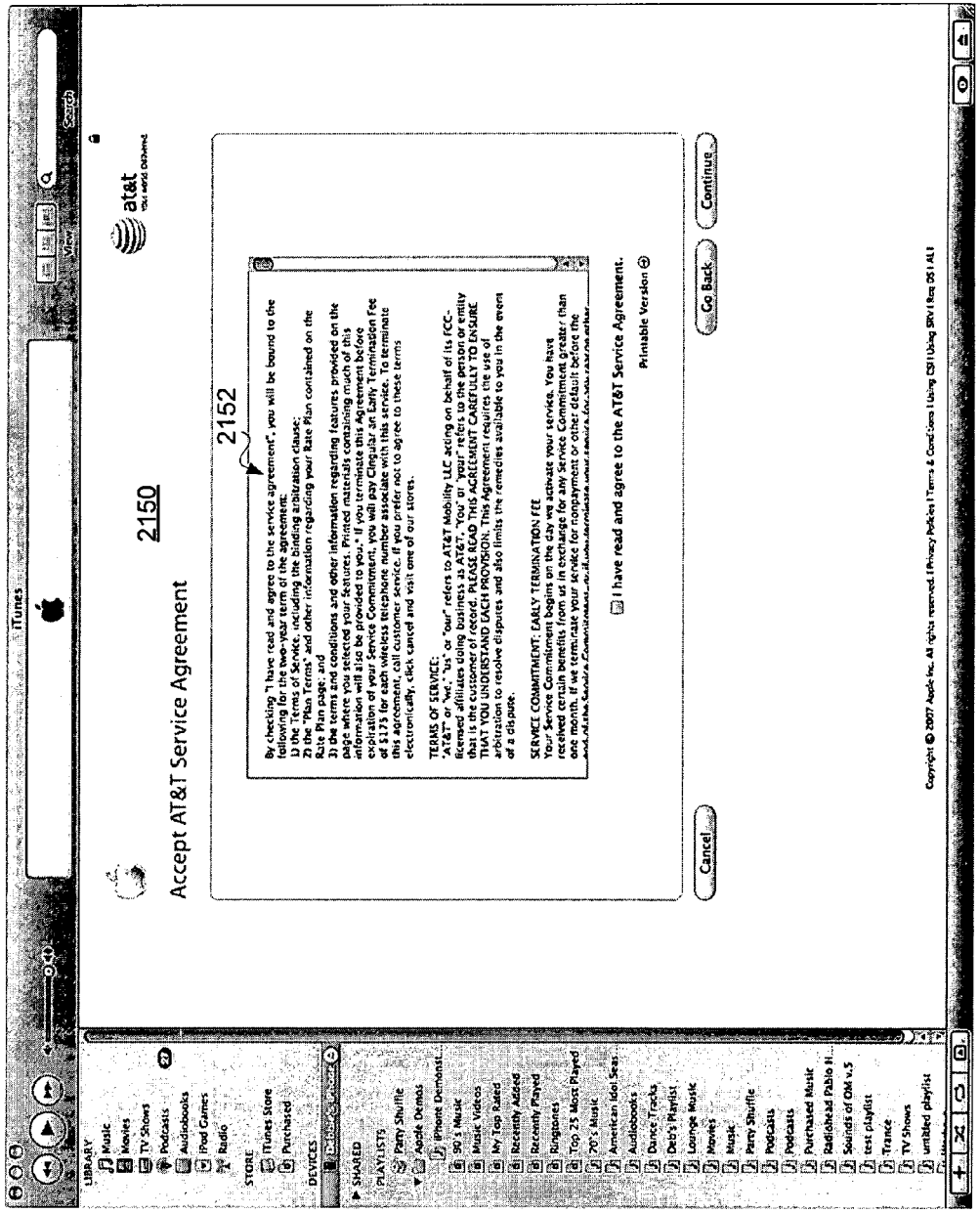
FIG. 21B is an exemplary screen shot of a second terms and conditions page according to one embodiment of the invention.

FIG. 21A is an exemplary screen shot of a first terms and conditions page 2100 according to one embodiment of the invention. In this example, the customer is required to read and agree to a software license/usage agreement 2102 with respect to Apple Computer, Inc. for use of the iTunes® media store. FIG. 21B is an exemplary screen shot of a second terms and conditions page 2150 according to one embodiment of the invention. In this example, the customer is required to read and agree to a wireless service agreement 2502 with a wireless service provider. The terms and conditions pages 2100 and 2150 require that the user accept the respective terms and conditions of these agreements in order to continue.

Following the display 1230 of the terms and conditions page, a decision 1232 determines whether the customer has accepted the various terms and conditions. When the decision 1232 determines that the customer has not accepted the terms and conditions, then the mobile device provisioning process 1200 awaits such acceptance. Once the decision 1232 determines that the customer has accepted the various terms and conditions, a review information page can be displayed 1234. The review information page allows a user to finally review the information regarding the service plan (i.e., wireless network service) being established for the mobile device for the customer information, and the associated billing information.

Figure 22:
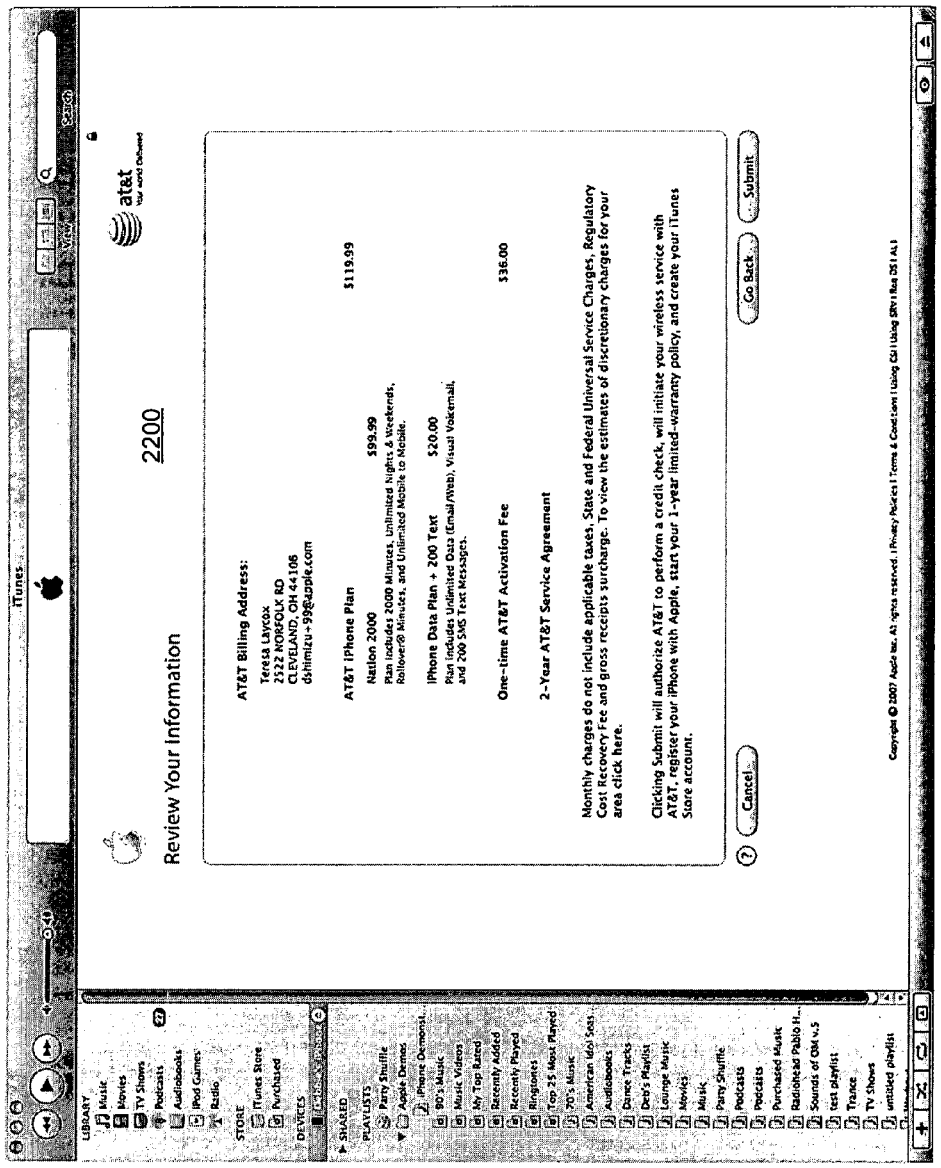
FIG. 22 is a screen shot of an exemplary review information page according to one embodiment of the invention.

FIG. 22 is a screen shot of an exemplary review information page 2200 according to one embodiment of the invention. The review information page 2200 summarizes the billing and plan information concerning the mobile device being activated. For example, as shown in FIG. 22, the review information page 2200 can specify the billing amount and the manner in which the customer is to be billed, a service plan and a brief description thereof, additional fees and explanation of additional costs.

After the review information page has been displayed, a decision 1236 can determine whether the mobile device provisioning process 1200 should continue. When the decision 1236 determines that the customer has decided to continue the mobile device provisioning process 1200, one or more setup completion pages can be displayed 1238. The one or more setup completion pages can inform the customer that the setup (or activation) of their mobile device is processing and/or has successfully completed. The setup completion page may also provide a phone number for the mobile device to the customer or indicate that the existing phone number is being transferred. The setup completion page may also permit the customer to provide a name for the mobile device.

Figure 23:
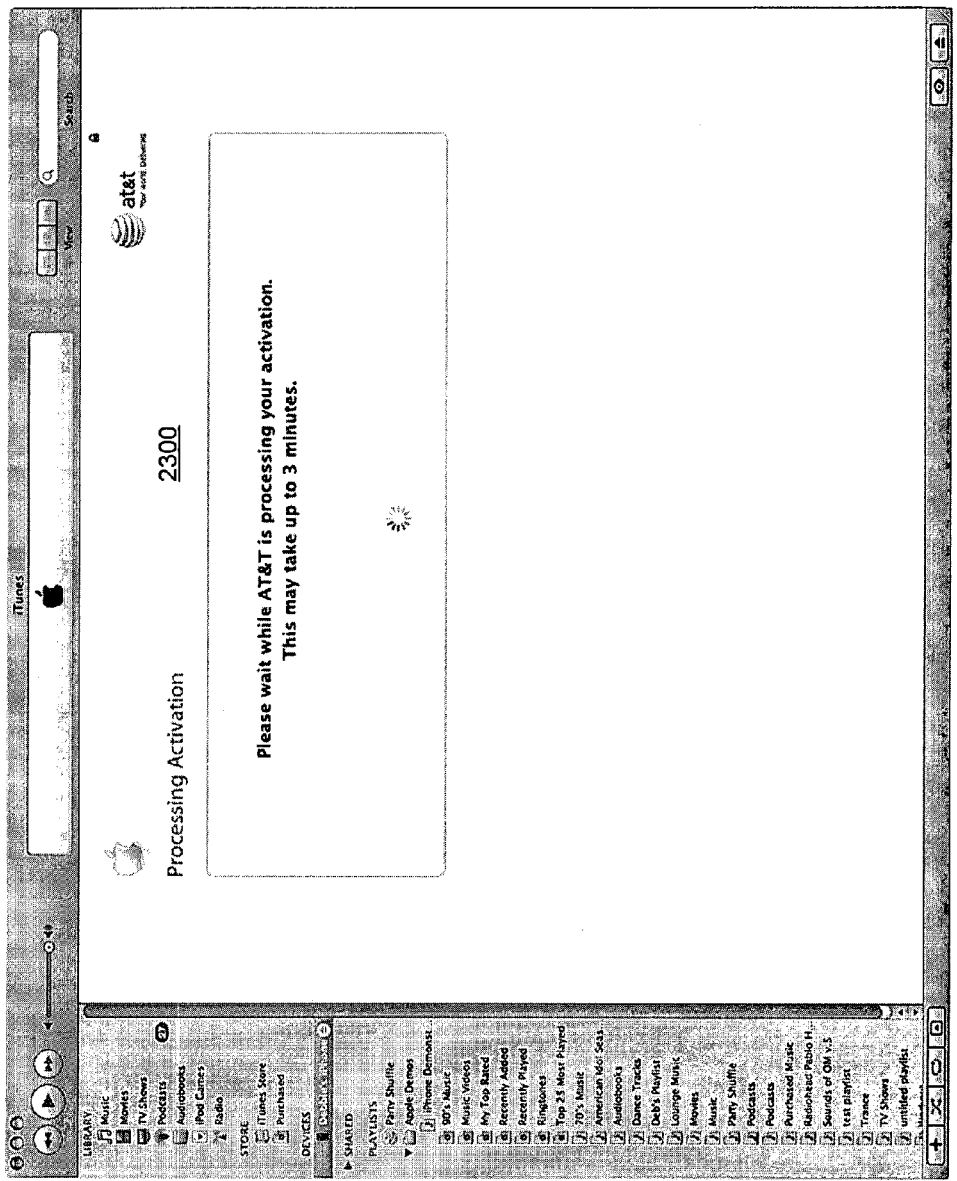
FIG. 23 is an exemplary screen shot of a setup completion page according to one embodiment of the invention.
Figure 24A:
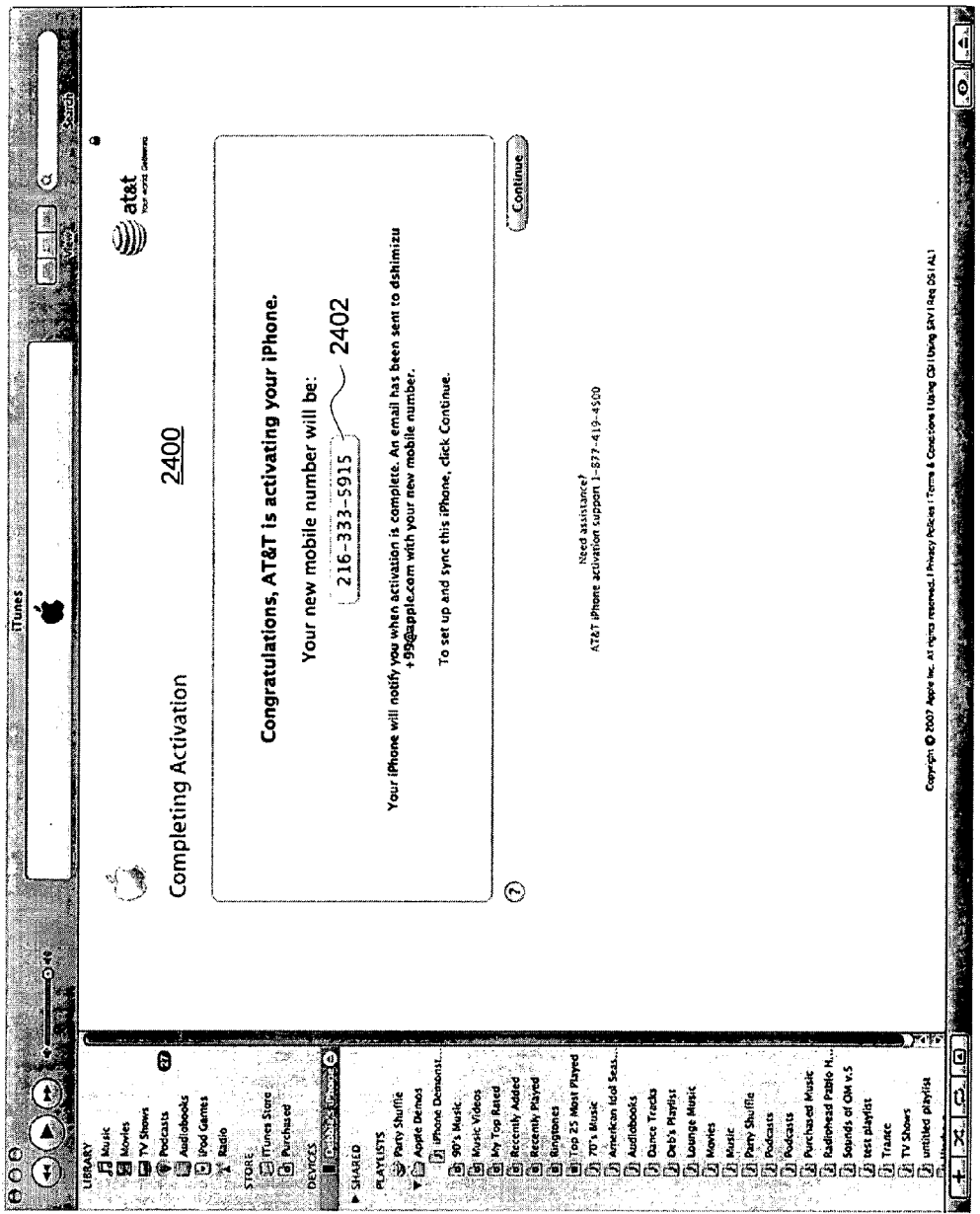
FIG. 24A is an exemplary screen shot of a setup completion page according to another embodiment of the invention.
Figure 24B:
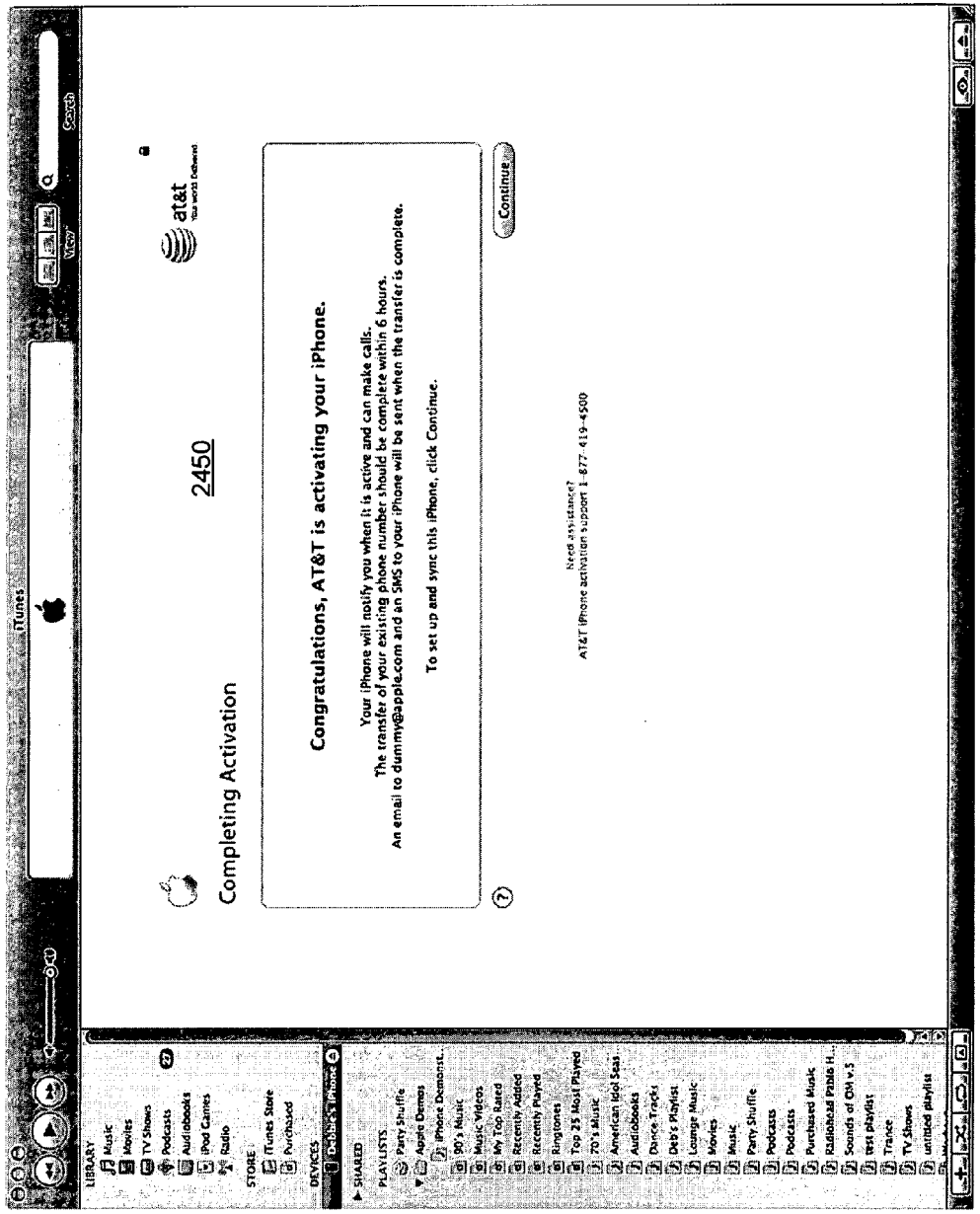
FIG. 24B is an exemplary screen shot of a setup completion page according to still another embodiment of the invention.

FIG. 23 is an exemplary screen shot of a setup completion page 2300 according to one embodiment of the invention. The setup completion page 2300 informs the customer that activation of the mobile device is being processed. FIG. 24A is an exemplary screen shot of a setup completion page 2400 according to another embodiment of the invention. The setup completion page 2400 provides the customer with a phone number 2402. FIG. 24B is an exemplary screen shot of a setup completion page 2450 according to still another embodiment of the invention. The setup completion page 2450 informs the customer that transfer of the existing phone number is ongoing. In one embodiment, the setup completion page 2400 and the setup completion page 2450 are alternative pages that are chosen dependent on whether a new phone number is being assigned or whether an existing phone number is being transferred.

After the setup completion page has been displayed 1238, a decision 1240 determines whether the customer desires to continue on with the mobile device provisioning process 1200. When the decision 1240 determines that the customer has not yet decided to continue, the mobile device provisioning process 1200 awaits the request to continue. Once the decision 1240 determines that the customer has requested to continue, a device preference page is displayed 1242. The device preference page can, for example, be provided by a media management application. In this regard, the media management application can assist the customer with the setting of one or more preferences concerning the mobile device that has just been provisioned (or activated). Alternatively, the customer can choose not to continue to the device preference page and instead end the mobile device provisioning process 1200. In any case, following the block 1242 (or alternatively following the block 1238), the mobile device provisioning process 1200 can end as the provisioning of the mobile device has been initiated and perhaps completed. Following the mobile device provisioning process 1200, the mobile device can thereafter be controlled or managed by the media management application. To the extent that the customer has set one or more preferences concerning the mobile device, the media management application can thereafter operate in accordance with the one or more preferences when interacting with or on behalf of the mobile device.

Figure 25:
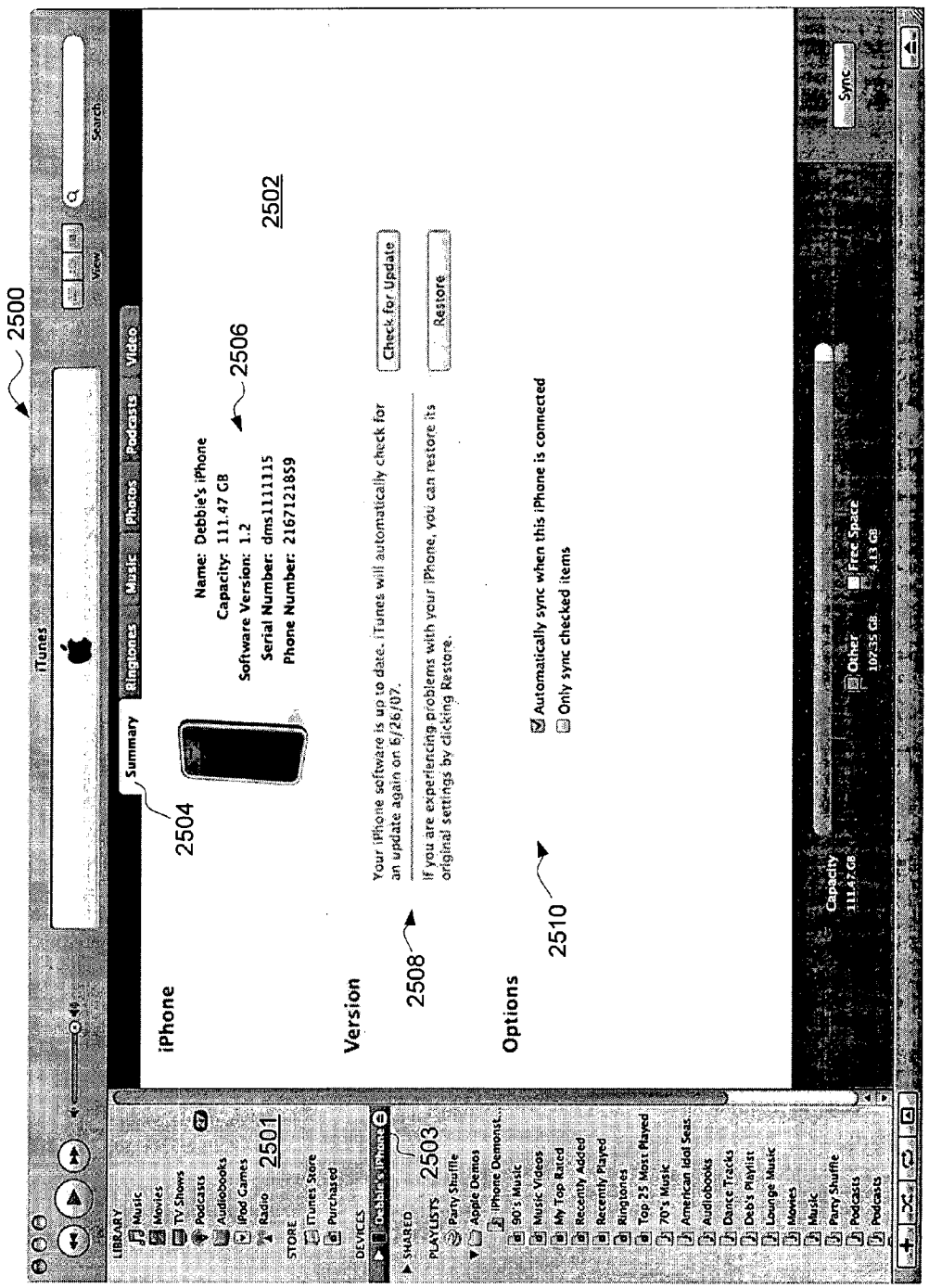
FIG. 25 is an exemplary screen shot of a device preference page according to one embodiment of the invention.

FIG. 25 is an exemplary screen shot of a device preference page 2500 according to one embodiment of the invention. The device preference page 2500 includes a source region 2501 and a preference information region 2502. A visual selector 2503 indicates selection of a device referred to as "Debbie's iPhone". For this selected device, the preference information area 2502 displays information 2506 regarding preferences associated with the particular device. In this specific example, a summary tab 2504 is active so that a summary preference window is displayed in the preference information area 2502. The summary preference window includes information describing the particular device, such as name, size, software version and serial number. The summary preference window also provides version information 2508 indicating whether or not an updated version of any software components might be available. Further, the summary preference window includes an options section 2510 that allows a customer to select one or more predetermined options regarding the mobile device. Device preferences can be set by a user for a plurality of different types of media. The device preferences can also be set differently for different types of media. The device preference page 2500 includes other tabs for distinct media types, including music, movies, TV shows, podcasts, photos, personal and games. These device preferences can be synchronization preferences used when synchronizing the media device with the client machine. For additional information on synchronization and synchronization preferences see (i) U.S. Provisional Patent Application No. 60/879,319, filed Jan. 7, 2007, and entitled "MULTI-DEVICE DATA SYNCHRONIZATION OR BACKUP VIA A HOST DEVICE," which is hereby incorporated herein by reference; and (ii) U.S. patent application Ser. No. 11/679,082, filed Feb. 26, 2007, and entitled "DATA SYNCHRONIZATION WITH HOST DEVICE IN ACCORDANCE WITH SYNCHRONIZATION PREFERENCES," which is hereby incorporated herein by reference.

As noted above, the provisioning method can also be used by existing customers. For example, an existing customer may get a new wireless communication device (e.g., mobile phone, multi-function device, etc.) that they want to use in place of their current wireless communication device. In one embodiment, the service plan (or rate plan) offered to the end user can have a predetermined minimum term (e.g., 2 years) or cancellation penalty duration. In one implementation, the user's new service plan will reset such minimum period(s) regardless of whether the user has already exceed the minimum period(s) for the user's existing plan.

Figure 26:
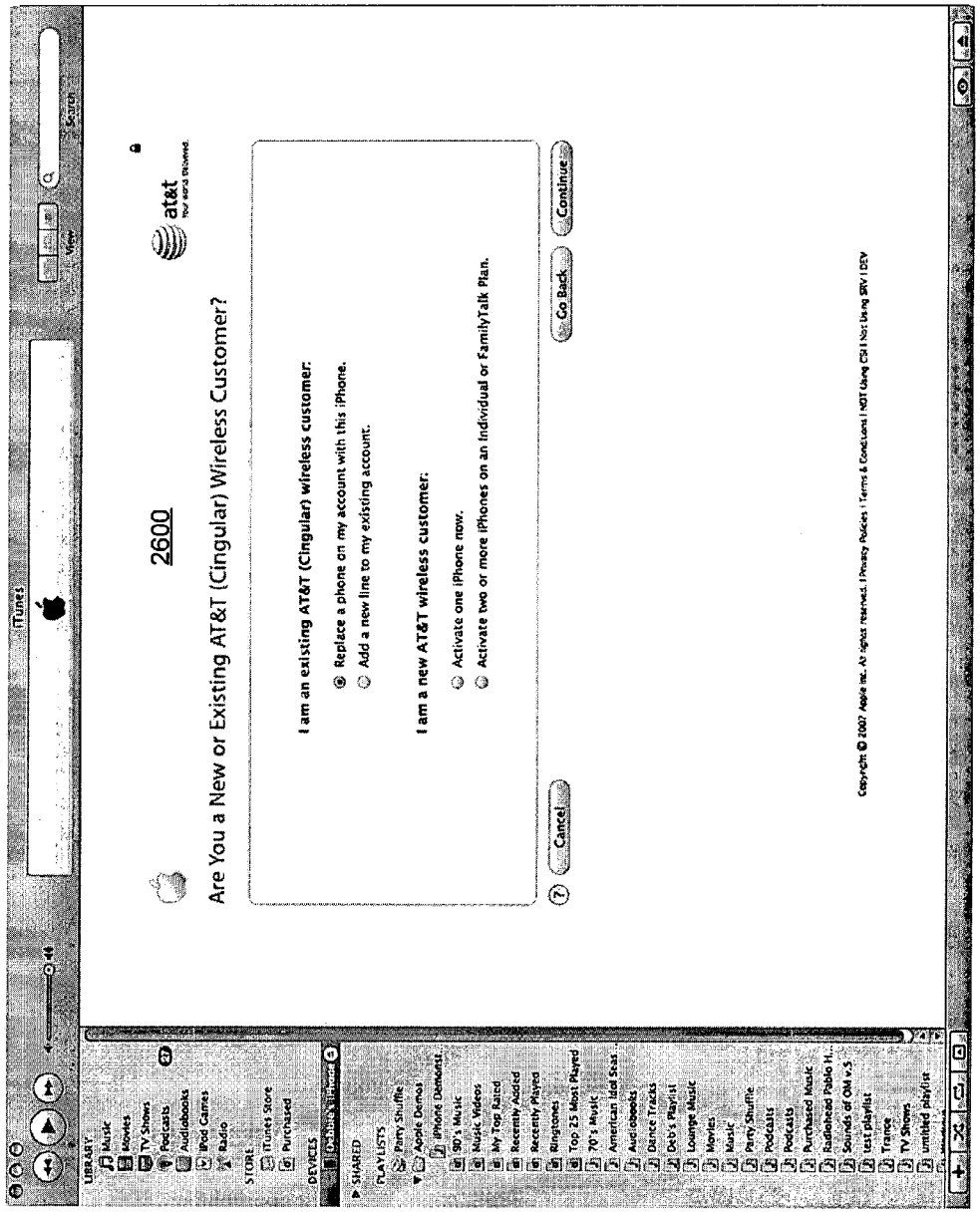
FIG. 26 is a screen shot of an exemplary customer status page according to one embodiment of the invention.
Figure 27:
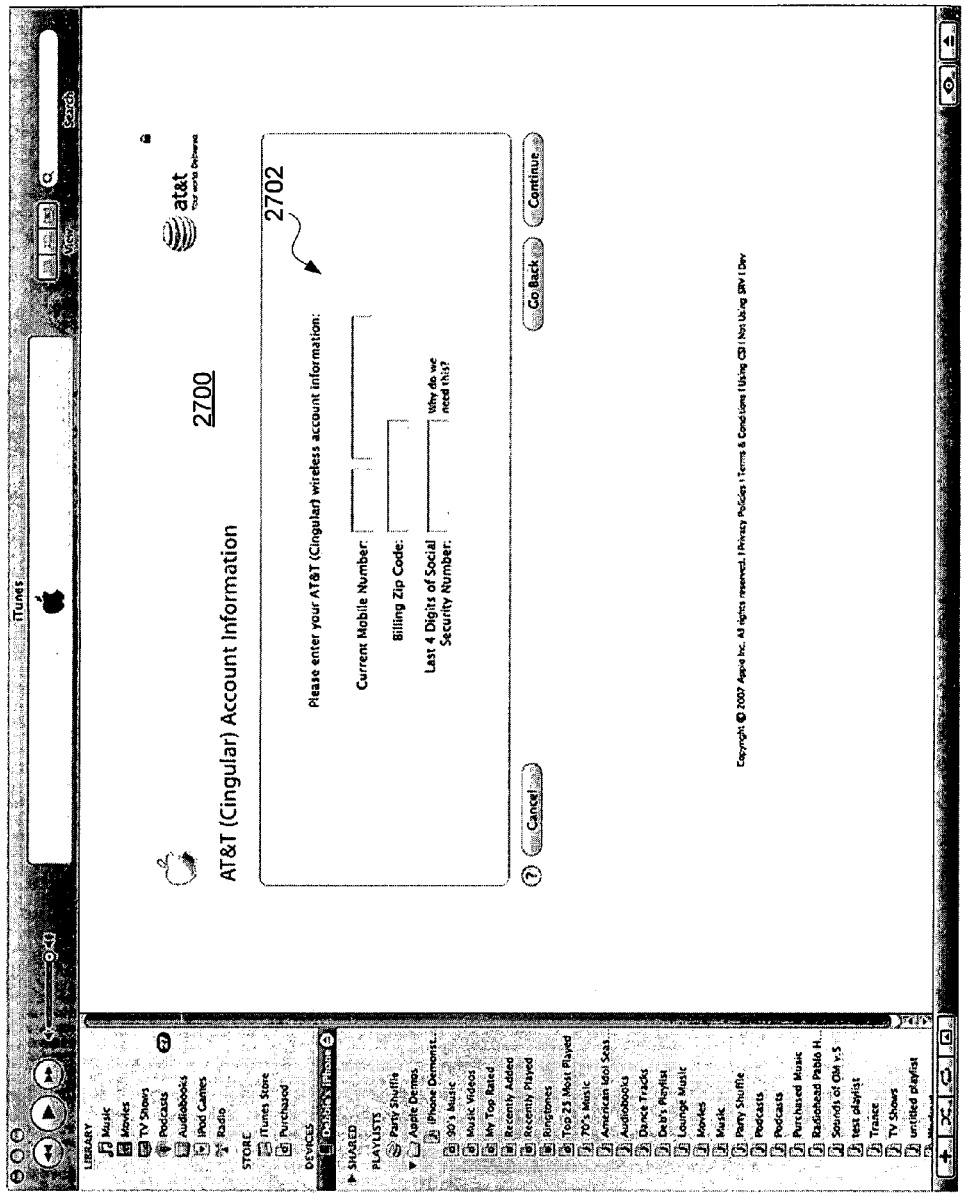
FIG. 27 is a screen shot of an exemplary account information page according to one embodiment of the invention.

FIG. 26 is a screen shot of an exemplary customer status page 2600 according to one embodiment of the invention. The customer status page 2600 allows a new wireless network service customer to activate a new mobile phone (i.e., mobile device) on pre-existing account in place of an existing mobile phone, whereby the phone number for the new mobile phone is the same as the phone number previously used for the existing mobile phone. Since the customer is an existing customer, an account information page can also be displayed. The account information page can permit the user to enter account information concerning their account with the wireless service provider. The account information serves to identify the pre-existing account of the user. As such, an activation server can locate the user account and associate the new mobile phone with the pre-existing account. FIG. 27 is a screen shot of an exemplary account information page 2700 according to one embodiment of the invention. The account information page 2700 includes an account information entry area 2702 allows a user to enter account information.

Figure 28:
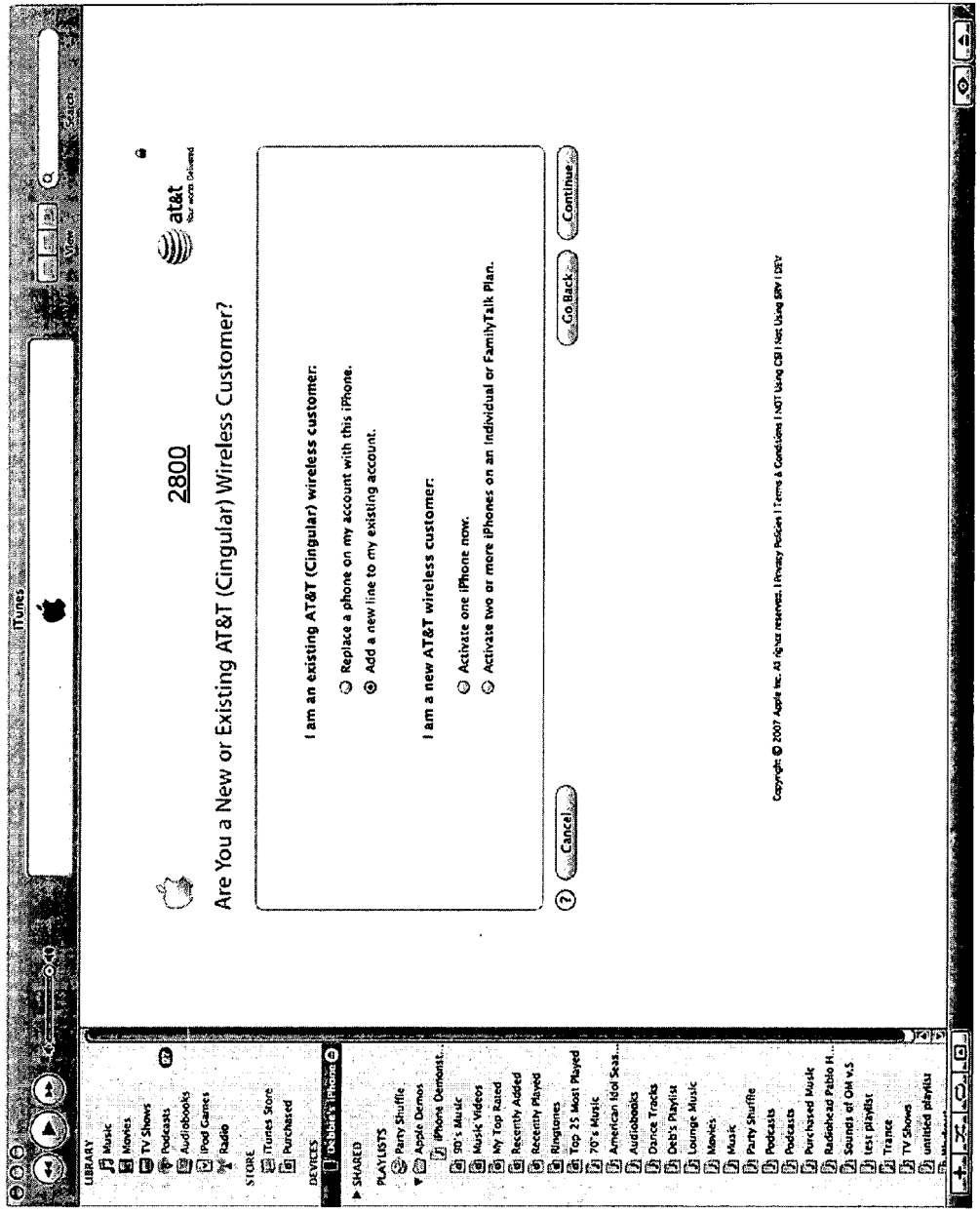
FIG. 28 is a screen shot of an exemplary customer status page according to one embodiment of the invention.
Figure 29:
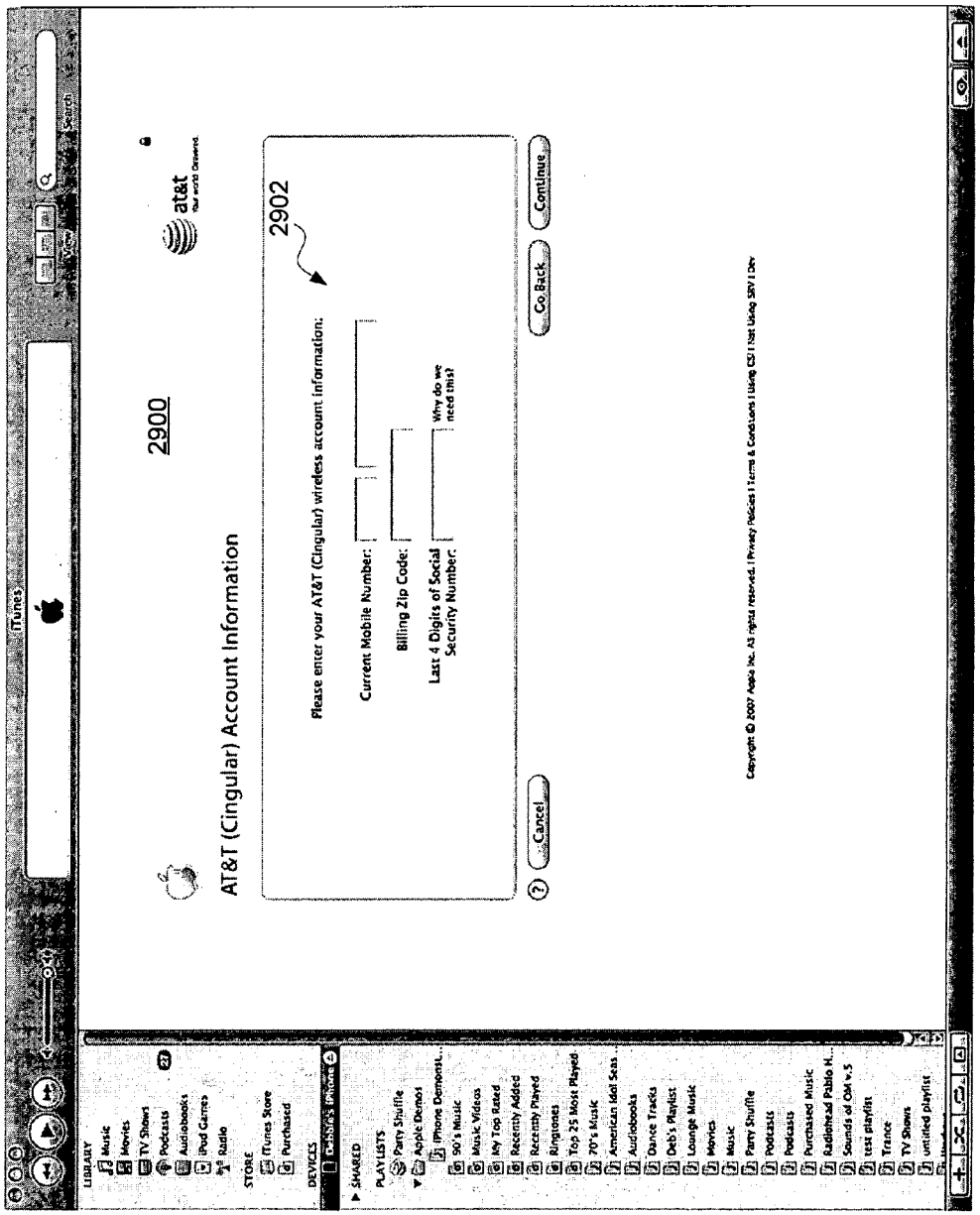
FIG. 29 is a screen shot of an exemplary account information page according to one embodiment of the invention.
Figure 30:
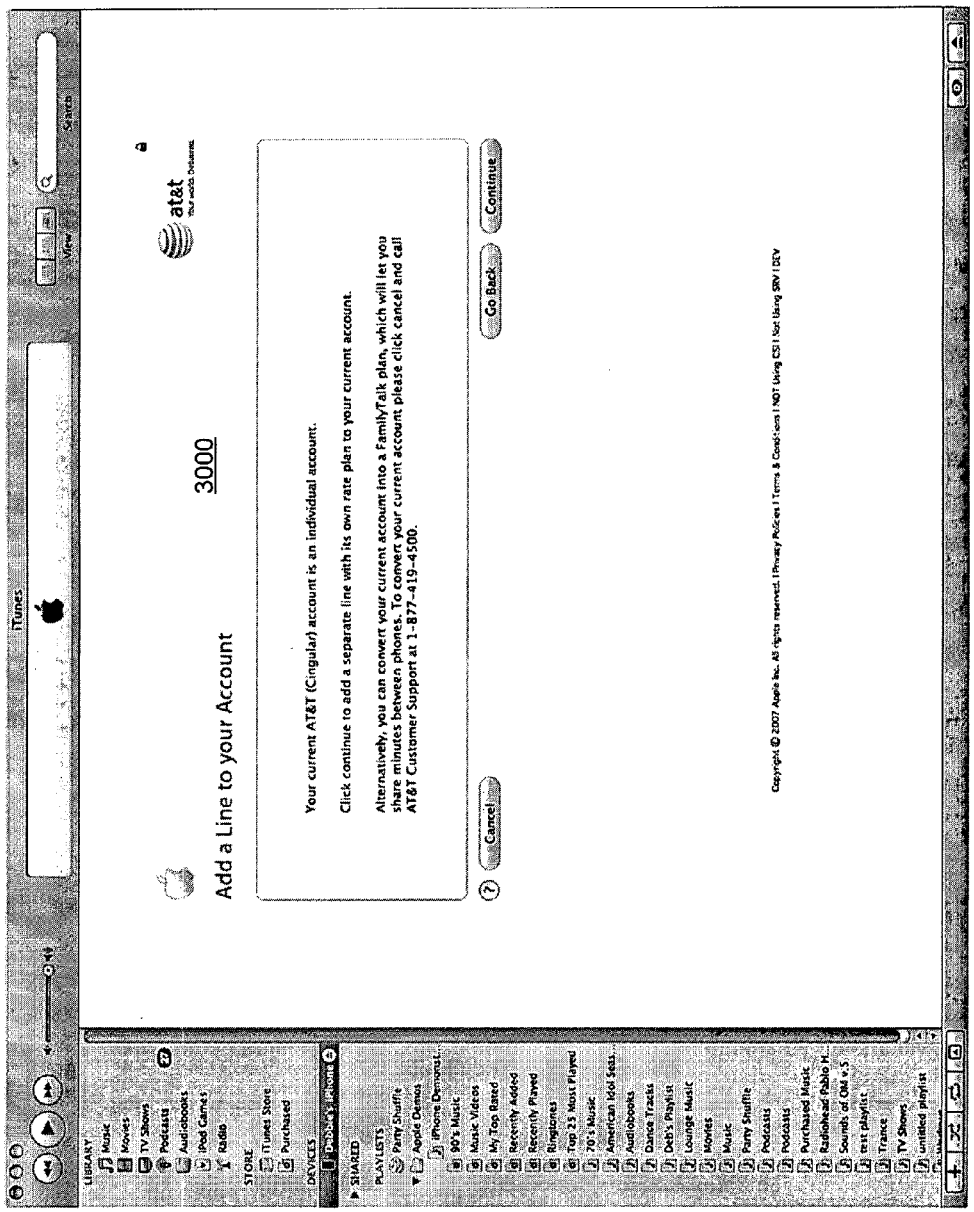
FIG. 30 is a screen shot of an exemplary account type selection page according to one embodiment of the invention.

An existing customer can also use the computer-assisted provisioning process to add an additional line to an existing account. FIG. 28 is a screen shot of an exemplary customer status page 2800 according to one embodiment of the invention. The customer status page 2800 allows an existing wireless network service customer to activate a new mobile phone on pre-existing account. Since the customer is an existing customer, an account information page can also be displayed. The account information page can permit the user to enter account information concerning their account with the wireless service provider. The account information serves to identify the pre-existing account of the user. As such, an activation server can locate the user account and associate the new mobile phone with the pre-existing account. FIG. 29 is a screen shot of an exemplary account information page 2900 according to one embodiment of the invention. The account information page 2900 includes an account information entry area 2902 allows a user to enter account information. Still further, in this scenario the pre-existing account is assumed to be an individual account. Hence, in one embodiment, an account type selection page can be displayed. FIG. 30 is a screen shot of an exemplary account type selection page 3000 according to one embodiment of the invention. The account type selection page 3000 allows the customer to choose to activate the new mobile phone on an individual plan or to instead convert to a family plan. Typically, with a family plan, the various mobile phones within the group can share service time (e.g., share plan minutes).

Figure 31:
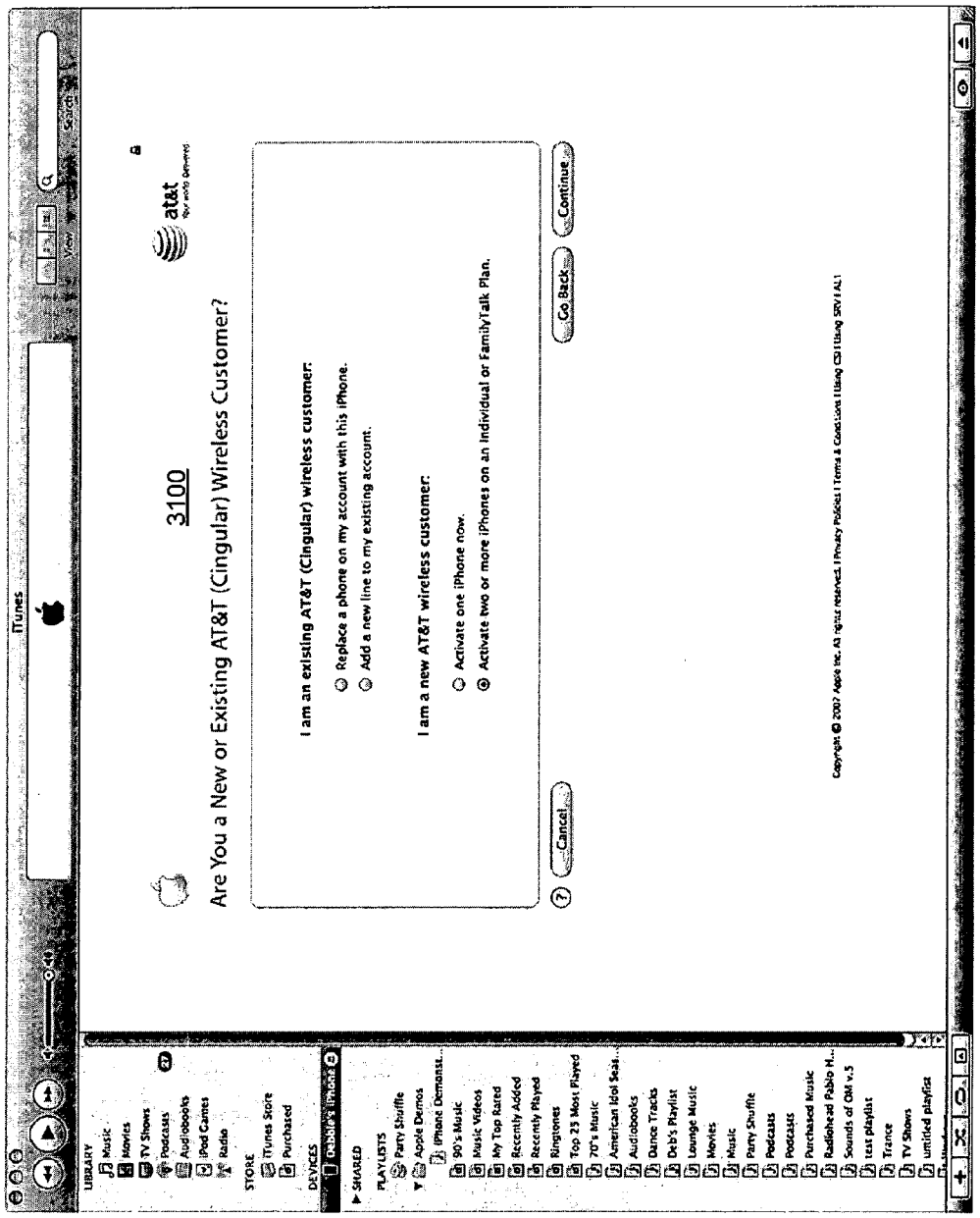
FIG. 31 is a screen shot of an exemplary customer status page according to one embodiment of the invention.
Figure 32:
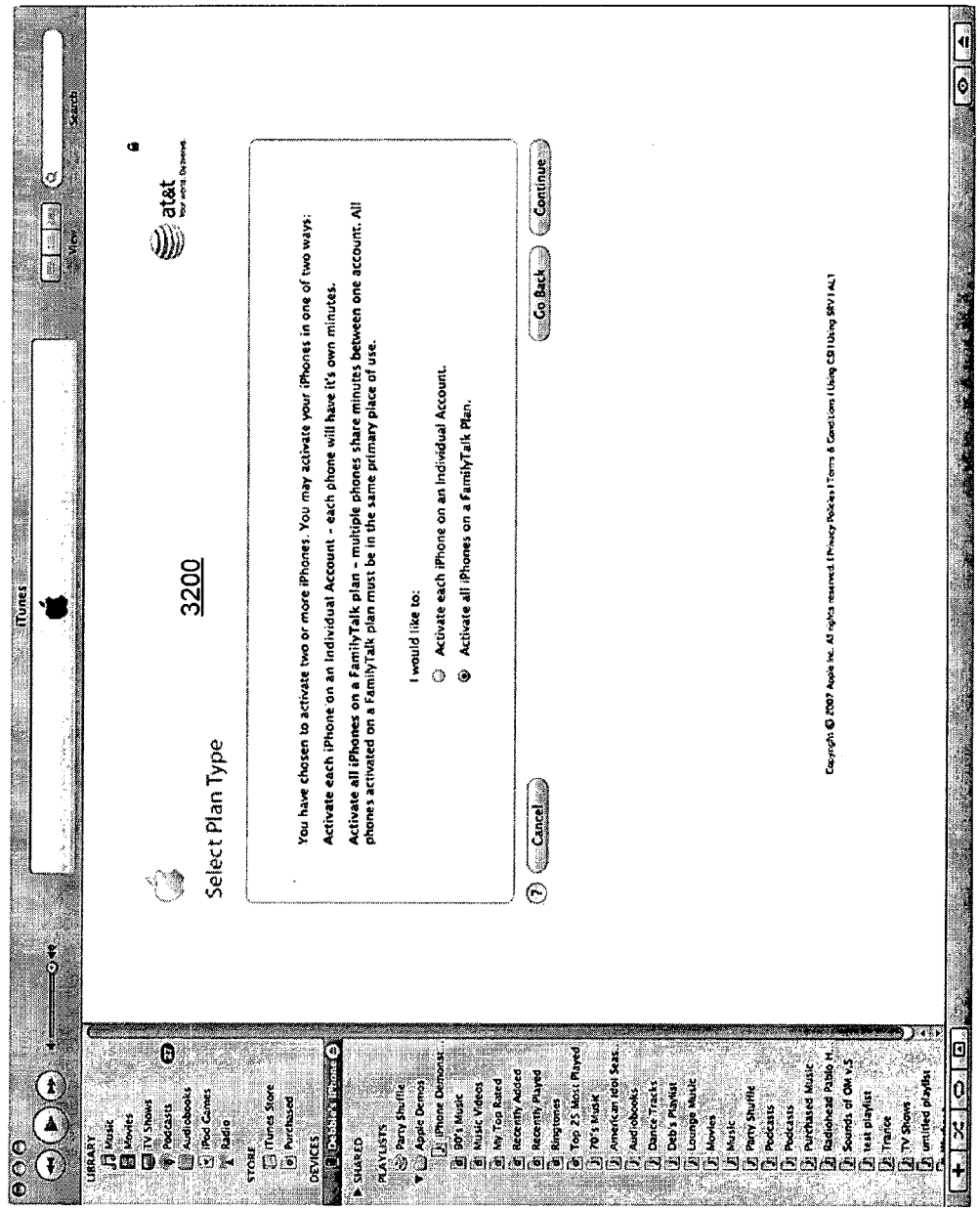
FIG. 32 is a screen shot of an exemplary account type selection page according to one embodiment of the invention.

A new customer can also use the computer-assisted provisioning process to activate multiple mobile devices. FIG. 31 is a screen shot of an exemplary customer status page 3100 according to one embodiment of the invention. The customer status page 3100 allows a new customer for wireless network service to activate one mobile phone or multiple mobile phones. In one embodiment, when two or more mobile phones are to be activated an account type selection page can be displayed to enable the customer to choose between individual plans or family plans. FIG. 32 is a screen shot of an exemplary account type selection page 3200 according to one embodiment of the invention. The account type selection page 3200 allows the customer to choose to activate each of the multiple new mobile phones on individual plans or to instead activate all of the multiple new mobile phones on a family plan. Typically, with a family plan, the various mobile phones within the group can share service time (e.g., share plan minutes). In this example, the conversion to a family plan requires calling customer support; however, in other embodiments such can be part of the computer-assisted provisioning.

Mobile device provisioning can also enable remote provisioning of multiple wireless communication devices. For example, wireless service providers often refer to multiple devices on a primary account as a "family plan". Activation of multiple devices for such a primary account can require additional operations. In one embodiment, a first mobile device is connected to the host computer, such as using a USB connection, and then for the subsequent one or more mobile device to be also activated for the primary account can be identified to the provisioning server by having an end-user manually enter an identifier that is provided with another mobile device. For example, the identifier can be provided on or within a package containing the another mobile device. Hence, in would be possible for an end-user to activate a mobile device without it being present.

In one embodiment, the activation process uses two identifiers, IMEI and ICCID, when activating a mobile device. However, neither of these identifiers have built-in error correct or validation. Hence, manual entry of these identifiers by end-users could lead to failed or improper activation. One embodiment to enhance activation in such situations is to provide end-users with a computed identifier that uniquely maps to the needed IMEI and ICCID identifiers. The computed identifier can be more compact (i.e., less digits) and thus easier for manual entry. Moreover, the computed identifier can include error correction to guard against improper entry of the computed identifier.

Mobile device provisioning can also restrict payment options to those consumers that have low credit scores. For example, a wireless service provider may not desire to activate a wireless service plan to those customers that have poor credit. Hence, in one embodiment, the wireless service provider can offer different payment options to different customers dependent on at least credit information (e.g., credit score). For example, customers with poor credit can be required to pay a deposit or to pre-pay for such service.

Figure 33:
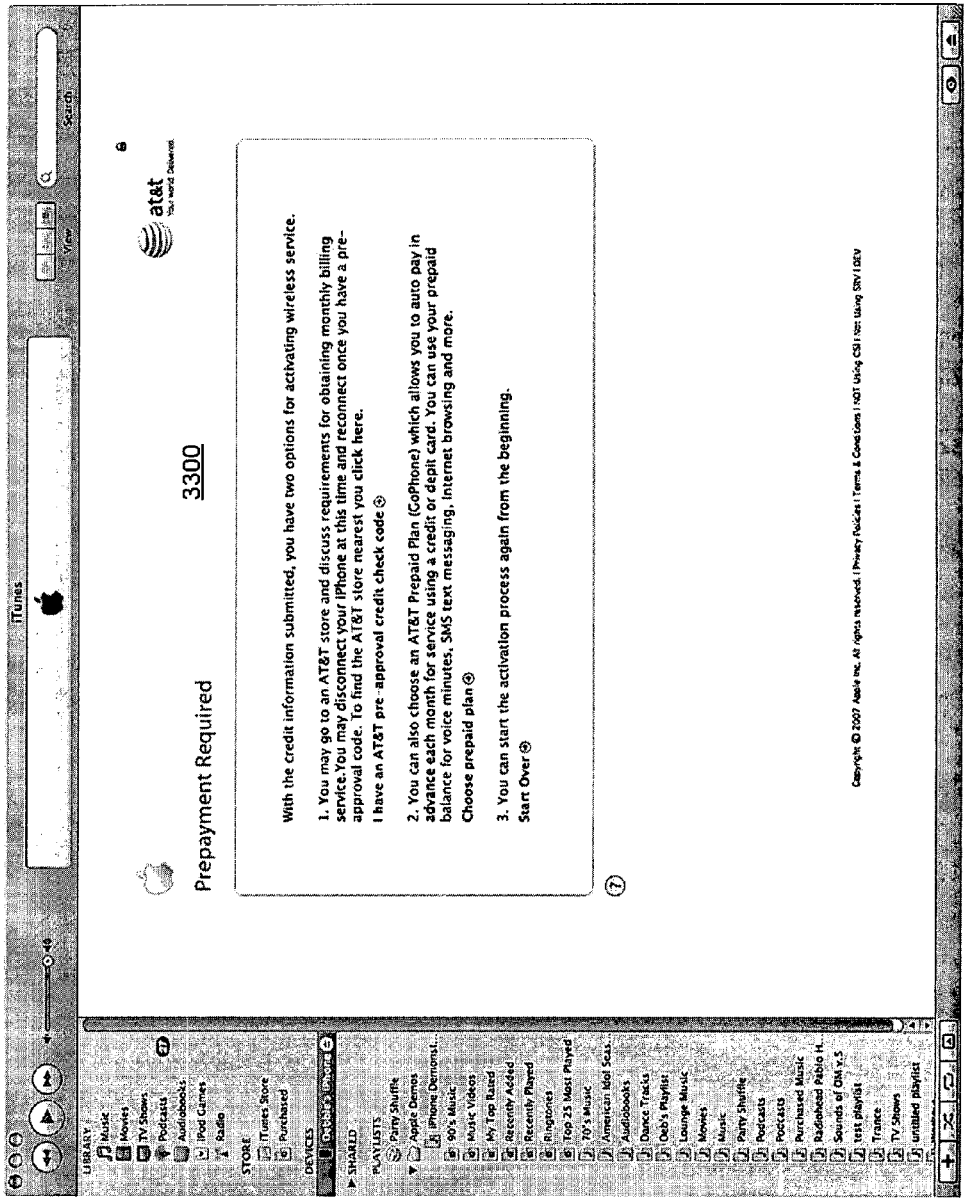
FIG. 33 is a screen shot of an exemplary prepayment requirement page.

In some cases, a new customer can be limited to service plans that require prepayment. In one embodiment, the provisioning process can decide whether prepayment is required based on the credit history of the customer. The credit history can, for example, result from a credit report on the customer. FIG. 33 is a screen shot of an exemplary prepayment requirement page 3300. The exemplary prepayment requirement page 3300 can present the customer with one or more option on activating wireless service. The exemplary prepayment requirement page 3300 allows the customer to (i) provide a pre-approval credit check code and continue activation, (ii) agree to a prepaid plan (e.g., with advance monthly payment via credit or debit card) and continue activation, or (iii) restart/cancel the activation process.

As noted above, the provisioning method can also be used by existing customers. For example, an existing customer may get a new wireless communication device (e.g., mobile phone, multi-function device, etc.) that they want to use it in place of their current wireless communication device. In one embodiment, the service plan offered to the end user can have a predetermined minimum term (e.g., 2 years) or cancellation penalty duration. In one implementation, the user's new service plan will reset such minimum period regardless of whether the user has already exceed the minimum period for the user's existing plan.

Figure 34:
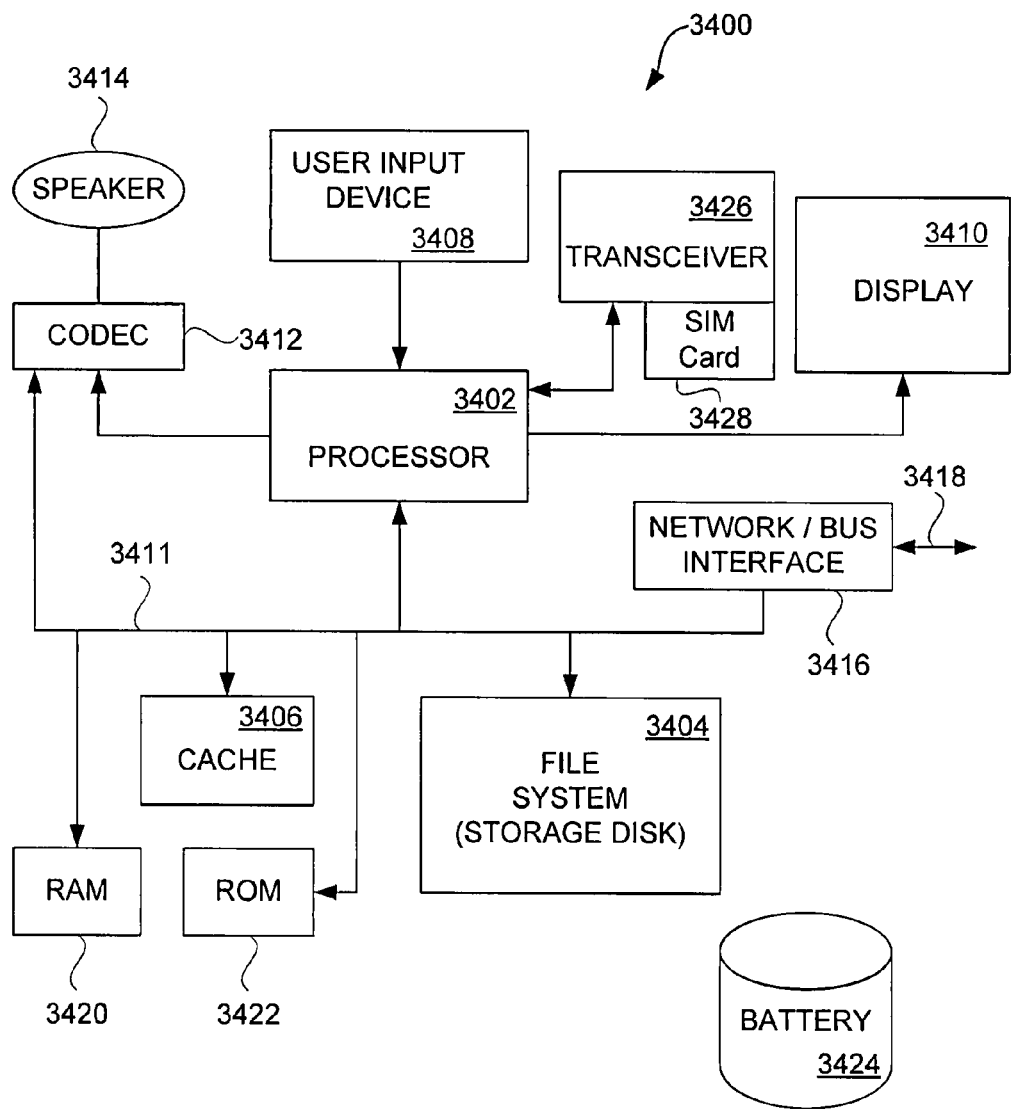
FIG. 34 is a block diagram of a mobile multi-function device according to one embodiment of the invention.

FIG. 34 is a block diagram of a mobile multi-function device 3400 according to one embodiment of the invention. The mobile multi-function device 3400 can include the circuitry of the mobile multi-function device 104 illustrated in FIG. 1 and/or can perform the operations described with reference to FIGS. 3 and 4. The mobile multi-function device 3400 includes hardware and software components to provide at least two functions, namely, a media playback function and a wireless voice communications function. When providing media playback, the mobile multi-function device 3400 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 3400 can operate a mobile telephone (e.g., cellular phone).

The mobile multi-function device 3400 includes a processor 3402 that pertains to a microprocessor or controller for controlling the overall operation of the mobile multi-function device 3400. The mobile multi-function device 3400 stores media data pertaining to media items in a file system 3404 and a cache 3406. In one embodiment, the file system 3404 is implemented by a storage disk or a plurality of disks. In another embodiment, the file system 3404 is implemented by EEPROM or Flash type memory. The file system 3404 typically provides high capacity storage capability for the mobile multi-function device 3400. However, since the access time to the file system 3404 is relatively slow, the mobile multi-function device 3400 can also include a cache 3406. The cache 3406 is, for example, Random-Access Memory (RAM) provided by semiconductor memory. The relative access time to the cache 3406 is substantially shorter than for the file system 3404. However, the cache 3406 does not have the large storage capacity of the file system 3404. Further, the file system 3404, when active, consumes more power than does the cache 3406. The power consumption is often a concern when the mobile multi-function device 3400 is a portable mobile multi-function device that is powered by a battery 3424. The mobile multi-function device 3400 also includes a RAM 3420 and a Read-Only Memory (ROM) 3422. The ROM 3422 can store programs, utilities or processes to be executed in a non-volatile manner. The ROM 3422 can be implemented by an EEPROM or Flash type memory so as to provide writable non-volatile data storage. The RAM 3420 provides volatile data storage, such as for the cache 3406.

In one embodiment, to support wireless voice communications, the mobile multi-function device 3400 includes a transceiver 3426 and a SIM card 3428. The transceiver 3426 supports wireless communication with a wireless network (such as a wireless cellular network). The SIM card 3428 includes an identifier (e.g., SIM identifier) can be used by the mobile multi-function device 3400 to gain access and utilize the wireless network. In other embodiments, a SIM card 3428 is not utilized.

The mobile multi-function device 3400 also includes a user input device 3408 that allows a user of the mobile multi-function device 3400 to interact with the mobile multi-function device 3400. For example, the user input device 3408 can take a variety of forms, such as a button, keypad, dial, etc. Still further, the mobile multi-function device 3400 includes a display 3410 (screen display) that can be controlled by the processor 3402 to display information to the user. A data bus 3411 can facilitate data transfer between at least the file system 3404, the cache 3406, the processor 3402, and the CODEC 3412.

In one embodiment, the mobile multi-function device 3400 serves to store a plurality of media items (e.g., songs) in the file system 3404. When a user desires to have the mobile multi-function device play a particular media item, a list of available media items is displayed on the display 3410. Then, using the user input device 3408, a user can select one of the available media items. The processor 3402, upon receiving a selection of a particular media item, supplies the media data (e.g., audio file) for the particular media item to a coder/decoder (CODEC) 3412. The CODEC 3412 then produces analog output signals for a speaker 3414. The speaker 3414 can be a speaker internal to the mobile multi-function device 3400 or external to the mobile multi-function device 3400. For example, headphones or earphones that connect to the mobile multi-function device 3400 would be considered an external speaker.

The mobile multi-function device 3400 also includes a bus interface 3416 that couples to a data link 3418. The data link 3418 allows the mobile multi-function device 3400 to couple to a host device (e.g., host computer or power source). The data link 3418 can also provide power to the mobile multi-function device 3400.

The various aspects, embodiments, implementations or features of the invention can be used separately or in any combination.

The invention can be implemented by software, hardware or a combination of hardware and software. The invention can also be embodied as computer readable code on a computer readable medium. The computer readable medium is any data storage device that can store data which can thereafter be read by a computing device (e.g., computer system). Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that mobile devices can be setup or activated to operate on wireless networks by end users. Another advantage of the invention is that setup or activation can be substantially automated and controlled by a computer-implemented system to facilitate setup or activation with a service provider (e.g., wireless service provider). Another advantage of the invention is that graphical user interfaces can be presented to users so as to enable end users to easily activate mobile devices. Still another advantage of the invention is that more than one account for different service providers can be concurrently arranged in an efficient and user friendly manner. Yet still another advantage of the invention is that mobile devices can be largely disabled until properly activated with a service provider.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for enabling an end user to activate a wireless account for an electronic device having wireless communication capabilities, wherein the wireless account is associated with a wireless service provider that provides wireless network service, and the method comprises:
 displaying, to the end user, a plurality of pages on a display device associated with a host computer, wherein the host computer is coupled to the electronic device, and the plurality of pages includes:
  an end user status page to facilitate selection of a type of activation,
  a service plan selection page to facilitate selection of a service plan for the wireless network service,
  a media account page for a media account associated with an online media store so that the end user can create a new media account or login to an existing media account,
  an end user information entry page to facilitate entry of end user information for both the media account and the wireless account,
  a billing information page to facilitate entry of billing information for both the media account and the wireless account,
  at least one terms and conditions page regarding legal agreements with the online media store and with the wireless service provider, and
  an activation page to inform the end user of activation information; and
 upon a determination of a successful activation of the electronic device with the wireless network service:
  transmitting enablement information to the electronic device, wherein the enablement information is configured to remove from the electronic device restrictions of wireless communication functionalities, and
  causing the electronic device to reset a portion of hardware within the electronic device to cause the electronic device to issue a request to register with the wireless network service.

2. The method as recited in claim 1, wherein the plurality of pages further comprises a final review and submit page to initiate activation of the wireless account for the electronic device with respect to the wireless service provider.

3. The method as recited in claim 2, wherein the final review and submit page can further initiate creation of the new media account for the end user not having the existing media account.

4. The method as recited in claim 1, wherein the plurality of plurality of pages further comprises a device preference page to assist the end user with setting one or more preferences or options to be applied to operation of the electronic device.

5. The method as recited in claim 1, wherein the end user status page enables the end user to select from a plurality of types of activation.

6. The method as recited in claim 5, wherein the types of activation include an individual plan and a family plan.

7. The method as recited in claim 5, wherein the types of activation include a new individual plan, an existing individual plan, a new family plan, and an existing family plan.

8. The method as recited in claim 1, wherein the electronic device is a multi-function device, and wherein the multi-function device supports at least wireless voice communication and media playback function.

9. The method as recited in claim 1, wherein the plurality of pages further comprises a media account review page for identifying the new media account or the existing media account for the end user.

10. The method as recited in claim 1, wherein the type of activation is an individual plan activation or a family plan activation.

11. The method as recited in claim 5, wherein one of the types of activation involves usage of an existing phone number or usage of a new phone number.

12. The method as recited in claim 1, wherein the service plan selection page includes information about a plurality of service plans and their costs and enables the end user to select from the plurality of service plans.

13. The method as recited in claim 1, wherein the billing information provided via the billing information page includes information pertaining to name and billing address for the end user and credit card number.

14. The method as recited in claim 1, wherein the activation page informs the end user of a phone number associated with the electronic device being activated.

15. The method as recited in claim 1, wherein the plurality of pages further comprises a device preference page to assist the end user with setting one or more preferences or options to be applied to an operation of the electronic device.

16. The method as recited in claim 1, wherein the plurality of pages further comprises a transfer number page for identifying a phone number and an existing wireless account, and the phone number to be transferred is to be used with the wireless account being activated and associated with the electronic device.

17. The method as recited in claim 1, wherein the electronic device is electrically coupled to the host computer.

18. The method as recited in claim 1, wherein determining that the electronic device has successfully activated with the wireless network service comprises receiving an indication from an activation server that facilitates activation of the electronic device with the wireless network service.

19. The method as recited in claim 8, wherein the media playback function is provided by a media management application that operates on the electronic device.

20. A computer-implemented method for activating an electronic device with a wireless network service, wherein the electronic device is associated with a customer of a wireless service provider that provides the wireless network service, and the method comprises:
 informing an activation server of the electronic device;
 displaying a customer status page to facilitate selection of a type of activation;
 specifying to the activation server a type of activation desired by the customer;
 displaying a service plan selection page to facilitate selection of a service plan for the wireless network service;
 informing the activation server of a selected service plan;
 displaying a customer account page to facilitate login to or creation of a user media account with an online media store;
 providing account information for the user media account for the customer;
 displaying a customer information entry page;
 providing customer information to the activation server;
 displaying a billing information page to facilitate entry of billing information for one or both the user media account and a wireless account;
 informing the activation server of the billing information;
 displaying a terms and conditions page regarding legal agreements with the online media store and with the wireless service provider;
 informing the activation server of acceptance of the legal agreements;
 displaying an information review page;

informing the activation server of approval of the information provided on the information review page;

displaying an activation completion page;

displaying a device preference page to assist the customer with setting one or more preferences or options to be applied to an operation of the electronic device; and upon a determination of a successful activation of the electronic device with the wireless network service:

transmitting enablement information to the electronic device, wherein the enablement information is configured to remove from the electronic device restrictions of wireless communication functionalities, and causing the electronic device to reset a portion of hardware within the electronic device to cause the electronic device to issue a request to register with the wireless network service.

21. The computer-implemented method as recited in claim 20, wherein the pages are displayed on a display device included in a host computer that is configured to communicate with the electronic device.

22. A computer-implemented method for activating both an electronic device for wireless network service and at least one account associated with at least one online store, the computer-implemented method comprising:

displaying a service plan selection page to facilitate selection of a service plan for a wireless network service;

displaying a media account page for a media account associated with an online store so that an end user can create a new media account or login to an existing media account;

displaying an end user information entry page to facilitate entry of end user information for both the media account and a wireless account associated with the wireless network service; and upon a determination of a successful activation of the electronic device with the wireless network service:

transmitting enablement information to the electronic device, wherein the enablement information is configured to remove from the electronic device restrictions of wireless communication functionalities, and causing the electronic device to reset a portion of hardware within the electronic device to cause the electronic device to issue a request to register with the wireless network service.

23. The computer-implemented method as recited in claim 22, further comprising:

displaying a billing information page to facilitate entry of billing information for both the media account and the wireless account;

displaying at least one terms and conditions page regarding legal agreements with the online store and with a wireless service provider providing the wireless network service; and using end user information provided via the user information entry page to activate both the media account and the wireless account.

24. A computer system configured to enable activation of an electronic device for wireless network service and at least one account associated with at least one online store, the computer system comprising:

at least one processor; and a storage device, wherein the storage device is configured to store a plurality of instructions that, when executed by the at least one processor, cause the computer system to:

display a service plan selection page to facilitate selection of a service plan for an available wireless network service;

display a media account page for a media account associated with an online store so that an end user can create a new media account or login to an existing media account;

display an end user information entry page to facilitate entry of end user information for both the media account and a wireless account; and upon a determination of a successful activation of the electronic device with the wireless network service:

transmit enablement information to the electronic device, wherein the enablement information is configured to remove from the electronic device restrictions of wireless communication functionalities, and cause the electronic device to reset a portion of hardware within the electronic device to cause the electronic device to issue a request to register with the wireless network service.

* * * * *